(12) United States Patent
Pfaff et al.

(10) Patent No.: US 12,041,228 B2
(45) Date of Patent: Jul. 16, 2024

(54) CODING OF INTRA-PREDICTION MODES

(71) Applicant: Fraunhofer-Gesellschaft zur Foerderung der angewandten Forschung e.V., Munich (DE)

(72) Inventors: Jonathan Pfaff, Berlin (DE); Tobias Hinz, Berlin (DE); Philipp Helle, Berlin (DE); Philipp Merkle, Berlin (DE); Bjoern Stallenberger, Berlin (DE); Michael Schaefer, Berlin (DE); Benjamin Bross, Berlin (DE); Martin Winken, Berlin (DE); Mischa Siekmann, Berlin (DE); Heiko Schwarz, Berlin (DE); Detlev Marpe, Berlin (DE); Thomas Wiegand, Berlin (DE)

(73) Assignee: Fraunhofer-Gesellschaft Zur Foerderung der angewandten Forschung e.V., Munich (DE)

( * ) Notice: Subject to any disclaimer, the term of this patent is extended or adjusted under 35 U.S.C. 154(b) by 167 days.

(21) Appl. No.: 17/549,376

(22) Filed: Dec. 13, 2021

(65) Prior Publication Data
US 2022/0103813 A1 Mar. 31, 2022

Related U.S. Application Data

(63) Continuation of application No. PCT/EP2020/066124, filed on Jun. 10, 2020.

(30) Foreign Application Priority Data

Jun. 14, 2019 (EP) .................................. 19180383

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/176* (2014.11); *H04N 19/593* (2014.11); *H04N 19/70* (2014.11)

(58) Field of Classification Search
CPC .... H04N 19/11; H04N 19/593; H04N 19/176; H04N 19/70; H04N 19/147; H04N 19/463
See application file for complete search history.

(56) References Cited

U.S. PATENT DOCUMENTS 11,431,969 B2 * 8/2022 Heo ..................... H04N 19/593
11,509,891 B2 * 11/2022 Li ........................ H04N 19/105
(Continued)

FOREIGN PATENT DOCUMENTS

WO 2017196957 A1 11/2017

OTHER PUBLICATIONS

Pfaff (Fraunhofer) J et al, "CE3 Affine linear weighted intra prediction (CE3-4.1, CE3-4.2)," Joint Video Experts Team (JVET) of ITU-T SG 16 WP 3 and ISO/IEC JTC 1/SC 29/WG 11; Mar. 2019; pp. 1-17.

(Continued)

*Primary Examiner* — Boubacar Abdou Tchoussou
(74) *Attorney, Agent, or Firm* — Conley Rose, P.C.

(57) ABSTRACT

Apparatus configured to derive a set-selective syntax element indicating whether the predetermined block is to be predicted using one of a first set of intra-prediction modes comprising a DC intra prediction mode and angular prediction modes. If the set-selective syntax element indicates that the predetermined block is to be predicted using one of the first set of intra-prediction modes, the apparatus is configured to use a list of most probable intra-prediction modes. If the set-selective syntax element indicates that the predetermined block is not to be predicted using one of the first set (Continued)

of intra-prediction modes, the apparatus is configured to use a matrix-based intra-prediction mode. The list of most probable intra-prediction modes is formed such that the list of most probable intra-prediction modes is free of the DC intra prediction mode in case of the neighbouring blocks being predicted by any of the angular intra prediction modes.

30 Claims, 24 Drawing Sheets

(51) Int. Cl.
*H04N 19/593* (2014.01)
*H04N 19/70* (2014.01)

(56) References Cited

U.S. PATENT DOCUMENTS

| | | |
|---|---|---|
| 2017/0214940 A1 | 7/2017 | Chien et al. |
| 2019/0089952 A1* | 3/2019 | Liu ........................ H04N 19/46 |
| 2022/0150537 A1* | 5/2022 | Heo ....................... H04N 19/70 |

OTHER PUBLICATIONS

Bros B et al, "Versatile Video Coding (Draft 5)," Joint Video Experts Team (JVET) of ITU-T SG 16 WP 3 and ISO/IEC JTC 1/SC 29/WG 11; Mar. 2019; pp. 1-400.
International Search Report and Written Opinion in PCT/EP2020/066124, mailed Jul. 22, 2020.
International Preliminary Report on Patentability in PCT/EP2020/066124, mailed Dec. 14, 2021.

* cited by examiner

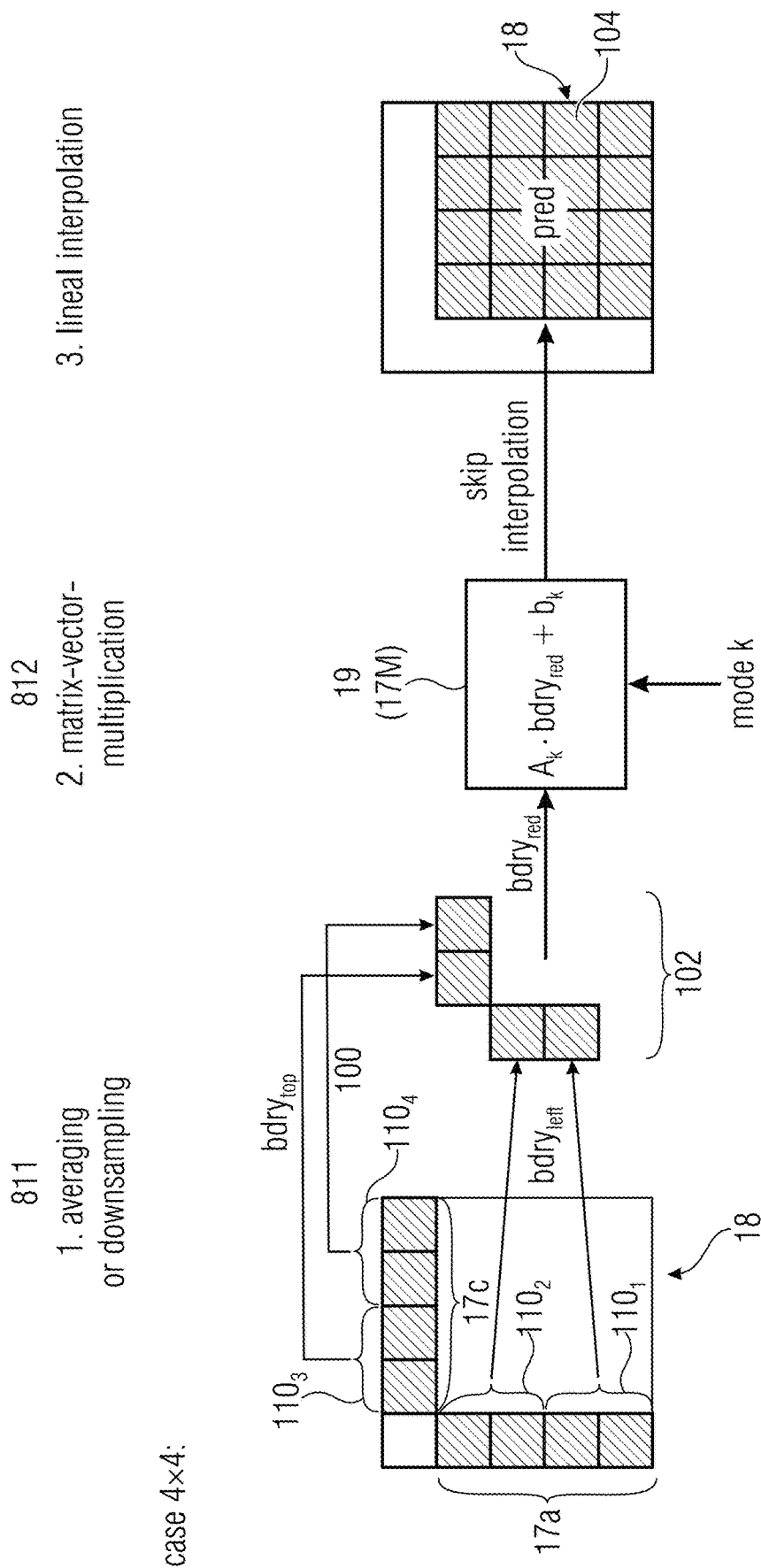
Fig. 7.1

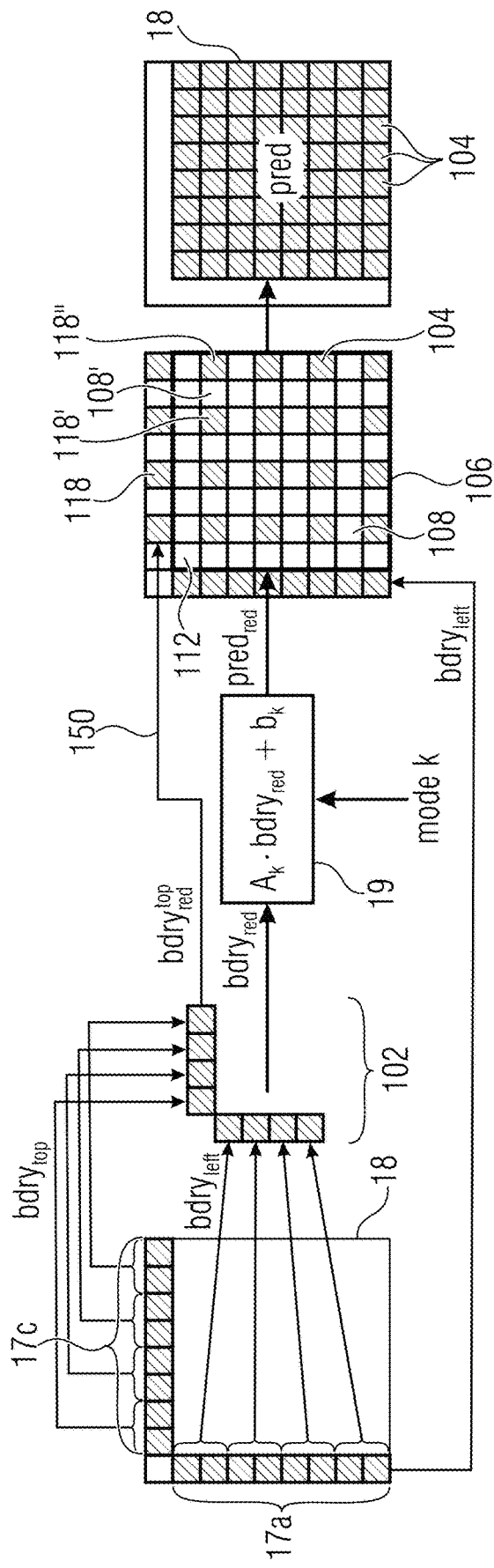
Fig. 7.2

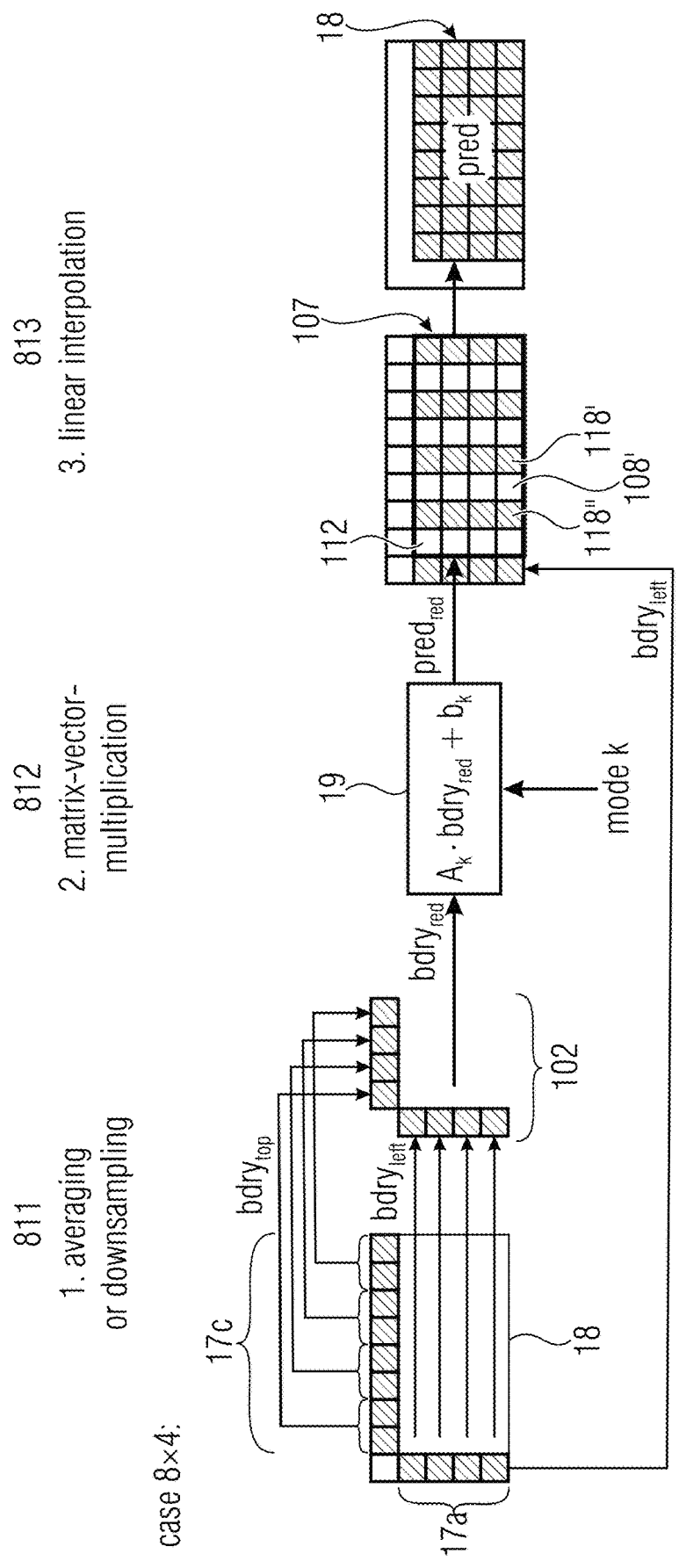
Fig. 7.3

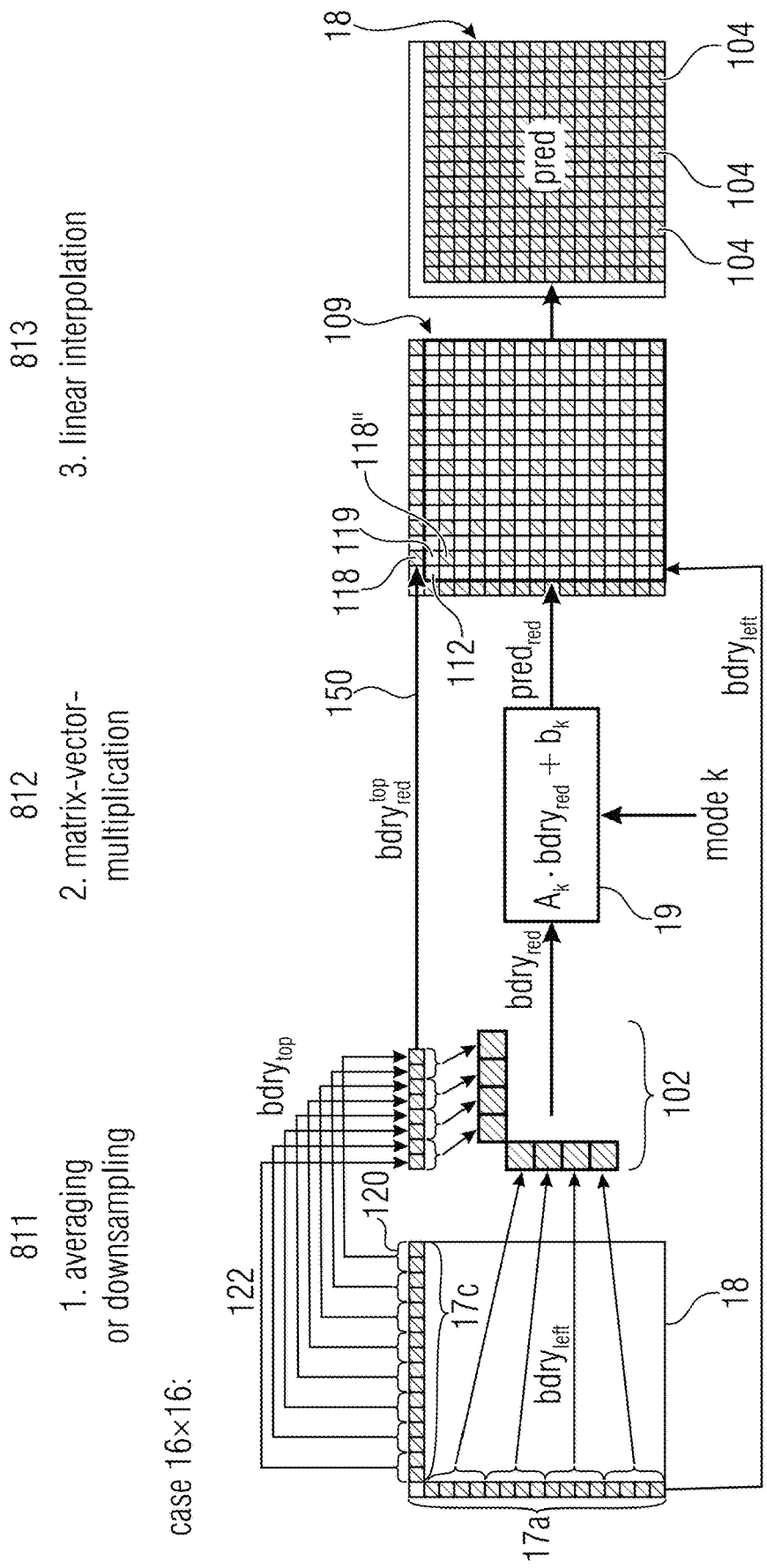
Fig. 7.4

Fig. 9a $$\underbrace{\begin{pmatrix} C_{11}-\text{offset}_{11} & C_{12}-\text{offset}_{12} & \cdots & C_{N1}-\text{offset}_{N1} \\ & \vdots & & \\ & & \ddots & \\ & \vdots & & \\ C_{1N}-\text{offset}_{1N} & & & \end{pmatrix}}_{C/C'} \bullet \overbrace{\begin{pmatrix} y_1 \cdot \text{scale}_1 \\ \vdots \\ \vdots \\ y_N \cdot \text{scale}_N \end{pmatrix}}^{402/410} + \begin{pmatrix} a \\ \vdots \\ \vdots \\ a \end{pmatrix}$$

e.g. $\text{offset}_{ij} = \text{offset}_{nm}$ for $\forall$ all $i = n$ or for $\forall\, j = m$
e.g. $\text{scale}_i = \text{scale}_j$ for $\forall\, i, j$

Fig. 10

$$\text{scale} \bullet \begin{pmatrix} C_{11} & C_{12} & \cdots & C_{N1} \\ & \vdots & & \\ & & \ddots & \\ & \vdots & & \\ C_{1N} & & & \end{pmatrix} \bullet \left[ \begin{pmatrix} y_1 \\ \vdots \\ \vdots \\ y_N \end{pmatrix} - \begin{pmatrix} \text{offset} \cdot y_1 \\ \vdots \\ \vdots \\ \text{offset} \cdot y_N \end{pmatrix} \right] \bullet \text{scale} + \begin{pmatrix} a \\ \vdots \\ \vdots \\ a \end{pmatrix}$$

Fig. 11

| coding_unit( x0, y0, cbWidth, cbHeight, treeType ) { | Descriptor |
|---|---|
|   if( slice_type != I \|\| sps_ibc_enabled_flag ) { | |
|     if( treeType != DUAL_TREE_CHROMA && !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) \|\| ( slice_type != I && ( CuPredMode[ x0 ][ y0 ] != MODE_INTRA \|\| ( cbWidth = = 4 && cbHeight = = 4 && cu_skip_flag[ x0 ][ y0 ] = = 0 ) ) ) && sps_ibc_enabled_flag && ( cbWidth != 128 \|\| cbHeight != 128 ) ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( cbWidth <= 32 && cbHeight <= 32 ) | |
|           intra_bdpcm_flag[ x0 ][ y0 ] | ae(v) |
|         if( intra_bdpcm_flag[ x0 ][ y0 ] ) | |
|           intra_bdpcm_dir_flag [ x0 ][ y0 ] | ae(v) |
|         else { | |

Fig. 13B

| | | |
|---|---|---|
| if( sps_mip_enabled_flag && | | 522 |
| ( Abs( Log2( cbWidth ) − Log2( cbHeight ) ) <= 2 ) && | | |
| cbWidth <= MaxTbSizeY && cbHeight <= MaxTbSizeY) | | |
| intra_mip_flag[ x0 ][ y0 ] | ae(v) | 538 |
| if( intra_mip_flag[ x0 ][ y0 ] ) { | | |
| intra_mip_mpm_flag[ x0 ][ y0 ] | ae(v) | 540 |
| if( intra_mip_mpm_flag[ x0 ][ y0 ] ) | | |
| intra_mip_mpm_idx[ x0 ][ y0 ] | ae(v) | 546 |
| else | | |
| intra_mip_mpm_remainder[ x0 ][ y0 ] | ae(v) | |
| } else { | | 600 |
| if( sps_mrl_enabled_flag && ( ( y0 % CtbSizeY ) > 0 )) | | |
| intra_luma_ref_idx[ x0 ][ y0 ] | ae(v) | |
| if(sps_isp_enabled_flag&&intra_luma_ref_idx[ x0 ][ y0 ] == 0 && | | 602 |
| (cbWidth <= MaxTbSizeY&&cbHeight <= MaxTbSizeY)&& | | |
| ( cbWidth * cbHeight > MinTbSizeY * MinTbSizeY ) ) | | |
| intra_subpartitions_mode_flag[ x0 ][ y0 ] | ae(v) | |
| if( intra_subpartitions_mode_flag[ x0 ][ y0 ] == 1 && | | 604 |
| cbWidth <= MaxTbSizeY && cbHeight <= MaxTbSizeY ) | | |
| intra_subpartitions_split_flag[ x0 ][ y0 ] | ae(v) | |
| if( intra_luma_ref_idx[ x0 ][ y0 ] == 0 && | | 532 |
| intra_subpartitions_mode_flag[ x0 ][ y0 ] == 0 ) | | |
| intra_luma_mpm_flag[ x0 ][ y0 ] | ae(v) | |
| if( intra_luma_mpm_flag[ x0 ][ y0 ] ) { | | |
| if( intra_luma_ref_idx[ x0 ][ y0 ] == 0 ) | | 534' |
| intra_luma_not_planar_flag[ x0 ][ y0 ] | ae(v) | 534'' |
| if( intra_luma_not_planar_flag[ x0 ][ y0 ] ) | | |
| intra_luma_mpm_idx[ x0 ][ y0 ] | ae(v) | 536 |
| } else | | |
| intra_luma_mpm_remainder[ x0 ][ y0 ] | ae(v) | |
| } | | |
| } | | |

Fig. 13C

| | | |
|---|---|---|
| | } | |
| | if( treeType == SINGLE_TREE \|\| treeType == DUAL_TREE_CHROMA) | |
| | intra_chroma_pred_mode[ x0 ][ y0 ] | ae(v) |
| | } | |
| | } else if( treeType != DUAL_TREE_CHROMA ) { /* MODE_INTER or MODE_IBC */ | |
| | if( cu_skip_flag[ x0 ][ y0 ] == 0 ) | |
| | general_merge_flag[ x0 ][ y0 ] | ae(v) |
| | if( general_merge_flag[ x0 ][ y0 ] ) { | |
| | merge_data( x0, y0, cbWidth, cbHeight ) | |
| | } else if ( CuPredMode[ x0 ][ y0 ] == MODE_IBC ) { | |
| | mvd_coding( x0, y0, 0, 0 ) | |
| | mvp_l0_flag[ x0 ][ y0 ] | ae(v) |
| | if( sps_amvr_enabled_flag && ( MvdL0[ x0 ][ y0 ][ 0 ] != 0 \|\| MvdL0[ x0 ][ y0 ][ 1 ] != 0 ) ) { | |
| | amvr_precision_flag[ x0 ][ y0 ] | ae(v) |
| | } | |
| | } else { | |
| | if( slice_type == B ) | |
| | inter_pred_idc[ x0 ][ y0 ] | ae(v) |
| | if( sps_affine_enabled_flag && cbWidth >= 16 && cbHeight >= 16 ) { | |
| | inter_affine_flag[ x0 ][ y0 ] | ae(v) |
| | if( sps_affine_type_flag && inter_affine_flag[ x0 ][ y0 ] ) | |
| | cu_affine_type_flag[ x0 ][ y0 ] | ae(v) |
| | } | |
| | if( sps_smvd_enabled_flag && inter_pred_idc[ x0 ][ y0 ] == PRED_BI && !inter_affine_flag[ x0 ][ y0 ]&&RefIdxSymL0 > -1 && RefIdxSymL1>-1) | |
| | sym_mvd_flag[ x0 ][ y0 ] | ae(v) |
| | if( inter_pred_idc[ x0 ][ y0 ] != PRED_L1 ) { | |
| | if( NumRefIdxActive[ 0 ] > 1 && !sym_mvd_flag[ x0 ][ y0 ] ) | |
| | ref_idx_l0[ x0 ][ y0 ] | ae(v) |
| | mvd_coding( x0, y0, 0, 0 ) | |
| | if( MotionModelIdc[ x0 ][ y0 ] > 0 ) | |
| | mvd_coding( x0, y0, 0, 1 ) | |

Fig. 13D

| | |
|---|---|
| if(MotionModelIdc[ x0 ][ y0 ] > 1 ) | |
|  mvd_coding( x0, y0, 0, 2 ) | |
|  mvp_l0_flag[ x0 ][ y0 ] | ae(v) |
| } else { | |
|  MvdL0[ x0 ][ y0 ][ 0 ] = 0 | |
|  MvdL0[ x0 ][ y0 ][ 1 ] = 0 | |
| } | |
| if( inter_pred_idc[ x0 ][ y0 ] != PRED_L0 ) { | |
|  if( NumRefIdxActive[ 1 ] > 1 && !sym_mvd_flag[ x0 ][ y0 ] ) | |
|   ref_idx_l1[ x0 ][ y0 ] | ae(v) |
|  if( mvd_l1_zero_flag && inter_pred_idc[ x0 ][ y0 ] == PRED_BI ) { | |
|   MvdL1[ x0 ][ y0 ][ 0 ] = 0 | |
|   MvdL1[ x0 ][ y0 ][ 1 ] = 0 | |
|   MvdCpL1[ x0 ][ y0 ][ 0 ][ 0 ] = 0 | |
|   MvdCpL1[ x0 ][ y0 ][ 0 ][ 1 ] = 0 | |
|   MvdCpL1[ x0 ][ y0 ][ 1 ][ 0 ] = 0 | |
|   MvdCpL1[ x0 ][ y0 ][ 1 ][ 1 ] = 0 | |
|   MvdCpL1[ x0 ][ y0 ][ 2 ][ 0 ] = 0 | |
|   MvdCpL1[ x0 ][ y0 ][ 2 ][ 1 ] = 0 | |
|  } else { | |
|   if( sym_mvd_flag[ x0 ][ y0 ] ) { | |
|    MvdL1[ x0 ][ y0 ][ 0 ] = −MvdL0[ x0 ][ y0 ][ 0 ] | |
|    MvdL1[ x0 ][ y0 ][ 1 ] = −MvdL0[ x0 ][ y0 ][ 1 ] | |
|   } else | |
|    mvd_coding( x0, y0, 1, 0 ) | |
|   if( MotionModelIdc[ x0 ][ y0 ] > 0 ) | |
|    mvd_coding( x0, y0, 1, 1 ) | |
|   if(MotionModelIdc[ x0 ][ y0 ] > 1 ) | |
|    mvd_coding( x0, y0, 1, 2 ) | |
|   mvp_l1_flag[ x0 ][ y0 ] | ae(v) |
|  } | |
| } else { | |
|  MvdL1[ x0 ][ y0 ][ 0 ] = 0 | |

Fig. 13E

| | | |
|---|---|---|
| | MvdL1[ x0 ][ y0 ][ 1 ] = 0 | |
| | } | |
| | if( ( sps_amvr_enabled_flag && inter_affine_flag[ x0 ][ y0 ] == 0 && <br> ( MvdL0[ x0 ][ y0 ][ 0 ] != 0 \|\| MvdL0[ x0 ][ y0 ][ 1 ] != 0 \|\| <br> MvdL1[ x0 ][ y0 ][ 0 ] != 0 \|\| MvdL1[ x0 ][ y0 ][ 1 ] != 0 ) ) \|\| <br> (sps_affine_amvr_enabled_flag && inter_affine_flag[ x0 ][ y0 ]==1 && <br> (MvdCpL0[ x0 ][ y0 ][ 0 ][ 0 ] !=0 \|\| MvdCpL0[ x0 ][ y0 ][ 0 ][ 1 ] !=0 \|\| <br> MvdCpL1[ x0 ][ y0 ][ 0 ][ 0 ] !=0 \|\| MvdCpL1[ x0 ][ y0 ][ 0 ][ 1 ] !=0 \|\| <br> MvdCpL0[ x0 ][ y0 ][ 1 ][ 0 ] !=0 \|\| MvdCpL0[ x0 ][ y0 ][ 1 ][ 1 ] !=0 \|\| <br> MvdCpL1[ x0 ][ y0 ][ 1 ][ 0 ] !=0 \|\| MvdCpL1[ x0 ][ y0 ][ 1 ][ 1 ] !=0 \|\| <br> MvdCpL0[ x0 ][ y0 ][ 2 ][ 0 ] !=0 \|\| MvdCpL0[ x0 ][ y0 ][ 2 ][ 1 ] !=0 \|\| <br> MvdCpL1[ x0 ][ y0 ][ 2 ][ 0 ] != 0 \|\| MvdCpL1[ x0 ][ y0 ][ 2 ][ 1 ] != 0) <br> ) { | |
| | amvr_flag[ x0 ][ y0 ] | ae(v) |
| | if( amvr_flag[ x0 ][ y0 ] ) | |
| | amvr_precision_flag[ x0 ][ y0 ] | ae(v) |
| | } | |
| | if(sps_bcw_enabled_flag && inter_pred_idc[ x0 ][ y0 ] == PRED_BI && <br> luma_weight_l0_flag[ ref_idx_l0 [ x0 ][ y0 ] ] == 0 && <br> luma_weight_l1_flag[ ref_idx_l1 [ x0 ][ y0 ] ] == 0 && <br> chroma_weight_l0_flag[ ref_idx_l0 [ x0 ][ y0 ] ] == 0 && <br> chroma_weight_l1_flag[ ref_idx_l1 [ x0 ][ y0 ] ] == 0 && <br> cbWidth * cbHeight >= 256 ) | |
| | bcw_idx[ x0 ][ y0 ] | ae(v) |
| | } | |
| } | | |
| if( !pcm_flag[ x0 ][ y0 ] ) { | | |
| if( CuPredMode[ x0 ][ y0 ] != MODE_INTRA && <br> general_merge_flag[ x0 ][ y0 ] == 0 ) | | |
| | cu_cbf | ae(v) |
| if( cu_cbf ) { | | |
| | if(CuPredMode[ x0 ][ y0 ] == MODE_INTER && sps_sbt_enabled_flag && <br> !ciip_flag[ x0 ][ y0 ] && !MergeTriangleFlag[ x0 ][ y0 ] ) { | |
| | if( cbWidth <= MaxSbtSize && cbHeight <= MaxSbtSize ) { | |

Fig. 13F

| | | |
|---|---|---|
| allowSbtVerH = cbWidth >= 8 | | |
| allowSbtVerQ = cbWidth >= 16 | | |
| allowSbtHorH = cbHeight >= 8 | | |
| allowSbtHorQ = cbHeight >= 16 | | |
| if(allowSbtVerH \|\| allowSbtHorH \|\| allowSbtVerQ \|\| allowSbtHorQ) | | |
| cu_sbt_flag | ae(v) | |
| } | | |
| if( cu_sbt_flag ) { | | |
| if( ( allowSbtVerH \|\| allowSbtHorH ) && ( allowSbtVerQ \|\| allowSbtHorQ) ) | | |
| cu_sbt_quad_flag | ae(v) | |
| if( ( cu_sbt_quad_flag && allowSbtVerQ && allowSbtHorQ ) \|\| ( !cu_sbt_quad_flag && allowSbtVerH && allowSbtHorH ) ) | | |
| cu_sbt_horizontal_flag | ae(v) | |
| cu_sbt_pos_flag | ae(v) | |
| } | | |
| } | | |
| transform_tree( x0, y0, cbWidth, cbHeight, treeType ) | | |
| } | | |
| } | | |
| } | | |

Fig. 13G

CODING OF INTRA-PREDICTION MODES

CROSS-REFERENCE TO RELATED APPLICATIONS

This application is a continuation of copending International Application No. PCT/EP2020/066124, filed Jun. 10, 2020, which is incorporated herein by reference in its entirety, and additionally claims priority from European Application No. 19180383.2, filed Jun. 14, 2019, which is also incorporated herein by reference in its entirety.

The present application concerns the field of intra-prediction. Embodiments are related to advantageous ways for generating most-probable-mode lists.

BACKGROUND OF THE INVENTION

Today there exist different ways of generating most-probable-mode lists. However, there is still a high probability for a situation where the intra-prediction mode to be finally used is not within this list so that an additional syntax element needs to be transmitted.

SUMMARY

An embodiment may have an apparatus for decoding a predetermined block of a picture using intra-prediction, configured to derive a set-selective syntax element from the data stream which indicates whether the predetermined block is to be predicted using one of a first set of intra-prediction modes comprising a DC intra prediction mode and angular prediction modes, if the set-selective syntax element indicates that the predetermined block is to be predicted using one of the first set of intra-prediction modes, form a list of most probable intra-prediction modes on the basis of intra-prediction modes using which neighbouring blocks neighbouring the predetermined block are predicted, derive a MPM list index from the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, derive a further index from the data stream which indicates a predetermined matrix-based intra-prediction mode out of a second set of matrix-based intra-prediction modes, compute a matrix-vector product between a vector derived from reference samples in a neighbourhood of the predetermined block and a predetermined prediction matrix associated with the predetermined matrix-based intra-prediction mode so as to obtain a prediction vector, and predict samples of the predetermined block on the basis of the prediction vector, wherein the list of most probable intra-prediction modes is formed on the basis of intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

Another embodiment may have an apparatus for encoding a predetermined block of a picture using intra-prediction, configured to signal a set-selective syntax element in a data stream which indicates whether the predetermined block is to be predicted using one of a first set of intra-prediction modes comprising a DC intra prediction mode and angular prediction modes, if the set-selective syntax element indicates that the predetermined block is to be predicted using one of the first set of intra-prediction modes, form a list of most probable intra-prediction modes on the basis of intra-prediction modes using which neighbouring blocks neighbouring the predetermined block are predicted, signal a MPM list index in the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, signal a further index in the data stream which indicates a predetermined matrix-based intra-prediction mode out of a second set of matrix-based intra-prediction modes, compute a matrix-vector product between a vector derived from reference samples in a neighbourhood of the predetermined block and a predetermined prediction matrix associated with the predetermined matrix-based intra-prediction mode so as to obtain a prediction vector, and predict samples of the predetermined block on the basis of the prediction vector, wherein the list of most probable intra-prediction modes is formed on the basis of intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

According to another embodiment, a method for decoding a predetermined block of a picture using intra-prediction may have the steps of: deriving a set-selective syntax element from the data stream which indicates whether the predetermined block is to be predicted using one of a first set of intra-prediction modes comprising a DC intra prediction mode and angular prediction modes, if the set-selective syntax element indicates that the predetermined block is to be predicted using one of the first set of intra-prediction modes, forming a list of most probable intra-prediction modes on the basis of intra-prediction modes using which neighbouring blocks neighbouring the predetermined block are predicted, deriving a MPM list index from the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, deriving a further index from the data stream which indicates a predetermined matrix-based intra-prediction mode out of a second set of matrix-based intra-prediction modes, computing a matrix-vector product between a vector derived from reference samples in a neighbourhood of the predetermined block and a predetermined prediction matrix associated with the predetermined matrix-based intra-prediction mode so as to obtain a prediction vector, and predicting samples of the predetermined block on the basis of the prediction vector, wherein the list of most probable intra-prediction modes is formed on the basis of intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

According to another embodiment, a method for encoding a predetermined block of a picture using intra-prediction may have the steps of: signaling a set-selective syntax element in a data stream which indicates whether the predetermined block is to be predicted using one of a first set of intra-prediction modes comprising a DC intra prediction mode and angular prediction modes, if the set-selective syntax element indicates that the predetermined block is to be predicted using one of the first set of intra-prediction modes, forming a list of most probable intra-prediction modes on the basis of intra-prediction modes using which neighbouring blocks neighbouring the predetermined block are predicted, signaling a MPM list index in the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, signaling a further index in the data stream which indicates a predetermined matrix-based intra-prediction mode out of a second set of matrix-based intra-prediction modes, computing a matrix-vector product between a vector derived from reference samples in a neighbourhood of the predetermined block and a predetermined prediction matrix associated with the predetermined matrix-based intra-prediction mode so as to obtain a prediction vector, and predicting samples of the predetermined block on the basis of the prediction vector, wherein the list of most probable intra-prediction modes is formed on the basis of intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

Another embodiment may have a data stream having a picture encoded thereinto using the above method.

Another embodiment may have a non-transitory digital storage medium having a computer program stored thereon to perform any of the inventive methods when said computer program is run by a computer.

In accordance with a first aspect of the present invention, the inventors of the present application realized that one problem encountered when forming a list of most-probable intra-prediction modes is, that improbable prediction modes take over valuable list positions negatively affecting the coding efficiency and increasing the likelihood for a situation where the intra-prediction mode to be finally used for predicting a predetermined block is not within this list. According to the first aspect of the present application, this difficulty is overcome by forming the list of most-probable intra-prediction modes based on already predicted neighbouring blocks neighbouring the predetermined block. Thus unlikely intra-prediction modes can be omitted. A high probability for a similar intra-prediction mode for the predetermined block as the intra-prediction modes of the neighbouring blocks can be expected. Especially, the list is free of a DC intra-prediction mode in case of at least one of the neighbouring blocks being predicted by any angular intra-prediction mode. This enables the list of most-probable intra-prediction modes with a high variety of angular intra-prediction modes increasing the likelihood for the intra-prediction mode to be used for the predetermined block being in the list. Furthermore, matrix-based intra-prediction modes form a separate second set of intra-prediction modes, for example, not considered for the list of most-probable intra-prediction modes and thus not competing with the intra-prediction modes of the first set of intra-prediction modes for a position in the list of most-probable intra-prediction modes.

Accordingly, in accordance with a first aspect of the present application, an apparatus for decoding a predetermined block of a picture using intra-prediction, is configured to derive a set-selective syntax element from the data stream which indicates whether the predetermined block is to be predicted using one of a first set of intra-prediction modes comprising a DC intra prediction mode and angular prediction modes. Optionally, the first set of intra-prediction modes can additionally or alternatively to the DC intra-prediction mode comprise a planar intra-prediction mode. If the set-selective syntax element indicates that the predetermined block is to be predicted using one of the first set of intra-prediction modes, the apparatus is configured to form a list of most probable intra-prediction modes on the basis of intra-prediction modes using when neighbouring blocks neighbouring the predetermined block are predicted, derive a MPM (i.e. most-probable-mode) list index from the data stream which points into the list of most probable intra-prediction modes onto a predetermined intra-prediction mode and intra-predict the predetermined block using the predetermined intra-prediction mode. In other words, in this case the apparatus is configured to form a list of most probable intra-prediction modes on the basis of intra-prediction modes used for a prediction of neighbouring blocks neighbouring the predetermined block. If the set-selective syntax element indicates that the predetermined block is not to be predicted using one of the first set of intra-prediction modes, the apparatus is configured to derive a further index from the data stream which indicates a predetermined matrix-based intra-prediction mode out of a second set of matrix-based intra-prediction modes, i.e. a second set of intra-prediction modes comprising matrix-based intra-prediction modes, i.e. block-based intra-prediction modes, by computing a matrix-vector product between a vector derived from reference samples in a neighbourhood of the predetermined block and a predetermined prediction matrix associated with the predetermined matrix-based intra-prediction mode so as to obtain a prediction vector, and predicting samples of the predetermined block on the basis of the prediction vector. In this case, the prediction is, for example, similar or equal to the ALWIP-prediction described with regard to an embodiment of FIGS. 5 to 11. The apparatus is configured perform the formation of the list of most probable intra-prediction modes on the basis of intra-prediction modes using when neighbouring blocks neighbouring the predetermined block are predicted such that the list of most probable intra-prediction modes is free of the DC intra prediction mode in case of the neighbouring blocks being predicted by any of the angular intra prediction modes. In other words, the apparatus is configured perform the formation of the list of most probable intra-prediction modes on the basis of intra-prediction modes using when neighbouring blocks neighbouring the predetermined block are predicted such that the list of most probable intra-prediction modes is free of the DC intra prediction mode in case of the neighbouring blocks exclusively being predicted by any of the angular intra prediction modes. Thus the DC intra-prediction mode does not occupy a position in the list of most probable intra-prediction modes, if the chances are small, that the DC intra-prediction mode is chosen for the predetermined block.

With this apparatus an advantageous and efficient way for determining the intra-prediction mode for the predetermined block is introduced. Especially an advantageous analysis of the prediction of neighbouring blocks neighbouring the predetermined block for the forming of the list of most-probable intra-prediction modes is presented, wherein the neighbouring blocks are already predicted.

According to an embodiment, the apparatus is configured perform the formation of the list of most probable intra-prediction modes on the basis of intra-prediction modes using when neighbouring blocks neighbouring the predetermined block are predicted such that the list of most probable intra-prediction modes is populated with the DC intra-prediction mode only in case of, for each of the neighboring blocks, the respective neighbouring block predicted using any of at least one non-angular intra-prediction modes with the first set, which comprise the DC intra-prediction mode, or predicted using any of block-based intra-prediction modes which, by way of a mapping from the second set of block-based intra-prediction modes onto the intra-prediction modes within the first set, which is used for the formation of the list of most probable intra-prediction modes, is mapped onto any of the at least one non-angular intra-prediction modes. In other words, the list of most probable intra-prediction modes comprises the DC intra-prediction mode in case of a prediction of all neighboring blocks, e.g., both neighboring blocks, using any of at least one non-angular intra-prediction modes of the first set of intra-prediction modes. Alternatively, the list of most probable intra-prediction modes comprises the DC intra-prediction mode in case of a prediction of all neighboring blocks, e.g., both neighboring blocks, using any of the block-based intra-prediction modes of the second set of intra-prediction modes, wherein the block-based intra-prediction mode is mapped from the second set of block-based intra-prediction modes onto non-angular intra-prediction modes within the first set. According to an embodiment, the apparatus is configured to position the DC intra-prediction mode before any angular intra-prediction mode in the list of most probable intra-prediction modes. This is based on the idea, that in the cases described above the DC intra-prediction mode is the most likely mode for the predetermined block, whereby this positioning increases the coding efficiency.

According to an embodiment, the apparatus is configured to derive an MPM syntax element from the data stream and form the list of most-probable intra-prediction modes only in case of the MPM syntax element indicating that the predetermined intra-prediction mode of the first set of intra-prediction modes is within the list of most-probable intra-prediction modes. With this feature a coding efficiency is increased, since the list of most-probable intra-prediction modes is only formed when needed or advantageous.

If the predetermined block is to be predicted using one of the second set of intra-prediction modes, the apparatus is, according to an embodiment, configured to form a list of most-probable block-based intra-prediction modes. In this case, the apparatus is, for example configured to derive a further MPM list index from the data stream which points into the list of most-probable block-based intra-prediction modes onto the predetermined matrix-based intra-prediction mode, i.e. a predetermined block-based intra-prediction mode. Optionally this list of most-probable block-based intra-prediction modes is only formed, if a further MPM syntax element derived from the data stream indicates, that the predetermined block-based intra-prediction mode is within the list of most-probable block-based intra-prediction modes.

Thus the apparatus is, for example, configured to form a different MPM-list for the first set of intra-prediction modes and the second set of intra-prediction modes. The list of most probable intra-prediction modes comprises, for example, intra-prediction modes of the first set of intra-prediction modes and the list of most probable block-based intra-prediction modes comprises, for example, intra-prediction modes of the second set of intra-prediction modes, i.e. second set of block-based intra-prediction modes. This makes it possible, that block-based intra-prediction modes do not need to compete against, the intra-prediction modes of the first set of intra-prediction modes, e.g., the DC intra prediction mode and angular prediction modes, for positions in an overall MPM-list. With this separation it is more likely, that the intra-prediction mode for the predetermined block is actually in the respective MPM-list.

An embodiment is related to an apparatus for encoding a predetermined block of a picture using intra-prediction, configured to signal a set-selective syntax element in a data stream which indicates whether the predetermined block is to be predicted using one of a first set of intra-prediction modes comprising a DC intra prediction mode and angular prediction modes. Optionally, the first set of intra-prediction modes can additionally or alternatively to the DC intra-prediction mode comprise a planar intra-prediction mode. If the set-selective syntax element indicates that the predetermined block is to be predicted using one of the first set of intra-prediction modes, the apparatus is configured to form a list of most probable intra-prediction modes on the basis of intra-prediction modes using when neighbouring blocks neighbouring the predetermined block are predicted, signal a MPM list index in the data stream which points into the list of most probable intra-prediction modes onto a predetermined intra-prediction mode and intra-predict the predetermined block using the predetermined intra-prediction mode. In other words, in this case the apparatus is configured to form a list of most probable intra-prediction modes on the basis of intra-prediction modes used for a prediction of neighbouring blocks neighbouring the predetermined block. If the set-selective syntax element indicates that the predetermined block is not to be predicted using one of the first set of intra-prediction modes, the apparatus is configured to signal a further index in the data stream which indicates a predetermined matrix-based intra-prediction mode out of a second set of matrix-based intra-prediction modes, i.e. a second set of intra-prediction modes comprising matrix-based intra-prediction modes, i.e. block-based intra-prediction modes, by computing a matrix-vector product between a vector derived from reference samples in a neighbourhood of the predetermined block and a predetermined prediction matrix associated with the predetermined matrix-based intra-prediction mode so as to obtain a prediction vector and predicting samples of the predetermined block on the basis of the prediction vector. In this case, the prediction is, for example, similar or equal to the ALWIP-prediction described with regard to an embodiment of FIGS. 5 to 11. The list of most probable intra-prediction modes is formed on the basis of intra-prediction modes using when neighbouring blocks neighbouring the predetermined block are predicted such that the list of most probable intra-prediction modes is free of the DC intra prediction mode in case of the neighbouring blocks being predicted by any of the angular intra prediction modes. In other words, the list of most probable intra-prediction modes is formed on the basis of intra-prediction modes using when neighbouring blocks neighbouring the predetermined block are predicted such that the list of most probable intra-prediction modes is free of the DC intra prediction mode in case of the neighbouring blocks exclusively being predicted by any of the angular intra prediction modes.

An embodiment is related to method for decoding a predetermined block of a picture using intra-prediction, comprising deriving a set-selective syntax element from the data stream which indicates whether the predetermined block is to be predicted using one of a first set of intra-prediction modes comprising a DC intra prediction mode and angular prediction modes. If the set-selective syntax element indicates that the predetermined block is to be predicted using one of the first set of intra-prediction modes, the method comprises forming a list of most probable intra-prediction modes on the basis of intra-prediction modes using when neighbouring blocks neighbouring the predetermined block are predicted, deriving a MPM list index from the data stream which points into the list of most probable intra-prediction modes onto a predetermined intra-prediction mode, and intra-predicting the predetermined block using the predetermined intra-prediction mode. If the set-selective syntax element indicates that the predetermined block is not to be predicted using one of the first set of intra-prediction modes, the method comprises deriving a further index from the data stream which indicates a predetermined matrix-based intra-prediction mode out of a second set of matrix-based intra-prediction modes by computing a matrix-vector product between a vector derived from reference samples in a neighbourhood of the predetermined block and a predetermined prediction matrix associated with the predetermined matrix-based intra-prediction mode so as to obtain a prediction vector, and predicting samples of the predetermined block on the basis of the prediction vector. The list of most probable intra-prediction modes is formed on the basis of intra-prediction modes using when neighbouring blocks neighbouring the predetermined block are predicted such that the list of most probable intra-prediction modes is free of the DC intra prediction mode in case of the neighbouring blocks being predicted by any of the angular intra prediction modes. In other words, the list of most probable intra-prediction modes is formed on the basis of intra-prediction modes using when neighbouring blocks neighbouring the predetermined block are predicted such that the list of most probable intra-prediction modes is free of the DC intra prediction mode in case of the neighbouring blocks exclusively being predicted by any of the angular intra prediction modes.

An embodiment is related to a method for encoding a predetermined block of a picture using intra-prediction, comprising signaling a set-selective syntax element in a data stream which indicates whether the predetermined block is to be predicted using one of a first set of intra-prediction modes comprising a DC intra prediction mode and angular prediction modes. If the set-selective syntax element indicates that the predetermined block is to be predicted using one of the first set of intra-prediction modes, the method comprises forming a list of most probable intra-prediction modes on the basis of intra-prediction modes using when neighbouring blocks neighbouring the predetermined block are predicted, signaling a MPM list index in the data stream which points into the list of most probable intra-prediction modes onto a predetermined intra-prediction mode and intra-predicting the predetermined block using the predetermined intra-prediction mode. If the set-selective syntax element indicates that the predetermined block is not to be predicted using one of the first set of intra-prediction modes, the method comprises signaling a further index in the data stream which indicates a predetermined matrix-based intra-prediction mode out of a second set of matrix-based intra-prediction modes by computing a matrix-vector product between a vector derived from reference samples in a neighbourhood of the predetermined block and a predetermined prediction matrix associated with the predetermined matrix-based intra-prediction mode so as to obtain a prediction vector, and predicting samples of the predetermined block on the basis of the prediction vector. The list of most probable intra-prediction modes is formed on the basis of intra-prediction modes using when neighbouring blocks neighbouring the predetermined block are predicted such that the list of most probable intra-prediction modes is free of the DC intra prediction mode in case of the neighbouring blocks being predicted by any of the angular intra prediction modes. In other words, the list of most probable intra-prediction modes is formed on the basis of intra-prediction modes using when neighbouring blocks neighbouring the predetermined block are predicted such that the list of most probable intra-prediction modes is free of the DC intra prediction mode in case of the neighbouring blocks exclusively being predicted by any of the angular intra prediction modes.

An embodiment is related to a data stream having a picture encoded thereinto using a herein described method for encoding.

An embodiment is related to a computer program having a program code for performing, when running on a computer, a herein described method.

BRIEF DESCRIPTION OF THE DRAWINGS

Embodiments of the present invention will be detailed subsequently referring to the appended drawings, in which:

FIG. 7.1 shows a prediction of a block with a reduced sample value vector according to an embodiment;

FIG. 7.2 shows a prediction of a block using an interpolation of samples according to an embodiment;

FIG. 7.3 shows a prediction of a block with a reduced sample value vector, wherein only some boundary samples are averaged, according to an embodiment;

FIG. 7.4 shows a prediction of a block with a reduced sample value vector, wherein groups of four boundary samples are averaged, according to an embodiment;

FIG. 9a-c show detailed matrix operations performed by an apparatus according to an embodiment;

FIG. 10 shows detailed matrix operations performed by an apparatus using offset and scaling parameters, according to an embodiment;

FIG. 11 shows detailed matrix operations performed by an apparatus using offset and scaling parameters, according to a different embodiment;

FIGS. 13B-13G show exemplary pseudo code for a syntax element portion of a data stream according to an embodiment;

DETAILED DESCRIPTION OF THE INVENTION

Figure 1:
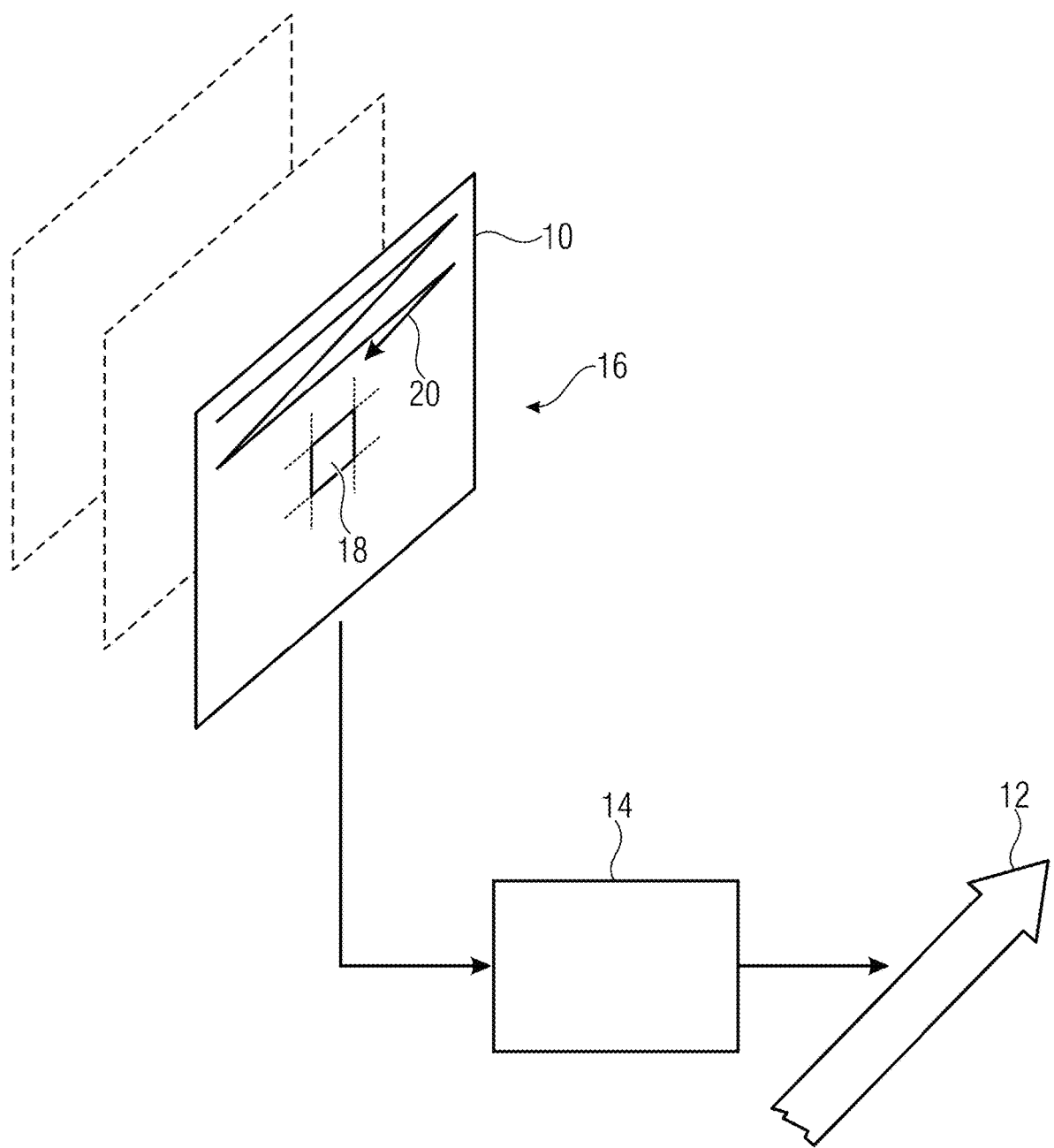
FIG. 1 shows an embodiment of an encoding into a data stream.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

1 INTRODUCTION

In the following, different inventive examples, embodiments and aspects will be described. At least some of these examples, embodiments and aspects refer, inter alia, to methods and/or apparatus for video coding and/or for performing intra Predictions e.g. using linear or affine transforms with neighbouring sample reduction and/or for optimizing video delivery (e.g., broadcast, streaming, file playback, etc.), e.g., for video applications and/or for virtual reality applications.

Further, examples, embodiments and aspects may refer to High Efficiency Video Coding (HEVC) or successors. Also, further embodiments, examples and aspects will be defined by the enclosed claims.

It should be noted that any embodiments, examples and aspects as defined by the claims can be supplemented by any of the details (features and functionalities) described in the following chapters.

Also, the embodiments, examples and aspects described in the following chapters can be used individually, and can also be supplemented by any of the features in another chapter, or by any feature included in the claims.

Also, it should be noted that individual, examples, embodiments and aspects described herein can be used individually or in combination. Thus, details can be added to each of said individual aspects without adding details to another one of said examples, embodiments and aspects.

It should also be noted that the present disclosure describes, explicitly or implicitly, features of decoding and/or encoding system and/or method.

Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Moreover, any of the features described in parentheses ("( . . . )" or "[ . . . ]") may be considered as optional in some examples, embodiments, or aspects.

2 ENCODERS, DECODERS

In the following, various examples are described which may assist in achieving a more effective compression when using block-based prediction. Some examples achieve high compression efficiency by spending a set of intra-prediction modes. The latter ones may be added to other intra-prediction modes heuristically designed, for instance, or may be provided exclusively. And even other examples make use of both of the just-discussed specialties. As a vibration of these embodiments it may be, however, that intra prediction is turned into an inter prediction by using reference samples in another picture instead.

In order to ease the understanding of the following examples of the present application, the description starts with a presentation of possible encoders and decoders fitting thereto into which the subsequently outlined examples of the present application could be built. FIG. 1 shows an apparatus for block-wise encoding a picture 10 into a datastream 12. The apparatus is indicated using reference sign 14 and may be a still picture encoder or a video encoder. In other words, picture 10 may be a current picture out of a video 16 when the encoder 14 is configured to encode video 16 including picture 10 into datastream 12, or encoder 14 may encode picture 10 into datastream 12 exclusively.

As mentioned, encoder 14 performs the encoding in a block-wise manner or block-base. To this, encoder 14 subdivides picture 10 into blocks, units of which encoder 14 encodes picture 10 into datastream 12. Examples of possible subdivisions of picture 10 into blocks 18 are set out in more detail below. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into datastream 12. For a certain block 18 this means that encoder 14 determines a prediction signal for block 18 and encodes the prediction residual, i.e. the prediction error at which the prediction signal deviates from the actual picture content within block 18, into datastream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf nodes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support inter-prediction modes according to which a block 18 is temporarily predicted from a previously encoded picture of video 16. Such an inter-prediction mode may be a motion-compensated prediction mode according to which a motion vector is signaled for such a block 18 indicating a relative spatial offset of the portion from which the prediction signal of block 18 is to be derived as a copy. Additionally, or alternatively, other non-intra-prediction modes may be available as well such as inter-prediction modes in case of encoder 14 being a multi-view encoder, or non-predictive modes according to which the inner of block 18 is coded as is, i.e. without any prediction.

Figure 2:
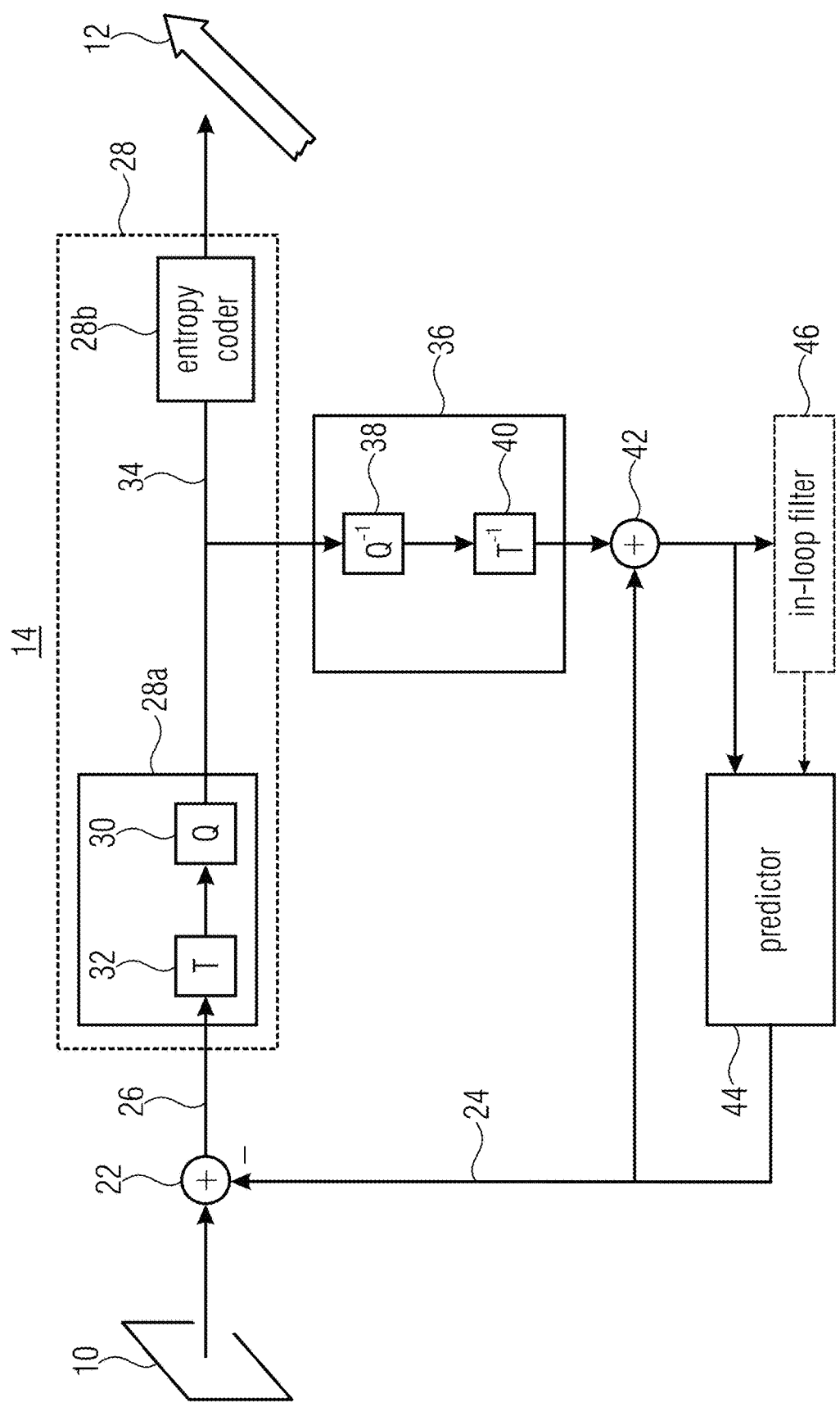
FIG. 2 shows an embodiment of an encoder.

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
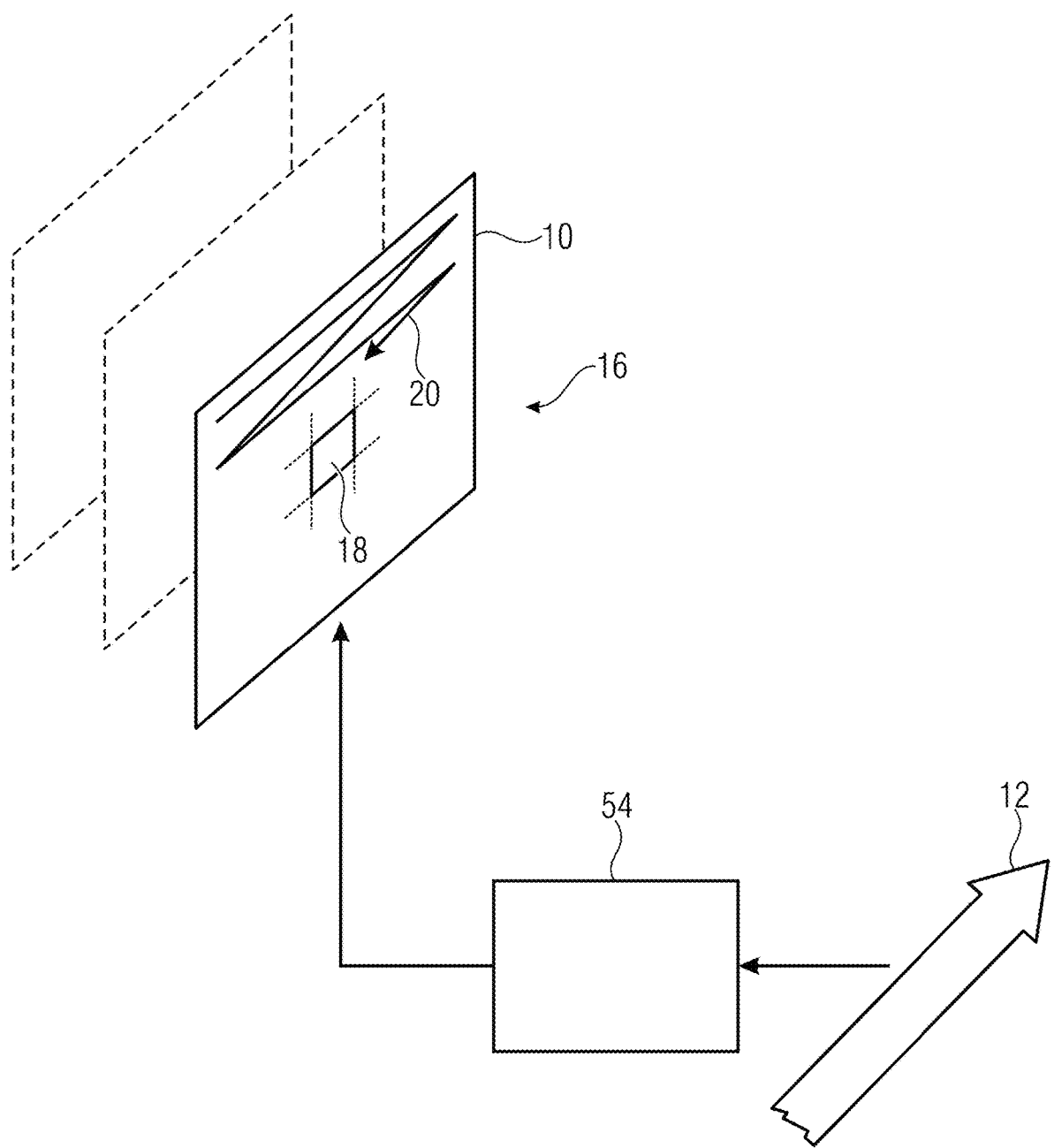
FIG. 3 shows an embodiment of a reconstruction of a picture.

A decoder 54 or apparatus for block-wise decoding fitting to the encoder 14 of FIG. 1 is depicted in FIG. 3. This decoder 54 does the opposite of encoder 14, i.e. it decodes from datastream 12 picture 10 in a block-wise manner and supports, to this end, a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within datastream 12 with decoder 54 redoing the selection using this signalization in datastream 12 for block 18. Likewise, the subdivisioning of picture 10 into blocks 18 may be subject to optimization within encoder 14 and corresponding subdivision information may be conveyed within datastream 12 with decoder 54 recovering the subdivision of picture 10 into blocks 18 on the basis of the subdivision information. Summarizing the above, decoder 54 may be a predictive decoder operating on a block-basis and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, datastream 12 the coding parameters which are then derived from the datastream 12 by decoder 54 so as to redo the prediction, subdivision and so forth.

Figure 4:
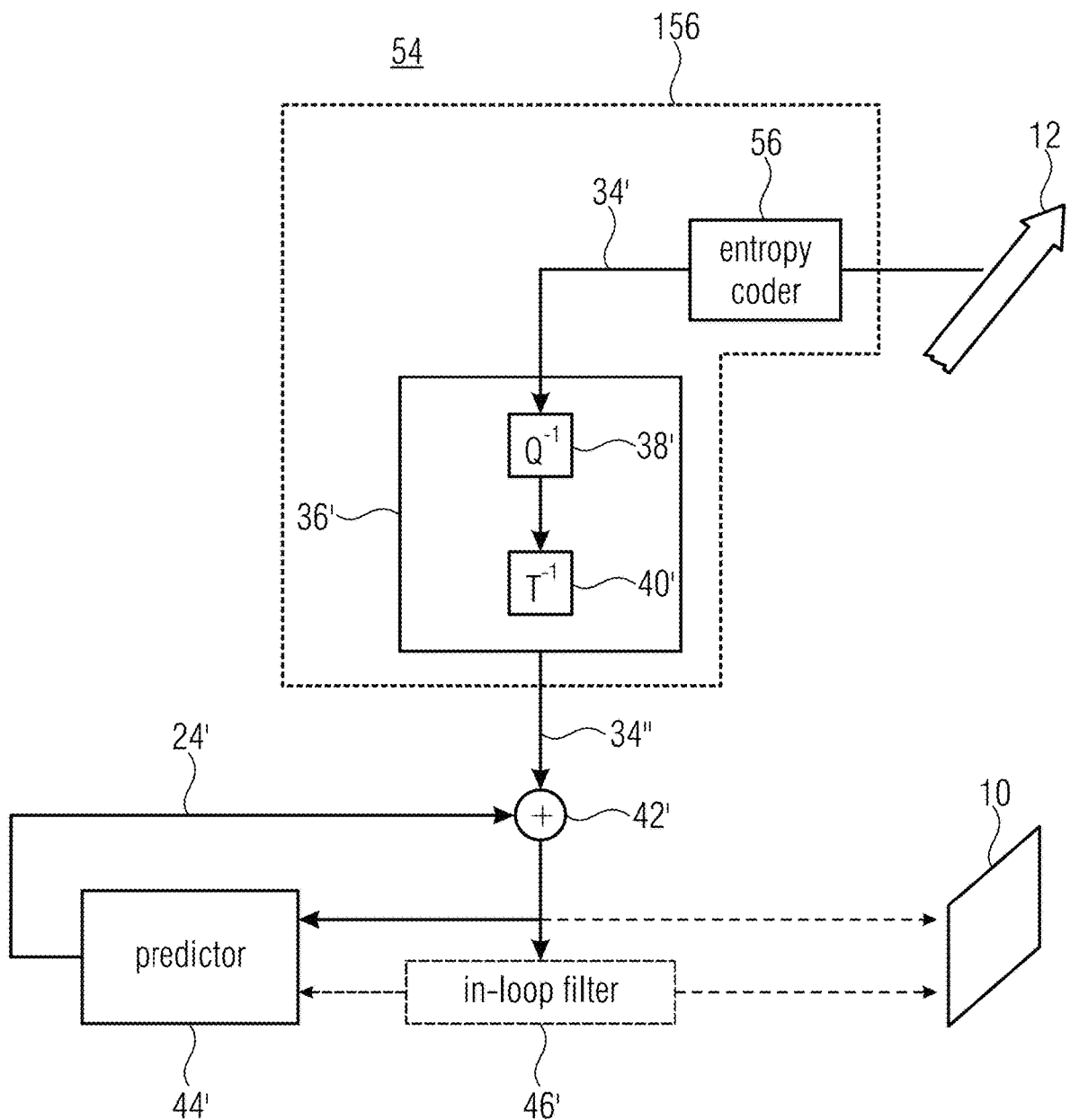
FIG. 4 shows an embodiment of a decoder.

FIG. 4 shows a possible implementation of the decoder 54 of FIG. 3, namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to adder 42' is derived by a sequence of entropy decoder 56 which inverses the entropy encoding of entropy encoder 28b, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

3 ALWIP (AFFINE LINEAR WEIGHTED INTRA PREDICTOR)

Some non-limiting examples regarding ALWIP are herewith discussed, even if ALWIP is not needed to embody the techniques discussed here.

The present application is concerned, inter alia, with an improved block-based prediction mode concept for block-wise picture coding such as usable in a video codec such as HEVC or any successor of HEVC. The prediction mode may be an intra prediction mode, but theoretically the concepts described herein may be transferred onto inter prediction modes as well where the reference samples are part of another picture.

A block-based prediction concept allowing for an efficient implementation such as a hardware friendly implementation is sought.

This object is achieved by the subject-matter of the independent claims of the present application. Intra-prediction modes are widely used in picture and video coding. In video coding, intra-prediction modes compete with other prediction modes such as inter-prediction modes such as motion-compensated prediction modes. In intra-prediction modes, a current block is predicted on the basis of neighboring samples, i.e. samples already encoded as far as the encoder side is concerned, and already decoded as far as the decoder side is concerned. Neighboring sample values are extrapolated into the current block so as to form a prediction signal for the current block with the prediction residual being transmitted in the datastream for the current block. The better the prediction signal is, the lower the prediction residual is and, accordingly, a lower number of bits is needed to code the prediction residual.

In order to be effective, several aspects should be taken into account in order to form an effective frame work for intra-prediction in a block-wise picture coding environment. For instance, the larger the number of intra-prediction modes supported by the codec, the larger the side information rate consumption is in order to signal the selection to the decoder. On the other hand, the set of supported intra-prediction modes should be able to provide a good prediction signal, i.e. a prediction signal resulting in a low prediction residual.

In the following, there is disclosed—as a comparison embodiment or basis example—an apparatus (encoder or decoder) for block-wise decoding a picture from a data stream, the apparatus supporting at least one intra-prediction mode according to which the intra-prediction signal for a block of a predetermined size of the picture is determined by applying a first template of samples which neighbours the current block onto an affine linear predictor which, in the sequel, shall be called Affine Linear Weighted Intra Predictor (ALWIP).

The apparatus may have at least one of the following properties (the same may apply to a method or to another technique, e.g. implemented in a non-transitory storage unit storing instructions which, when executed by a processor, cause the processor to implement the method and/or to operate as the apparatus):

3.1 Predictors May be Complementary to Other Predictors

The intra-prediction modes which might form the subject of the implementational improvements described further below may be complementary to other intra prediction modes of the codec. Thus, they may be complementary to the DC-, Planar-, or Angular-Prediction modes defined in the HEVC codec resp. the JEM reference software. The latter three types of intra-prediction modes shall be called conventional intra prediction modes from now on. Thus, for a given block in intra mode, a flag needs to be parsed by the decoder which indicates whether one of the intra-prediction modes supported by the apparatus is to be used or not.

3.2 More than One Proposed Prediction Modes

The apparatus may contain more than one ALWIP mode. Thus, in case that the decoder knows that one of the ALWIP modes supported by the apparatus is to be used, the decoder needs to parse additional information that indicates which of the ALWIP modes supported by the apparatus is to be used.

The signalization of the mode supported may have the property that the coding of some ALWIP modes may need less bins than other ALWIP modes. Which of these modes need less bins and which modes need more bins may either depend on information that can be extracted from the already decoded bitstream or may be fixed in advance.

4 SOME ASPECTS

FIG. 2 shows the decoder 54 for decoding a picture from a data stream 12. The decoder 54 may be configured to decode a predetermined block 18 of the picture. In particular, the predictor 44 may be configured for mapping a set of P neighboring samples neighboring the predetermined block 18 using a linear or affine linear transformation [e.g., ALWIP] onto a set of Q predicted values for samples of the predetermined block.

Figure 5:
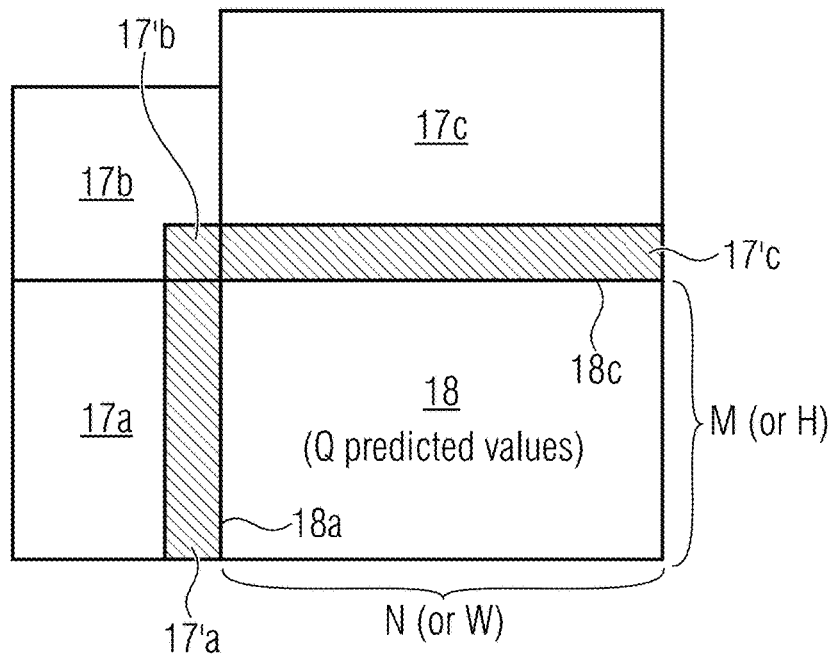
FIG. 5 shows schematic diagram of a prediction of a block for encoding and/or decoding, according to an embodiment.

As shown in FIG. 5, a predetermined block 18 comprises Q values to be predicted (which, at the end of the operations, will be "predicted values"). If the block 18 has M row and N columns, Q=M·N. The Q values of the block 18 may be in the spatial domain (e.g., pixels) or in the transform domain (e.g., DCT, Discrete Wavelet Transform, etc.). The Q values of the block 18 may be predicted on the basis of P values taken from the neighboring blocks 17a-17c, which are in general adjacent to the block 18. The P values of the neighboring blocks 17a-17c may be in the closest positions (e.g., adjacent) to the block 18. The P values of the neighboring blocks 17a-17c have already been processed and predicted. The P values are indicated as values in portions 17'a-17'c, to distinguish them from the blocks they are part of (in some examples, 17'b is not used).

Figure 6:
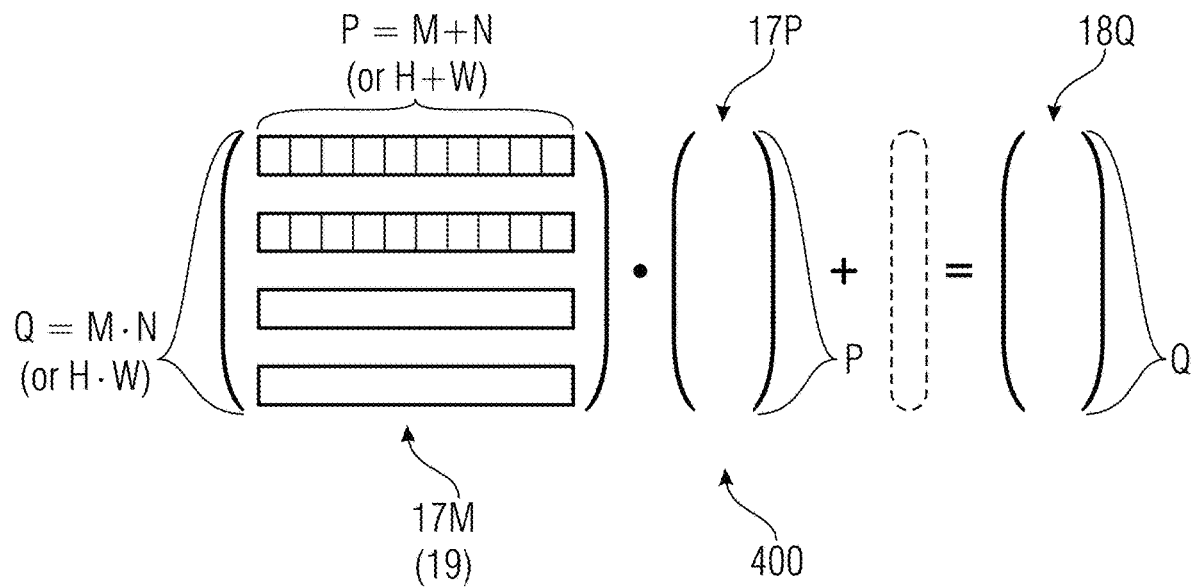
FIG. 6 shows a matrix operation for a prediction of a block for encoding and/or decoding according to an embodiment.

As shown in FIG. 6, in order to perform the prediction, it is possible to operate with a first vector 17P with P entries (each entry being associated to a particular position in the neighboring portions 17'a-17'c), a second vector 18Q with Q entries (each entry being associated with a particular position in the block 18), and a mapping matrix 17M (each row being associated to a particular position in the block 18, each column being associated to a particular position in the neighboring portions 17'a-17'c). The mapping matrix 17M therefore performs the prediction of the P values of the neighboring portions 17'a-17'c into values of the block 18 according to a predetermined mode. The entries in the mapping matrix 17M may be therefore understood as weighting factors. In the following passages, we will refer to the neighboring portions of the boundary using the signs 17a-17c instead of 17'a-17'c.

In the art there are known several conventional modes, such as DC mode, planar mode and 65 directional prediction modes. There may be known, for example, 67 modes.

However, it has been noted that it is also possible to make use of different modes, which are here called linear or affine linear transformations. The linear or affine linear transformation comprises P·Q weighting factors, among which at least ¼ P·Q weighting factors are non-zero weighting values, which comprise, for each of the Q predicted values, a series of P weighting factors relating to the respective predicted value. The series, when being arranged one below the other according to a raster scan order among the samples of the predetermined block, form an envelope which is omnidirectionally non-linear.

It is possible to map the P positions of the neighboring values 17'a-17'c (template), the Q positions of the neighboring samples 17'a-17'c, and at the values of the P*Q weighting factors of the matrix 17M. A plane is an example of the envelope of the series for a DC transformation (which is a plane for the DC transformation). The envelope is evidently planar and therefore is excluded by the definition of the linear or affine linear transformation (ALWIP). Another example is a matrix resulting in an emulation of an angular mode: an envelope would be excluded from the ALWIP definition and would, frankly speaking, look like a hill leading obliquely from top to bottom along a direction in the P/Q plane. The planar mode and the 65 directional prediction modes would have different envelopes, which would however be linear in at least one direction, namely all directions for the exemplified DC, for example, and the hill direction for an angular mode, for example.

To the contrary, the envelope of the linear or affine transformation will not be omnidirectionally linear. It has been understood that such kind of transformation may be optimal, in some situations, for performing the prediction for the block 18. It has been noted that it is advantageous that at least ¼ of the weighting factors are different from zero (i.e., at least the 25% of the P*Q weighting factors are different from 0).

The weighting factors may be unrelated with each other according to any regular mapping rule. Hence, a matrix 17M may be such that the values of its entries have no apparent recognizable relationship. For example, the weighting factors cannot be described by any analytical or differential function.

In examples, an ALWIP transformation is such that a mean of maxima of cross correlations between a first series of weighting factors relating to the respective predicted value, and a second series of weighting factors relating to predicted values other than the respective predicted value, or a reversed version of the latter series, whatever leads to a higher maximum, may be lower than a predetermined threshold (e.g., 0.2 or 0.3 or 0.35 or 0.1, e.g., a threshold in a range between 0.05 and 0.035). For example, for each couple $(i_1, i_2)$ of rows of the ALWIP matrix 17M, a cross correlation may be calculated by multiplying the P values of the $i_1^{th}$ row with by the P values of the $i_2^{th}$ row. For each obtained cross correlation, the maximum value may be obtained. Hence, a mean (average) may be obtained for the whole matrix 17M (i.e. the maxima of the cross correlations in all combinations are averaged). After that, the threshold may be e.g., 0.2 or 0.3 or 0.35 or 0.1, e.g., a threshold in a range between 0.05 and 0.035.

The P neighboring samples of blocks 17a-17c may be located along a one-dimensional path extending along a border (e.g., 18c, 18a) of the predetermined block 18. For each of the Q predicted values of the predetermined block 18, the series of P weighting factors relating to the respective predicted value may be ordered in a manner traversing the one-dimensional path in a predetermined direction (e.g., from left to right, from top to down, etc.).

In examples, the ALWIP matrix 17M may be non-diagonal or non-block diagonal.

An example of ALWIP matrix 17M for predicting a 4×4 block 18 from 4 already predicted neighboring samples may be:

```
{
 {37, 59, 77, 28},
 {32, 92, 85, 25},
 {31, 69,100, 24},
 {33, 36, 106, 29},
 {24, 49, 104, 48},
 {24, 21, 94, 59},
 {29, 0, 80, 72},
 {35, 2, 66, 84},
 {32, 13, 35, 99},
 {39, 11, 34,103},
 {45, 21, 34,106},
 {51, 24, 40,105},
 {50, 28, 43,101},
 {56, 32, 49,101},
 {61, 31, 53,102},
 {61, 32, 54,100}
}.
```

(Here, {37, 59, 77, 28} is the first row; {32, 92, 85, 25} is the second row; and {61, 32, 54, 100} is the $16^{th}$ row of the matrix 17M.) Matrix 17M has dimension 16×4 and includes 64 weighting factors (as a consequence of 16*4=64). This is because matrix 17M has dimension Q×P, where Q=M*N, which is the number of samples of the block 18 to be predicted (block 18 is a 4×4 block), and P is the number of samples of the already predicted samples. Here, M=4, N=4, Q=16 (as a consequence of M*N=4*4=16), P=4. The matrix is non-diagonal and non-block diagonal, and is not described by a particular rule.

As can be seen, less than ¼ of the weighting factors are 0 (in the case of the matrix shown above, one weighting factor out of sixty-four is zero). The envelope formed by these values, when arranged one below the other one according to a raster scan order, form an envelope which is omnidirectionally non-linear.

Even if the explanation above is mainly discussed with reference to a decoder (e.g., the decoder 54), the same may be performed at the encoder (e.g., encoder 14).

In some examples, for each block size (in the set of block sizes), the ALWIP transformations of intra-prediction modes within the second set of intra-prediction modes for the respective block size are mutually different. In addition, or alternatively, a cardinality of the second set of intra-prediction modes for the block sizes in the set of block sizes may coincide, but the associated linear or affine linear transformations of intra-prediction modes within the second set of intra-prediction modes for different block sizes may be non-transferable onto each other by scaling.

In some examples the ALWIP transformations may be defined in such a way that they have "nothing to share" with conventional transformations (e.g., the ALWIP transformations may have "nothing" to share with the corresponding conventional transformations, even though they have been mapped via one of the mappings above).

In examples, ALWIP modes are used for both luma components and chroma components, but in other examples ALWIP modes are used for luma components but are not used for chroma components.

5 AFFINE LINEAR WEIGHTED INTRA PREDICTION MODES WITH ENCODER SPEEDUP (E.G., TEST CE3-1.2.1)

5.1 Description of a Method or Apparatus

Affine linear weighted intra prediction (ALWIP) modes tested in CE3-1.2.1 may be the same as proposed in JVET-L0199 under test CE3-2.2.2, except for the following changes:

Harmonization with multiple reference line (MRL) intra prediction, especially encoder estimation and signaling, i.e. MRL is not combined with ALWIP and transmitting an MRL index is restricted to non-ALWIP blocks.

Subsampling now mandatory for all blocks W×H≥32×32 (was optional for 32×32 before); therefore, the additional test at the encoder and sending the subsampling flag has been removed.

ALWIP for 64×N and N×64 blocks (with N≤32) has been added by downsampling to 32×N and N×32, respectively, and applying the corresponding ALWIP modes.

Moreover, test CE3-1.2.1 includes the following encoder optimizations for ALWIP:

Combined mode estimation: conventional and ALWIP modes use a shared Hadamard candidate list for full RD estimation, i.e. the ALWIP mode candidates are added to the same list as the conventional (and MRL) mode candidates based on the Hadamard cost.

EMT intra fast and PB intra fast are supported for the combined mode list, with additional optimizations for reducing the number of full RD checks.

Only MPMs of available left and above blocks are added to the list for full RD estimation for ALWIP, following the same approach as for conventional modes.

5.2 Complexity Assessment

In Test CE3-1.2.1, excluding computations invoking the Discrete Cosine Transform, at most 12 multiplications per sample were needed to generate the prediction signals. Moreover, a total number of 136 492 parameters, each in 16 bits, were needed. This corresponds to 0.273 Megabyte of memory.

5.3 Experimental Results

Evaluation of the test was performed according to the common test conditions JVET-J1010 [2], for the intra-only (AI) and random-access (RA) configurations with the VTM software version 3.0.1. The corresponding simulations were conducted on an Intel Xeon cluster (E5-2697Av4, AVX2 on, turbo boost off) with Linux OS and GCC 7.2.1 compiler.

TABLE 1

Result of CE3-1.2.1 for VTM AI configuration

|  | Y | U | V | enc time | dec time |
|---|---|---|---|---|---|
| Class A1 | −2.08% | −1.68% | −1.60% | 155% | 104% |
| Class A2 | −1.18% | −0.90% | −0.84% | 153% | 103% |
| Class B | −1.18% | −0.84% | −0.83% | 155% | 104% |
| Class C | −0.94% | −0.63% | −0.76% | 148% | 106% |
| Class E | −1.71% | −1.28% | −1.21% | 154% | 106% |
| Overall | −1.36% | −1.02% | −1.01% | 153% | 105% |
| Class D | −0.99% | −0.61% | −0.76% | 145% | 107% |
| Class F (optional) | −1.38% | −1.23% | −1.04% | 147% | 104% |

TABLE 2

Result of CE3-1.2.1 for VTM RA configuration

|  | Y | U | V | enc time | dec time |
|---|---|---|---|---|---|
| Class A1 | −1.25% | −1.80% | −1.95% | 113% | 100% |
| Class A2 | −0.68% | −0.54% | −0.21% | 111% | 100% |
| Class B | −0.82% | −0.72% | −0.97% | 113% | 100% |
| Class C | −0.70% | −0.79% | −0.82% | 113% | 99% |
| Class E |  |  |  |  |  |
| Overall | −0.85% | −0.92% | −0.98% | 113% | 100% |
| Class D | −0.65% | −1.06% | −0.51% | 113% | 102% |
| Class F (optional) | −1.07% | −1.04% | −0.96% | 117% | 99% |

5.4 Affine Linear Weighted Intra Prediction with Complexity Reduction (e.g. Test CE3-1.2.2)

The technique tested in CE2 is related to "Affine Linear Intra Predictions" described in JVET-L0199 [1], but simplifies it in terms of memory requirements and computational complexity:

There may be only three different sets of prediction matrices (e.g. $S_0$, $S_1$, $S_2$, see also below) and bias vectors (e.g. for providing offset values) covering all block shapes. As a consequence, the number of parameters is reduced to 14400 10-bit values, which is less memory than stored in a 128×128 CTU.

The input and output size of the predictors is further reduced. Moreover, instead of transforming the boundary via DCT, averaging or downsampling may be performed to the boundary samples and the generation of the prediction signal may use linear interpolation instead of the inverse DCT. Consequently, a maximum of four multiplications per sample may be needed for generating the prediction signal.

6. EXAMPLES

It is here discussed how to perform some predictions (e.g., as shown in FIG. 6) with ALWIP predictions.

In principle, with reference to FIG. 6, in order to obtain the Q=M*N values of a M×N block 18 to be predicted, multiplications of the Q*P samples of the Q×P ALWIP prediction matrix 17M by the P samples of the P×1 neighboring vector 17P should be performed. Hence, in general, in order to obtain each of the Q=M*N values of the M×N block 18 to be predicted, at least P=M+N value multiplications are needed.

These multiplications have extremely unwanted effects. The dimension P of the boundary vector 17P is in general dependent on the number M+N of boundary samples (bins or pixels) 17a, 17c neighbouring (e.g. adjacent to) the M×N block 18 to be predicted. This means that, if the size of block 18 to be predicted is large, the number M+N of boundary pixels (17a, 17c) is accordingly large, hence increasing the dimension P=M+N of the P×1 boundary vector 17P, and the length of each row of the Q×P ALWIP prediction matrix 17M, and accordingly, also the numbers of multiplications needed (in general terms, Q=M*N=W*H, where W (Width) is another symbol for N and H (Height) is another symbol for M; P, in the case that the boundary vector is only formed by one row and/or one column of samples, is P=M+N=H+W).

This problem is, in general, exacerbated by the fact that in microprocessor-based systems (or other digital processing systems), multiplications are, in general, power-consuming operations. It may be imagined that a large number of multiplications carried for an extremely high number of samples for a large number of blocks causes a waste of computational power, which is in general unwanted.

Accordingly, it would be advantageous to reduce the number Q*P of multiplications needed for predicting the M×N block 18.

It has been understood that it is possible to somehow reduce the computational power needed for each intra-prediction of each block 18 to be predicted by intelligently choosing operations alternative to multiplications and which are easier to be processed.

In particular, with reference to FIGS. 7.1-7.4, it has been understood that an encoder or decoder may predict a predetermined block (e.g. 18) of the picture using a plurality of neighbouring samples (e.g. 17a, 17c), by reducing (e.g. at step 811), (e.g. by averaging or downsampling), the plurality of neighbouring samples (e.g. 17a, 17c) to obtain a reduced set of samples values lower, in number of samples, than compared to the plurality of neighbouring samples, subjecting (e.g. at step 812) the reduced set of sample values to a linear or affine linear transformation to obtain predicted values for predetermined samples of the predetermined block. In some cases, the decoder or encoder may also derive, e.g. by interpolation, prediction values for further samples of the predetermined block on the basis of the predicted values for the predetermined samples and the plurality of neighboring samples. Accordingly, an upsampling strategy may be obtained.

In examples, it is possible to perform (e.g. at step 811) some averages on the samples of the boundary 17, so as to arrive at a reduced set 102 (FIGS. 7.1-7.4) of samples with a reduced number of samples (at least one of the samples of the reduced number of samples 102 may be the average of two samples of the original boundary samples, or a selection of the original boundary samples). For example, if the original boundary has P=M+N samples, the reduced set of samples may have $P_{red}=M_{red}+N_{red}$, with at least one of $M_{red}<M$ and $N_{red}<N$, so that $P_{red}<P$. Hence, the boundary vector 17P which will be actually used for the prediction (e.g. at step 812b) will not have P×1 entries, but $P_{red}×1$ entries, with $P_{red}<P$. Analogously, the ALWIP prediction matrix 17M chosen for the prediction will not have Q×P dimension, but $Q×P_{red}$ (or $Q_{red}×P_{red}$, see below) with a reduced number of elements of the matrix at least because $P_{red}<P$ (by virtue of at least one of $M_{red}<M$ and $N_{red}<N$).

In some examples (e.g. FIGS. 7.2, 7.3), it is even possible to further reduce the number of multiplications, if the block obtained by ALWIP (at step 812) is a reduced block having size $M_{red}'×N_{red}'$, with $M_{red}'<M$ and/or $N_{red}'<N$ (i.e. the samples directly predicted by ALWIP are less in number than the samples of the block 18 to be actually predicted). Thus, setting $Q_{red}=M_{red}'*N_{red}'$, this will bring to obtain an ALWIP prediction by using, instead of $Q*P_{red}$ multiplications, $Q_{red}*P_{red}$ multiplications (with $Q_{red}*P_{red}<Q*P_{red}<Q*P$). This multiplication will predict a reduced block, with dimension $M_{red}'×N_{red}'$. It will be notwithstanding possible to perform (e.g. at a subsequent step 813) an upsampling (e.g., obtained by interpolation) from the reduced $M_{red}'×N_{red}'$ predicted block into the final M×N predicted block.

These techniques may be advantageous since, while the matrix multiplication involves a reduced number ($Q_{red}*P_{red}$ or $Q*P_{red}$) of multiplications, both the initial reducing (e.g., averaging or downsampling) and the final transformation (e.g. interpolation) may be performed by reducing (or even avoiding) multiplications. For example, downsampling, averaging and/or interpolating may be performed (e.g. at steps 811 and/or 813) by adopting non-computationally-power-demanding binary operations such as additions and shifting.

Also, the addition is an extremely easy operation which can be easily performed without much computational effort.

This shifting operation may be used, for example, for averaging two boundary samples and/or for interpolating two samples (support values) of the reduced predicted block (or taken from the boundary), to obtain the final predicted block. (For interpolation two sample values are needed. Within the block we have two predetermined values, but for interpolating the samples along the left and above border of the block we only have one predetermined value, as in FIG. 7.2, therefore we use a boundary sample as a support value for interpolation.)

A two-step procedure may be used, such as:
first summing the values of the two samples;
then halving (e.g., by right-shifting) the value of the sum.
Alternatively, it is possible to:
first halving (e.g., by left-shifting) the each of the samples;
then summing the values of the two halved samples.

Even easier operations may be performed when downsampling (e.g., at step 811), as it is only needed to select one sample amount a group of samples (e.g., samples adjacent to each other).

Hence, it is now possible to define technique(s) for reducing the number of multiplications to be performed. Some of these techniques may be based, inter alia, on at least one of the following principles:

Even if the block 18 to be actually predicted has size M×N, block may be reduced (in at least one of the two dimensions) and an ALWIP matrix with reduced size $Q_{red} \times P_{red}$ (with $Q_{red} = M_{red}' * N_{red}'$, $P_{red} = N_{red} + M_{red}$, with $M_{red}' < M$ and/or $N_{red}' < N$ and/or $M_{red} < M$ and/or $N_{red} < N$) may be applied. Hence, the boundary vector 17P will have size $P_{red} \times 1$, implying only $P_{red} < P$ multiplications (with $P_{red} = M_{red} + N_{red}$ and $P = M + N$).

The $P_{red} \times 1$ boundary vector 17P may be obtained easily from the original boundary 17, e.g.:
By downsampling (e.g. by choosing only some samples of the boundary); and/or
By averaging multiple samples of the boundary (which may be easily obtained by addition and shifting, without multiplications).

In addition or alternatively, instead of predicting by multiplication all the Q=M*N values of the block 18 to be predicted, it is possible to only predict a reduced block with reduced dimensions (e.g., $Q_{red} = M_{red}' * N_{red}'$ with $M_{red}' < M$ and/or $N_{red}' < N$). The remaining samples of the block 18 to be predicted will be obtained by interpolation, e.g. using the $Q_{red}$ samples as support values for the remaining $Q - Q_{red}$ values to be predicted.

According to an example illustrated in FIG. 7.1, a 4×4 block 18 (M=4, N=4, Q=M*N=16) is to be predicted and a neighborhood 17 of samples 17a (a vertical row column with four already-predicted samples) and 17c (a horizontal row with four already-predicted samples) have already been predicted at previous iterations (the neighborhoods 17a and 17c may be collectively indicated with 17). A priori, by using the equation shown in FIG. 6, the prediction matrix 17M should be a Q×P=16×8 matrix (by virtue of Q=M*N=4*4 and P=M+N=4+4=8), and the boundary vector 17P should have 8×1 dimension (by virtue of P=8). However, this would drive to the necessity of performing 8 multiplications for each of the 16 samples of the 4×4 block 18 to be predicted, hence leading to the necessity of performing 16*8=128 multiplications in total. (It is noted that the average number of multiplications per sample is a good assessment of the computational complexity. For conventional intra-predictions, four multiplications per sample are needed and this increases the computational effort to be involved. Hence, it is possible to use this as an upper limit for ALWIP would ensures that the complexity is reasonable and does not exceed the complexity of conventional intra prediction.)

Notwithstanding, it has been understood that, by using the present technique, it is possible to reduce, at step 811, the number of samples 17a and 17c neighboring the block 18 to be predicted from P to $P_{red} < P$. In particular, it has been understood that it is possible to average (e.g. at 100 in FIG. 7.1) boundary samples (17a, 17c) which are adjacent to each other, to obtain a reduced boundary 102 with two horizontal rows and two vertical columns, hence operating as the block 18 were a 2×2 block (the reduced boundary being formed by averaged values). Alternatively, it is possible to perform a downsampling, hence selecting two samples for the row 17c and two samples for the column 17a. Hence, the horizontal row 17c, instead of having the four original samples, is processed as having two samples (e.g. averaged samples), while the vertical column 17a, originally having four samples, is processed as having two samples (e.g. averaged samples). It is also possible to understand that, after having subdivided the row 17c and the column 17a in groups 110 of two samples each, one single sample is maintained (e.g., the average of the samples of the group 110 or a simple choice among the samples of the group 110). Accordingly, a so-called reduced set 102 of sample values is obtained, by virtue of the set 102 having only four samples ($M_{red} = 2$, $N_{red} = 2$, $P_{red} = M_{red} + N_{red} = 4$, with $P_{red} < P$).

It has been understood that it is possible to perform operations (such as the averaging or downsampling 100) without carrying out too many multiplications at the processor-level: the averaging or downsampling 100 performed at step 811 may be simply obtained by the straightforward and computationally-non-power-consuming operations such as additions and shifts.

It has been understood that, at this point, it is possible to subject the reduced set of sample values 102 to a linear or affine linear (ALWIP) transformation 19 (e.g., using a prediction matrix such as the matrix 17M of FIG. 6). In this case, the ALWIP transformation 19 directly maps the four samples 102 onto the sample values 104 of the block 18. No interpolation is needed in the present case.

In this case, the ALWIP matrix 17M has dimension $Q \times P_{red} = 16 \times 4$: this follows the fact that all the Q=16 samples of the block 18 to be predicted are directly obtained by ALWIP multiplication (no interpolation needed).

Hence, at step 812a, a suitable ALWIP matrix 17M with dimension $Q \times P_{red}$ is selected. The selection may at least partially be based, for example, on signalling from the datastream 12. The selected ALWIP matrix 17M may also be indicated with $A_k$, where k may be understood as an index, which may be signalled in the datastream 12 (in some cases the matrix is also indicated as $A_{idx}^m$, see below). The selection may be performed according to the following scheme: for each dimension (e.g., pair of height/width of the block 18 to be predicted), an ALWIP matrix 17M is chosen among, for example, one of the three sets of matrixes $S_0$, $S_1$, $S_2$ (each of the three sets $S_0$, $S_1$, $S_2$ may group a plurality of ALWIP matrixes 17M of the same dimensions, and the ALWIP matrix to be chosen for the prediction will be one of them).

At step 812b, a multiplication between the selected $QXP_{red}$ ALWIP matrix 17M (also indicated as $A_k$) and the $P_{red} \times 1$ boundary vector 17P is performed.

At step 812c, an offset value (e.g., $b_k$) may be added, e.g. to all the obtained values 104 of the vector 18Q obtained by ALWIP. The value of the offset ($b_k$ or in some cases also indicated with $b_{1,2,3}^i$, see below) may be associated to the particular selected ALWIP matrix ($A_k$), and may be based on an index (e.g., which may be signalled in the datastream 12).

Hence, a comparison between using the present technique and non-using the present technique is here resumed:

Without the present technique:
  Block 18 to be predicted, the block having dimensions M=4, N=4;
  Q=M*N=4*4=16 values to be predicted;
  P=M+N=4+4=8 boundary samples
  P=8 multiplications for each of the Q=16 values to be predicted,
  a total number of P*Q=8*16=128 multiplications;
With the present technique, we have:
  Block 18 to be predicted, the block having dimensions M=4, N=4;
  Q=M*N=4*4=16 values to be predicted at the end;
  Reduced dimension of the boundary vector: $P_{red}=M_{red}+N_{red}=2+2=4$;
  $P_{red}$=4 multiplications for each of the Q=16 values to be predicted by ALWIP,
  a total number of $P_{red}$*Q=4*16=64 multiplications (the half of 128!)
  the ratio between the number of multiplications and the number of final values to be obtained and is $P_{red}$*Q/Q=4, i.e. the half than the P=8 multiplications for each sample to be predicted!

As can be understood, by relying on straightforward and computationally-non-power-demanding operations such as averaging (and, in case, additions and/or shifts and/or downsampling) it is possible to obtain an appropriate value at step 812.

With reference to FIG. 7.2, the block 18 to be predicted is here an 8×8 block (M=8, N=8) of 64 samples. Here, a priori, a prediction matrix 17M should have size Q×P=64×16 (Q=64 by virtue of Q=M*N=8*8=64, M=8 and N=8 and by virtue of P=M+N=8+8=16). Hence, a priori, there would be needed P=16 multiplications for each of the Q=64 samples of the 8×8 block 18 to be predicted, to arrive at 64*16=1024 multiplications for the whole 8×8 block 18?

However, as can be seen in FIG. 7.2, there can be provided a method 820 according to which, instead of using all the 16 samples of the boundary, only 8 values (e.g., 4 in the horizontal boundary row 17c and 4 in the vertical boundary column 17a between original samples of the boundary) are used. From the boundary row 17c, 4 samples may be used instead of 8 (e.g., they may be two-by-two averages and/or selections of one sample out of two). Accordingly, the boundary vector is not a P×1=16×1 vector, but a $P_{red}$×1=8×1 vector only ($P_{red}=M_{red}+N_{red}$=4+4). It has been understood that it is possible to select or average (e.g., two by two) samples of the horizontal row 17c and samples of the vertical columns 17a to have, instead of the original P=16 samples, only $P_{red}$=B boundary values, forming the reduced set 102 of sample values. This reduced set 102 will permit to obtain a reduced version of block 18, the reduced version having $Q_{red}=M_{red}$*$N_{red}$=4*4=16 samples (instead of Q=M*N=8*8=64). It is possible to apply an ALWIP matrix for predicting a block having size $M_{red}$×$N_{red}$=4×4. The reduced version of block 18 includes the samples indicated with grey in the scheme 106 in FIG. 7.2: the samples indicated with grey squared (including samples 118' and 118") form a 4×4 reduced block with $Q_{red}$=16 values obtained at the step of subjecting 812. The 4×4 reduced block has been obtained by applying the linear transformation 19 at the step of subjecting 812. After having obtain the values of the 4×4 reduced block, it is possible to obtain the values of the remaining samples (samples indicated with white samples in the scheme 106) for example by interpolation.

In respect to method 810 of FIG. 7.1, this method 820 may additionally include a step 813 of deriving, e.g. by interpolation, prediction values for the remaining Q−$Q_{red}$=64−16=48 samples (white squares) of the M×N=8×8 block 18 to be predicted. The remaining Q−$Q_{red}$=64−16=48 samples may be obtained from the $Q_{red}$=16 directly obtained samples by interpolation (the interpolation may also make use of values of the boundary samples, for example). As can be seen in FIG. 7.2, while the samples 118' and 118" have been obtained at step 812 (as indicated by the grey square), the sample 108' (intermediate to the samples 118' and 118" and indicated with white square) is obtained by interpolation between the sample 118' and 118" at step 813. It has been understood that interpolations may also be obtained by operations similar to those for averaging such as shifting and adding. Hence, in FIG. 7.2, the value 108' may in general be determined as a value intermediate between the value of the sample 118' and the value of the sample 118" (it may be the average).

By performing interpolations, at step 813 it is also possible to arrive at the final version of the M×N=8×8 block 18 based on multiple sample values indicated in 104.

Hence, a comparison between using the present technique and non-using it is:
Without the present technique:
  Block 18 to be predicted, the block having dimensions M=8, N=8 and
  Q=M*N=8*8=64 samples in the block 18 to be predicted;
  P=M+N=8+8=16 samples in the boundary 17;
  P=16 multiplications for each of the Q=64 values to be predicted,
  a total number of P*Q=16*64=1028 multiplications
  the ratio between the number of multiplications and the number of final values to be obtained is P*Q/Q=16
With the present technique:
  Block 18 to be predicted, having dimensions M=8, N=8
  Q=M*N=8*8=64 values to be predicted at the end;
  but an $Q_{red}$×$P_{red}$ ALWIP matrix to be used, with $P_{red}=M_{red}+N_{red}$, $Q_{red}=M_{red}$*$N_{red}$, $M_{red}$=4, $N_{red}$=4
  $P_{red}=M_{red}+N_{red}$=4+4=8 samples in the boundary, with $P_{red}$<P
  $P_{red}$=8 multiplications for each of the $Q_{red}$=16 values of the 4×4 reduced block to be predicted (formed by grey squares in scheme 106),
  a total number of $P_{red}$*$Q_{red}$=8*16=128 multiplications (much less than 1024!)
  the ratio between the number of multiplications and the number of final values to be obtained is $P_{red}$*$Q_{red}$/Q=128/64=2 (much less than the 16 obtained without the present technique!).

Accordingly, the herewith presented technique is 8 times less power-demanding than the previous one.

FIG. 7.3 shows another example (which may be based on the method 820), in which the block 18 to be predicted is a rectangular 4×8 block (M=8, N=4) with Q=4*8=32 samples to be predicted. The boundary 17 is formed by the horizontal row 17c with N=8 samples and the vertical column 17a with M=4 samples. Hence, a priori, the boundary vector 17P would have dimension P×1=12×1, while the prediction ALWIP matrix should be a Q×P=32×12 matrix, hence causing the need of Q*P=32*12=384 multiplications.

However, it is possible, for example, to average or downsample at least the 8 samples of the horizontal row 17c, to obtain a reduced horizontal row with only 4 samples (e.g., averaged samples). In some examples, the vertical column 17a would remain as it is (e.g. without averaging). In total, the reduced boundary would have dimension $P_{red}$=8, with $P_{red}$<P. Accordingly, the boundary vector 17P will have dimension $P_{red} \times 1 = 8 \times 1$. The ALWIP prediction matrix 17M will be a matrix with dimensions $M*N_{red}*P_{red}=4*4*8=64$. The 4×4 reduced block (formed by the grey columns in the schema 107), directly obtained at the subjecting step 812, will have size $Q_{red}=M*N_{red}=4*4=16$ samples (instead of the $Q=4*8=32$ of the original 4×8 block 18 to be predicted). Once the reduced 4×4 block is obtained by ALWIP, it is possible to add an offset value $b_k$ (step 812c) and to perform interpolations at step 813. As can be seen at step 813 in FIG. 7.3, the reduced 4×4 block is expanded to the 4×8 block 18, where the values 108', non-obtained at step 812, are obtained at step 813 by interpolating the values 118' and 118" (grey squares) obtained at step 812.

Hence, a comparison between using the present technique and non-using it is:
Without the present technique:
Block 18 to be predicted, the block having dimensions M=4, N=8
$Q=M*N=4*8=32$ values to be predicted;
$P=M+N=4+8=12$ samples in the boundary;
P=12 multiplications for each of the Q=32 values to be predicted,
a total number of $P*Q=12*32=384$ multiplications
the ratio between the number of multiplications and the number of final values to be obtained is $P*Q/Q=12$
With the present technique:
Block 18 to be predicted, the block having dimensions M=4, N=8
$Q=M*N=4*8=32$ values to be predicted at the end;
but a $Q_{red} \times P_{red}=16 \times 8$ ALWIP matrix ca be used, with M=4, $N_{red}=4$, $Q_{red}=M*N_{red}=16$, $P_{red}=M+N_{red}=4+4=8$
$P_{red}=M+N_{red}=4+4=8$ samples in the boundary, with $P_{red}<P$
$P_{red}=8$ multiplications for each of the $Q_{red}=16$ values of the reduced block to be predicted,
a total number of $Q_{red}*P_{red}=16*8=128$ multiplications (less than 384!)
the ratio between the number of multiplications and the number of final values to be obtained is $P_{red}*Q_{red}/Q=128/32=4$ (much less than the 12 obtained without the present technique!).

Hence, with the present technique, the computational effort is reduced to one third.

FIG. 7.4 shows a case of a block 18 to be predicted with dimensions M×N=16×16 and having $Q=M*N=16*16=256$ values to be predicted at the end, with $P=M+N=16+16=32$ boundary samples. This would lead to a prediction matrix with dimensions Q×P=256×32, which would imply $256*32=8192$ multiplications!

However, by applying the method 820, it is possible, at step 811, to reduce (e.g. by averaging or downsampling) the number of boundary samples, e.g., from 32 to 8: for example, for every group 120 of four consecutive samples of the row 17a, one single sample (e.g., selected among the four samples, or the average of the samples) remains. Also for every group of four consecutive samples of the column 17c, one single sample (e.g., selected among the four samples, or the average of the samples) remains.

Here, the ALWIP matrix 17M is a $Q_{red} \times P_{red}=64 \times 8$ matrix: this comes from the fact that it has been chosen $P_{red}=8$ (by using 8 averaged or selected samples from the 32 ones of the boundary) and by the fact that the reduced block to be predicted at step 812 is an 8×8 block (in the scheme 109, the grey squares are 64).

Hence, once the 64 samples of the reduced 8×8 block are obtained at step 812, it is possible to derive, at step 813, the remaining $Q-Q_{red}=256-64=192$ values 104 of the block 18 to be predicted.

In this case, in order to perform the interpolations, it has been chosen to use all the samples of the boundary column 17a and only alternate samples in the boundary row 17c. other choices may be made.

While with the present method the ratio between the number of multiplications and the number of finally obtained values is $Q_{red}*P_{red}/Q=8*64/256=2$, which is much less than the 32 multiplications for each value without the present technique!

A comparison between using the present technique and non-using it is:
Without the present technique:
Block 18 to be predicted, the block having dimensions M=16, N=16
$Q=M*N=16*16=256$ values to be predicted;
$P=M+N=16*16=32$ samples in the boundary;
P=32 multiplications for each of the Q=256 values to be predicted,
a total number of $P*Q=32*256=8192$ multiplications;
the ratio between the number of multiplications and the number of final values to be obtained is $P*Q/Q=32$
With the present technique:
Block 18 to be predicted, the block having dimensions M=16, N=16
$Q=M*N=16*16=256$ values to be predicted at the end;
but a $Q_{red} \times P_{red}=64 \times 8$ ALWIP matrix to be used, with $M_{red}=4$, $N_{red}=4$, $Q_{red}=8*8=64$ samples to be predicted by ALWIP, $P_{red}=M_{red}+N_{red}=4+4=8$
$P_{red}=M_{red}+N_{red}=4+4=8$ samples in the boundary, with $P_{red}<P$
$P_{red}=8$ multiplications for each of the $Q_{red}=64$ values of the reduced block to be predicted,
a total number of $Q_{red}*P_{red}=64*4=256$ multiplications (less than 8192) the ratio between the number of multiplications and the number of final values to be obtained is $P_{red}*Q_{red}/Q=8*64/256=2$ (much less than the 32 obtained without the present technique!).

Accordingly, the computational power needed by the present technique is 16 times less than the traditional technique!

Therefore, it is possible to predict a predetermined block (18) of the picture using a plurality of neighbouring samples (17) by
reducing (100, 813) the plurality of neighbouring samples to obtain a reduced set (102) of samples values lower, in number of samples, than compared to the plurality of neighbouring samples (17),
subjecting (812) the reduced set of sample values (102) to a linear or affine linear transformation (19, 17M) to obtain predicted values for predetermined samples (104, 118', 188") of the predetermined block (18).

In particular, it is possible to perform the reducing (100, 813) by downsampling the plurality of neighbouring samples to obtain the reduced set (102) of samples values lower, in number of samples, than compared to the plurality of neighbouring samples (17).

Alternatively, it is possible to perform the reducing (100, 813) by averaging the plurality of neighbouring samples to obtain the reduced set (102) of samples values lower, in number of samples, than compared to the plurality of neighbouring samples (17).

Further, it is possible to derive (813), by interpolation, prediction values for further samples (108, 108') of the predetermined block (18) on the basis of the predicted values for the predetermined samples (104, 118', 118") and the plurality of neighbouring samples (17).

The plurality of neighbouring samples (17a, 17c) may extend one-dimensionally along two sides (e.g. towards right and toward below in FIGS. 7.1-7.4) of the predetermined block (18). The predetermined samples (e.g. those which are obtained by ALWIP in step 812) may also be arranged in rows and columns and, along at least one of the rows and columns, the predetermined samples may be positioned at every $n^{th}$ position from a sample (112) of the predetermined sample 112 adjoining the two sides of the predetermined block 18.

Based on the plurality of neighbouring samples (17), it is possible to determine for each of the at least one of the rows and the columns, a support value (118) for one (118) of the plurality of neighbouring positions, which is aligned to the respective one of the at least one of the rows and the columns. It is also possible to derive, by interpolation, the prediction values 118 for the further samples (108, 108') of the predetermined block (18) on the basis of the predicted values for the predetermined samples (104, 118', 118") and the support values for the neighbouring samples (118) aligned to the at least one of rows and columns.

The predetermined samples (104) may be positioned at every $n^{th}$ position from the sample (112) which adjoins the two sides of the predetermined block 18 along the rows and the predetermined samples are positioned at every $m^{th}$ position from the sample (112) of the predetermined sample which (112) adjoins the two sides of the predetermined block (18) along the columns, wherein n, m>1. In some cases, n=m (e.g., in FIGS. 7.2 and 7.3, where the samples 104, 118', 118", directly obtained by ALWIP at 812 and indicated with grey squares, are alternated, along rows and columns, to the samples 108, 108' subsequently obtained at step 813).

Along at least one of the rows (17c) and columns (17a), it may be possible to perform the determining the support values e.g. by downsampling or averaging (122), for each support value, a group (120) of neighbouring samples within the plurality of neighbouring samples which includes the neighbouring sample (118) for which the respective support value is determined. Hence, in FIG. 7.4, at step 813 it is possible to obtain the value of sample 119 by using the values of the predetermined sample 118" (previously obtained at step 812) and the neighbouring sample 118 as support values.

The plurality of neighbouring samples may extend one-dimensionally along two sides of the predetermined block (18). It may be possible to perform the reduction (811) by grouping the plurality of neighbouring samples (17) into groups (110) of one or more consecutive neighbouring samples and performing a downsampling or an averaging on each of the group (110) of one or more neighbouring samples which has two or more than two neighbouring samples.

In examples, the linear or affine linear transformation may comprise $P_{red}*Q_{red}$ or $P_{red}*Q$·weighting factors with $P_{red}$ being the number of sample values (102) within the reduced set of sample values and $Q_{red}$ or $Q$ is the number predetermined samples within the predetermined block (18). At least ¼ $P_{red}*Q_{red}$ or ¼ $P_{red}*Q$ weighting factors are non-zero weighting values. The $P_{red}*Q_{red}$ or $P_{red}*Q$ weighting factors may comprise, for each of the Q or $Q_{red}$ predetermined samples, a series of $P_{red}$ weighting factors relating to the respective predetermined sample, wherein the series, when being arranged one below the other according to a raster scan order among the predetermined samples of the predetermined block (18), form an envelope which is omnidirectionally non-linear. The $P_{red}*Q$ or $P_{red}*Q_{red}$ weighting factors may be unrelated to each other via any regular mapping rule. A mean of maxima of cross correlations between a first series of weighting factors relating to the respective predetermined sample, and a second series of weighting factors relating to predetermined samples other than the respective predetermined sample, or a reversed version of the latter series, whatever leads to a higher maximum, is lower than a predetermined threshold. The predetermined threshold may 0.3 [or in some cases 0.2 or 0.1]. The $P_{red}$ neighbouring samples (17) may be located along a one-dimensional path extending along two sides of the predetermined block (18) and, for each of the Q or $Q_{red}$ predetermined samples, the series of $P_{red}$ weighting factors relating to the respective predetermined sample are ordered in a manner traversing the one-dimensional path in a predetermined direction.

6.1 Description of a Method and Apparatus

For predicting the samples of a rectangular block of width W (also indicated with N) and height H (also indicated with M), Affine-linear weighted intra prediction (ALWIP) may take one line of H reconstructed neighbouring boundary samples left of the block and one line of W reconstructed neighbouring boundary samples above the block as input. If the reconstructed samples are unavailable, they may be generated as it is done in the conventional intra prediction.

A generation of the prediction signal (e.g., the values for the complete block 18) may be based on at least some of the following three steps:

1. Out of the boundary samples 17, samples 102 (e.g., four samples in the case of W=H=4 and/or eight samples in other case) may be extracted by averaging or downsampling (e.g., step 811).
2. A matrix vector multiplication, followed by addition of an offset, may be carried out with the averaged samples (or the samples remaining from downsampling) as an input. The result may be a reduced prediction signal on a subsampled set of samples in the original block (e.g., step 812).
3. The prediction signal at the remaining position may be generated, e.g. by upsampling, from the prediction signal on the subsampled set, e.g., by linear interpolation (e.g., step 813).

Thanks to steps 1. (811) and/or 3. (813), the total number of multiplications needed in the computation of the matrix-vector product may be such that it is smaller or equal than 4*W*H. Moreover, the averaging operations on the boundary and the linear interpolation of the reduced prediction signal are carried out by solely using additions and bit-shifts. In other words, in examples at most four multiplications per sample are needed for the ALWIP modes.

In some examples, the matrices (e.g., 17M) and offset vectors (e.g., $b_k$) needed to generate the prediction signal may be taken from sets (e.g., three sets), e.g., $S_0$, $S_1$, $S_2$, of matrices which may be stored, for example, in storage unit(s) of the decoder and of the encoder.

In some examples, the set $S_0$ may comprise (e.g., consist of) $n_0$ (e.g., $n_0$=16 or $n_0$=18 or another number) matrices $A_0^i$, $i \in \{0, \ldots, n_0-1\}$ each of which may have 16 rows and 4 columns and 18 offset vectors $b_0^i$, $i \in \{0, \ldots, n_0-1\}$ each of size 16 to perform the technique according to FIG. 7.1. Matrices and offset vectors of this set are used for blocks 18 of size 4×4. Once the boundary vector has been reduced to a $P_{red}$=4 vector (as for step 811 of FIG. 7.1), it is possible to map the $P_{red}$=4 samples of the reduced set of samples 102 directly into the Q=16 samples of the 4×4 block 18 to be predicted.

In some examples, the set $S_1$ may comprise (e.g., consist of) $n_1$ (e.g., $n_1$=8 or $n_1$=18 or another number) matrices $A_0^i$, i∈{0, . . . , $n_1$−1} each of which may have 16 rows and 8 columns and 18 offset vectors $b_1^i$, i∈{0, . . . , $n_1$−1} each of size 16 to perform the technique according to FIG. 7.2 or 7.3. Matrices and offset vectors of this set $S_1$ may be used for blocks of sizes 4×8, 4×16, 4×32, 4×64, 16×4, 32×4, 64×4, 8×4 and 8×8. Additionally, it may also be used for blocks of size W×H with max(W,H)>4 and min(W,H)=4, i.e. for blocks of size 4×16 or 16×4, 4×32 or 32×4 and 4×64 or 64×4. The 16×8 matrix refers to the reduced version of the block 18, which is a 4×4 block, as obtained in FIGS. 7.2 and 7.3.

Additionally or alternatively, the set $S_2$ may comprise (e.g., consists of) $n_2$ (e.g., $n_2$=6 or $n_2$=18 or another number) matrices $A_2^i$, i∈{0, . . . , $n_2$−1}, each of which may have 64 rows and 8 columns and of 18 offset vectors $b_2^i$, i∈{0, . . . , $n_2$−1} of size 64. The 64×8 matrix refers to the reduced version of the block 18, which is an 8×8 block, e.g. as obtained in FIG. 7.4. Matrices and offset vectors of this set may be used for blocks of sizes 8×16, 8×32, 8×64, 16×8, 16×16, 16×32, 16×64, 32×8, 32×16, 32×32, 32×64, 64×8, 64×16, 64×32, 64×64.

Matrices and offset vectors of that set or parts of these matrices and offset vectors may be used for all other block-shapes.

6.2 Averaging or Downsampling of the Boundary

Here, features are provided regarding step 811.

As explained above, the boundary samples (17a, 17c) may be averaged and/or downsampled (e.g., from P samples to $P_{red}$<P samples).

In a first step, the input boundaries $bdry^{top}$ (e.g., 17c) and $bdry^{left}$ (e.g., 17a) may be reduced to smaller boundaries $bdry_{red}^{top}$ and $bdry_{red}^{left}$ to arrive at the reduced set 102. Here, $bdry_{red}^{top}$ and $bdry_{red}^{left}$ both consists of 2 samples in the case of a 4×4-block and both consist of 4 samples in other cases.

In the case of a 4×4-block, it is possible to define $$bdry_{red}^{top}[0] = (bdry^{top}[0] + bdry^{top}[1] + 1) \gg 1,$$

$$bdry_{red}^{top}[1] = (bdry^{top}[2] + bdry^{top}[3] + 1) \gg 1,$$

and define $bdry_{red}^{left}$ analogously. Accordingly, $bdry_{red}^{top}[0]$, $bdry_{red}^{top}[1]$, $bdry_{red}^{left}[0]$ $bdry_{red}^{left}[1]$ are average values obtained e.g. using bit-shifting operations In all other cases (e.g., for blocks of wither width or height different from 4), if the block-width W is given as W=4*$2^k$, for 0≤i<4 one defines $$bdry_{red}^{top}[i] = \left(\left(\sum_{j=0}^{2^k-1} bdry^{top}[i*2^k + j]\right) + 1 \ll (k-1)\right) \gg k.$$

and defines $bdry_{red}^{left}$ analogously.

In still other cases, it is possible to downsample the boundary (e.g., by selecting one particular boundary sample from a group of boundary samples) to arrive at a reduce number of samples. For example, $bdry_{red}^{top}[0]$ may be chosen among $bdry^{top}[0]$ and $bdry^{top}[1]$, and $bdry_{red}^{top}[1]$ may be chosen among $bdry^{top}[2]$ and $bdry^{top}[3]$. It is also possible to define $bdry_{red}^{left}$ analogously.

The two reduced boundaries $bdry_{red}^{top}$ and $bdry_{red}^{left}$ may be concatenated to a reduced boundary vector $bdry_{red}$ (associated to the reduced set 102), also indicated with 17P. The reduced boundary vector $bdry_{red}$ may be thus of size four ($P_{red}$=4) for blocks of shape 4×4 (example of FIG. 7.1) and of size eight ($P_{red}$=8) for blocks of all other shapes (examples of FIGS. 7.2-7.4).

Here, if mode<18 (or the number of matrixes in the set of matrixes), it is possible to define $$bdry_{red} = [bdry_{red}^{top}, bdry_{red}^{left}].$$

If mode≥18, which corresponds to the transposed mode of mode−17, it is possible to define $$bdry_{red} = [bdry_{red}^{left}, bdry_{red}^{top}].$$

Hence, according to a particular state (one state: mode<18; one other state: mode≥18) it is possible to distribute the predicted values of the output vector along a different scan order (e.g., one scan order: [$bdry_{red}^{top}$, $bdry_{red}^{left}$]; one other scan order: [$bdry_{red}^{left}$, $bdry_{red}^{top}$]).

Other strategies may be carried out. In other examples, the mode index 'mode' is not necessarily in the range 0 to 35 (other ranges may be defined). Further, it is not needed that each of the three sets $S_0$, $S_1$, $S_2$ has 18 matrices (hence, instead of expressions like mode≥18, it is possible to mode≥$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

The mode and transposed information are not necessarily stored and/or transmitted as one combined mode index 'mode': in some examples there is the possibility of signalling explicitly as a transposed flag and the matrix index (0-15 for $S_0$, 0-7 for $S_1$ and 0-5 for $S_2$).

In some cases, the combination of the transposed flag and matrix index may be interpreted as a set index. For example, there may be one bit operating as transposed flag, and some bits indicating the matrix index, collectively indicated as "set index".

6.3 Generation of the Reduced Prediction Signal by Matrix Vector Multiplication

Here, features are provided regarding step 812.

Out of the reduced input vector $bdry_{red}$ (boundary vector 17P) one may generate a reduced prediction signal $pred_{red}$. The latter signal may be a signal on the downsampled block of width $W_{red}$ and height $H_{red}$. Here, $W_{red}$ and $H_{red}$ may be defined as:

$$W_{red} = 4, H_{red} = 4; \text{ if max}(W, H) \leq 8,$$

$$W_{red} = \min(W, 8), H_{red} = \min(H, 8); \text{ else.}$$

The reduced prediction signal $pred_{red}$ may be computed by calculating a matrix vector-product and adding an offset:

$$pred_{red} = A \cdot bdry_{red} + b.$$

Here, A is a matrix (e.g., prediction matrix 17M) that may have $W_{red}*H_{red}$ rows and 4 columns if W=H=4 and 8 columns in all other cases and b is a vector that may be of size $W_{red}*H_{red}$.

If W=H=4, then A may have 4 columns and 16 rows and thus 4 multiplications per sample may be needed in that case to compute $pred_{red}$. In all other cases, A may have 8 columns and one may verify that in these cases one has $8*W_{red}*H_{red} \leq 4*W*H$, i.e. also in these cases, at most 4 multiplications per sample are needed to compute $pred_{red}$.

The matrix A and the vector b may be taken from one of the sets $S_0$, $S_1$, $S_2$ as follows. One defines an index idx=idx (W,H) by setting idx(W,H)=0, if W=H=4, idx(W,H)=1, if max(W,H)=8 and idx(W,H)=2 in all other cases. Moreover, one may put m=mode, if mode<18 and m=mode−17, else. Then, if idx≤1 or idx=2 and min(W,H)>4, one may put $A=A_{idx}^m$ and $b=b_{idx}^m$. In the case that idx=2 and min(W, H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block. If mode≥18, one replaces the reduced prediction signal by its transposed signal. In alternative examples, different strategies may be carried out. For example, instead of reducing the size of a larger matrix ("leave out"), a smaller matrix of $S_1$ (idx=1) with $W_{red}=4$ and $H_{red}=4$ is used. I.e., such blocks are now assigned to $S_1$ instead of $S_2$.

Other strategies may be carried out. In other examples, the mode index 'mode' is not necessarily in the range 0 to 35 (other ranges may be defined). Further, it is not needed that each of the three sets $S_0$, $S_1$, $S_2$ has 18 matrices (hence, instead of expressions like mode<18, it is possible to mode<$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

6.4 Linear Interpolation to Generate the Final Prediction Signal

Here, features are provided regarding step 812.

Interpolation of the subsampled prediction signal, on large blocks a second version of the averaged boundary may be needed. Namely, if min(W,H)>8 and W≥H, one writes W=$8*2^l$, and for 0≤i<8 defines $$bdry_{redII}^{top}[i] = \left(\left(\sum_{j=0}^{2^l-1} bdry^{top}[i*2^l + j]\right) + 1 \ll (l-1)\right) \gg l.$$

If min(W,H)>8 and H>W, one defines $bdry_{redII}^{left}$ analogously.

In addition or alternative, it is possible to have a "hard downsampling", in which the $bdry_{redII}^{top}[i]$ is equal to $$bdry_{redII}^{top}[i] = bdry^{top}[(i+1)*2^l - 1].$$

Also, $bdry_{redII}^{left}$ can be defined analogously.

At the sample positions that were left out in the generation of $pred_{red}$, the final prediction signal may arise by linear interpolation from $pred_{red}$ (e.g., step 813 in examples of FIGS. 7.2-7.4). This linear interpolation may be unnecessary, in some examples if W=H=4 (e.g., example of FIG. 7.1).

The linear interpolation may be given as follows (other examples are notwithstanding possible). It is assumed that W≥H. Then, if H>$H_{red}$, a vertical upsampling of $pred_{red}$ may be performed. In that case, $pred_{red}$ may be extended by one line to the top as follows. If W=8, $pred_{red}$ may have width $W_{red}=4$ and may be extended to the top by the averaged boundary signal $bdry_{red}^{top}$, e.g. as defined above. If W>8, $pred_{red}$ is of width $W_{red}=8$ and it is extended to the top by the averaged boundary signal $bdry_{redII}^{top}$, e.g. as defined above. One may write $pred_{red}[x][-1]$ for the first line of $pred_{red}$. Then the signal $pred_{red}^{ups,ver}$ on a block of width $W_{red}$ and height $2*H_{red}$ may be given as $$pred_{red}^{ups,ver}[x][2^*y + 1] = pred_{red}[x][y],$$

$$pred_{red}^{ups,ver}[x][2^*y] = (pred_{red}[x][y-1] + pred_{red}[x][y] + 1) \gg 1,$$

where 0≤x<$W_{red}$ and 0≤y<$H_{red}$. The latter process may be carried out k times until $2^k*H_{red}$=H. Thus, if H=8 or H=16, it may be carried out at most once. If H=32, it may be carried out twice. If H=64, it may be carried out three times. Next, a horizontal upsampling operation may be applied to the result of the vertical upsampling. The latter upsampling operation may use the full boundary left of the prediction signal. Finally, if H>W, one may proceed analogously by first upsampling in the horizontal direction (if needed) and then in the vertical direction.

This is an example of an interpolation using reduced boundary samples for the first interpolation (horizontally or vertically) and original boundary samples for the second interpolation (vertically or horizontally). Depending on the block size, only the second or no interpolation is needed. If both horizontal and vertical interpolation is needed, the order depends on the width and height of the block.

However, different techniques may be implemented: for example, original boundary samples may be used for both the first and the second interpolation and the order may be fixed, e.g. first horizontal then vertical (in other cases, first vertical then horizontal).

Hence, the interpolation order (horizontal/vertical) and the use of reduced/original boundary samples may be varied.

6.5 Illustration of an Example of the Entire ALWIP Process

The entire process of averaging, matrix-vector-multiplication and linear interpolation is illustrated for different shapes in FIGS. 7.1-7.4. Note, that the remaining shapes are treated as in one of the depicted cases.

1. Given a 4×4 block, ALWIP may take two averages along each axis of the boundary by using the technique of FIG. 7.1. The resulting four input samples enter the matrix-vector-multiplication. The matrices are taken from the set $S_0$. After adding an offset, this may yield the 16 final prediction samples. Linear interpolation is not needed for generating the prediction signal. Thus, a total of (4*16)/(4*4)=4 multiplications per sample are performed. See, for example, FIGS. 7.1.
2. Given an 8×8 block, ALWIP may take four averages along each axis of the boundary. The resulting eight input samples enter the matrix-vector-multiplication, by using the technique of FIG. 7.2. The matrices are taken from the set $S_1$. This yields 16 samples on the odd positions of the prediction block. Thus, a total of (8*16)/(8*8)=2 multiplications per sample are performed. After adding an offset, these samples may be interpolated, e.g., vertically by using the top boundary and, e.g., horizontally by using the left boundary. See, for example, FIG. 7.2.

3. Given an 8×4 block, ALWIP may take four averages along the horizontal axis of the boundary and the four original boundary values on the left boundary by using the technique of FIG. 7.3. The resulting eight input samples enter the matrix-vector-multiplication. The matrices are taken from the set $S_1$. This yields 16 samples on the odd horizontal and each vertical positions of the prediction block. Thus, a total of (8*16)/(8*4)=4 multiplications per sample are performed. After adding an offset, these samples are interpolated horizontally by using the left boundary, for example. See, for example, FIGS. 7.3.

The transposed case is treated accordingly.

4. Given a 16×16 block, ALWIP may take four averages along each axis of the boundary. The resulting eight input samples enter the matrix-vector-multiplication by using the technique of FIG. 7.2. The matrices are taken from the set $S_2$. This yields 64 samples on the odd positions of the prediction block. Thus, a total of (8*64)/(16*16)=2 multiplications per sample are performed. After adding an offset, these samples are interpolated vertically by using the top boundary and horizontally by using the left boundary, for example. See, for example, FIGS. 7.2. See, for example, FIGS. 7.4.

For larger shapes, the procedure may be essentially the same and it is easy to check that the number of multiplications per sample is less than two.

For W×8 blocks, only horizontal interpolation is needed as the samples are given at the odd horizontal and each vertical positions. Thus, at most (8*64)/(16*8)=4 multiplications per sample are performed in these cases.

Finally for W×4 blocks with W>8, let $A_k$ be the matrix that arises by leaving out every row that correspond to an odd entry along the horizontal axis of the downsampled block. Thus, the output size may be 32 and again, only horizontal interpolation remains to be performed. At most (8*32)/(16*4)=4 multiplications per sample may be performed.

The transposed cases may be treated accordingly.

6.6 Number of Parameters Needed and Complexity Assessment

The parameters needed for all possible proposed intra prediction modes may be comprised by the matrices and offset vectors belonging to the sets $S_0$, $S_1$, $S_2$. All matrix-coefficients and offset vectors may be stored as 10-bit values. Thus, according to the above description, a total number of 14400 parameters, each in 10-bit precision, may be needed for the proposed method. This corresponds to 0.018 Megabyte of memory. It is pointed out that currently, a CTU of size 128×128 in the standard 4:2:0 chroma-subsampling consists of 24576 values, each in 10 bit. Thus, the memory requirement of the proposed intra-prediction tool does not exceed the memory requirement of the current picture referencing tool that was adopted at the last meeting. Also, it is pointed out that the conventional intra prediction modes need four multiplications per sample due to the PDPC tool or the 4-tap interpolation filters for the angular prediction modes with fractional angle positions. Thus, in terms of operational complexity the proposed method does not exceed the conventional intra prediction modes.

6.7 Signalization of the Proposed Intra Prediction Modes

For luma blocks, 35 ALWIP modes are proposed, for example, (other numbers of modes may be used). For each Coding Unit (CU) in intra mode, a flag indicating if an ALWIP mode is to be applied on the corresponding Prediction Unit (PU) or not is sent in the bitstream. The signalization of the latter index may be harmonized with MRL in the same way as for the first CE test. If an ALWIP mode is to be applied, the index predmode of the ALWIP mode may be signaled using an MPM-list with 3 MPMS.

Here, the derivation of the MPMs may be performed using the intra-modes of the above and the left PU as follows. There may be tables, e.g. three fixed tables map_angular_to_alwip$_{idx}$, idx$\in\{0,1,2\}$ that may assign to each conventional intra prediction mode predmode$_{Angular}$ an ALWIP mode $$predmode_{ALWIP} = map\_angular\_to\_alwip_{idx}[predmode_{Angular}].$$

For each PU of width W and height H one defines and index $$idx(PU) = idx(W, H) \in \{0, 1, 2\}$$

that indicates from which of the three sets the ALWIP-parameters are to be taken as in section 4 above. If the above Prediction Unit PU$_{above}$ is available, belongs to the same CTU as the current PU and is in intra mode, if idx(PU)=idx (PU$_{above}$) and if ALWIP is applied on PU$_{above}$ with ALWIP-mode predmode$_{ALWIP}^{abov}$ $$mode_{ALWIP}^{above} = predmode_{ALWIP}^{above}.$$

If the above PU is available, belongs to the same CTU as the current PU and is in intra mode and if a conventional intra prediction mode predmode$_{Angular}^{above}$ is applied on the above PU, one puts $$mode_{ALWIP}^{above} = map\_angular\_to\_alwip_{idx(PU_{above})}[predmode_{Angular}^{above}].$$

In all other cases, one puts $$mode_{ALWIP}^{above} = -1$$

which means that this mode is unavailable. In the same way but without the restriction that the left PU needs to belong to the same CTU as the current PU, one derives a mode $$mode_{ALWIP}^{left}.$$

Finally, three fixed default lists list$_{idx}$, idx$\in\{0,1,2\}$ are provided, each of which contains three distinct ALWIP modes. Out of the default list list$_{jdx(PU)}$ and the modes mode$_{ALWIP}^{above}$ and mode$_{ALWIP}^{left}$, one constructs three distinct MPMs by substituting −1 by default values as well as eliminating repetitions.

The herein described embodiments are not limited by the above described Signalization of the proposed intra prediction modes. According to an alternative embodiment, no MPMs and/or mapping tables are used for MIP (ALWIP)

6.8 Adapted MPM-List Derivation for Conventional Luma and Chroma Intra-Prediction Modes The proposed ALWIP-modes may be harmonized with the MPM-based coding of the conventional intra-prediction modes as follows. The luma and chroma MPM-list derivation processes for the conventional intra-prediction modes may use fixed tables map_lwip_to_angular$_{idx}$, idx∈{0,1,2}, mapping an ALWIP-mode predmode$_{LWIP}$ on a given PU to one of the conventional intra-prediction modes $$predmode_{Angular} = \text{map\_lwip\_to\_angular}_{idx(PU)}[predmode_{LWIP}].$$

For the luma MPM-list derivation, whenever a neighboring luma block is encountered which uses an ALWIP-mode predmode$_{LWIP}$, this block may be treated as if it was using the conventional intra-prediction mode predmode$_{Angular}$. For the chroma MPM-list derivation, whenever the current luma block uses an LWIP-mode, the same mapping may be used to translate the ALWIP-mode to a conventional intra prediction mode.

It is clear, that the ALWIP-modes can be harmonized with the conventional intra-prediction modes also without the usage of MPMs and/or mapping tables. It is, for example, possible that for the chroma block, whenever the current luma block uses an ALWIP-mode, the ALWIP-mode is mapped to a planar-intra prediction mode.

7. IMPLEMENTATION EFFICIENT EMBODIMENTS

Let's briefly summarize the above examples as they might form a basis for further extending the embodiments described herein below.

For predicting a predetermined block 18 of the picture 10, using a plurality of neighbouring samples 17$a,c$ is used.

A reduction 100, by averaging, of the plurality of neighbouring samples has been done to obtain a reduced set 102 of samples values lower, in number of samples, than compared to the plurality of neighbouring samples. This reduction is optional in the embodiments herein and yields the so called sample value vector mentioned in the following. The reduced set of sample values is the subject to a linear or affine linear transformation 19 to obtain predicted values for predetermined samples 104 of the predetermined block. It is this transformation, later on indicated using matrix A and offset vector b which has been obtained by machine learning (ML) and should be implementation efficiently preformed.

2By interpolation, prediction values for further samples 108 of the predetermined block are derived on the basis of the predicted values for the predetermined samples and the plurality of neighbouring samples. It should be said that, theoretically, the outcome of the affine/linear transformation could be associated with non-full-pel sample positions of block 18 so that all samples of block 18 might be obtained by interpolation in accordance with an alternative embodiment. No interpolation might be needed at all, too.

The plurality of neighbouring samples might extend one-dimensionally along two sides of the predetermined block, the predetermined samples are arranged in rows and columns and, along at least one of the rows and columns, wherein the predetermined samples may be positioned at every n$^{th}$ position from a sample (112) of the predetermined sample adjoining the two sides of the predetermined block. Based on the plurality of neighbouring samples, for each of the at least one of the rows and the columns, a support value for one (118) of the plurality of neighbouring positions might be determined, which is aligned to the respective one of the at least one of the rows and the columns, and by interpolation, the prediction values for the further samples 108 of the predetermined block might be derived on the basis of the predicted values for the predetermined samples and the support values for the neighbouring samples aligned to the at least one of rows and columns. The predetermined samples may be positioned at every n$^{th}$ position from the sample 112 of the predetermined sample which adjoins the two sides of the predetermined block along the rows and the predetermined samples may be positioned at every m$^{th}$ position from the sample 112 of the predetermined sample which adjoins the two sides of the predetermined block along the columns, wherein n,m>1. It might be that n=m. Along at least one of the rows and column, the determination of the support values may be done by averaging (122), for each support value, a group 120 of neighbouring samples within the plurality of neighbouring samples which includes the neighbouring sample 118 for which the respective support value is determined. The plurality of neighbouring samples may extend one-dimensionally along two sides of the predetermined block and the reduction may be done by grouping the plurality of neighbouring samples into groups 110 of one or more consecutive neighbouring samples and performing an averaging on each of the group of one or more neighbouring samples which has more than two neighbouring samples.

For the predetermined block, a prediction residual might be transmitted in the data stream. It might be derived therefrom at the decoder and the predetermined block be reconstructed using the prediction residual and the predicted values for the predetermined samples. At the encoder, the prediction residual is encoded into the data stream at the encoder.

The picture might be subdivided into a plurality of blocks of different block sizes, which plurality comprises the predetermined block. Then, it might be that the linear or affine linear transformation for block 18 is selected depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs. Again, later on it gets clear that the affine/linear transformations are represented by way of other parameters, namely weights of C and, optionally, offset and scale parameters.

Decoder and encoder may be configured to subdivide the picture into a plurality of blocks of different block sizes, which comprises the predetermined block, and to select the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs, a second set of linear or affine linear transformations as long as the width W and height H of the predetermined block are within a second set of width/height pairs which is disjoint to the first set of width/height pairs, and a third set of linear or affine linear transformations as long as the width W and height H of the predetermined block are within a third set of one or more width/height pairs, which is disjoint to the first and second sets of width/height pairs.

The third set of one or more width/height pairs merely comprises one width/height pair, W', H', and each linear or affine linear transformation within first set of linear or affine linear transformations is for transforming N' sample values to W'*H' predicted values for an W'×H' array of sample positions.

Each of the first and second sets of width/height pairs may comprise a first width/height pairs $W_p, H_p$ with $W_p$ being unequal to $H_p$ and a second width/height pair $W_q, H_q$ with $H_q = W_p$ and $W_q = H_p$.

Each of the first and second sets of width/height pairs may additionally comprise a third width/height pairs $W_p, H_p$ with $W_p$ being equal to $H_p$ and $H_p > H_q$.

For the predetermined block, a set index might be transmitted in the data stream, which indicates which linear or affine linear transformation to be selected for block 18 out of a predetermined set of linear or affine linear transformations.

The plurality of neighbouring samples may extend one-dimensionally along two sides of the predetermined block and the reduction may be done by, for a first subset of the plurality of neighbouring samples, which adjoin a first side of the predetermined block, grouping the first subset into first groups 110 of one or more consecutive neighbouring samples and, for a second subset of the plurality of neighbouring samples, which adjoin a second side of the predetermined block, grouping the second subset into second groups 110 of one or more consecutive neighbouring samples and performing an averaging on each of the first and second groups of one or more neighbouring samples which has more than two neighbouring samples, so as to obtain first sample values from the first groups and second sample values for the second groups. Then, the linear or affine linear transformation may be selected depending on the set index out of a predetermined set of linear or affine linear transformations such that two different states of the set index result into a selection of one of the linear or affine linear transformations of the predetermined set of linear or affine linear transformations, the reduced set of sample values may be subject to the predetermined linear or affine linear transformation in case of the set index assuming a first of the two different states in form of a first vector to yield an output vector of predicted values, and distribute the predicted values of the output vector along a first scan order onto the predetermined samples of the predetermined block and in case of the set index assuming a second of the two different states in form of a second vector, the first and second vectors differing so that components populated by one of the first sample values in the first vector are populated by one of the second sample values in the second vector, and components populated by one of the second sample values in the first vector are populated by one of the first sample values in the second vector, so as to yield an output vector of predicted values, and distribute the predicted values of the output vector along a second scan order onto the predetermined samples of the predetermined block which is transposed relative to the first scan order.

Each linear or affine linear transformation within first set of linear or affine linear transformations may be for transforming N, sample values to $w_1 * h_1$ predicted values for an $w_1 \times h_1$ array of sample positions and each linear or affine linear transformation within second set of linear or affine linear transformations is for transforming $N_2$ sample values to $w_2 * h_2$ predicted values for an $w_2 \times h_2$ array of sample positions, wherein for a first predetermined one of the first set of width/height pairs, $w_1$ may exceed the width of the first predetermined width/height pair or $h_1$ may exceed the height of the first predetermined width/height pair, and for a second predetermined one of the first set of width/height pairs neither $w_1$ may exceed the width of the second predetermined width/height pair nor $h_1$ exceeds the height of the second predetermined width/height pair. The reducing (100), by averaging, the plurality of neighbouring samples to obtain the reduced set (102) of samples values might then be done so that the reduced set 102 of samples values has $N_1$ sample values if the predetermined block is of the first predetermined width/height pair and if the predetermined block is of the second predetermined width/height pair, and the subjecting the reduced set of sample values to the selected linear or affine linear transformation might be performed by using only a first sub-portion of the selected linear or affine linear transformation which is related to a subsampling of the $w_1 \times h_1$ array of sample positions along width dimension if $w_1$ exceeds the width of the one width/height pair, or along height dimension if $h_1$ exceeds the height of the one width/height pair if the predetermined block is of the first predetermined width/height pair, and the selected linear or affine linear transformation completely if the predetermined block is of the second predetermined width/height pair.

Each linear or affine linear transformation within first set of linear or affine linear transformations may be for transforming N, sample values to $w_1 * h_1$ predicted values for an $w_1 \times h_1$ array of sample positions with $w_1 = h_1$ and each linear or affine linear transformation within second set of linear or affine linear transformations is for transforming $N_2$ sample values to $w_2 * h_2$ predicted values for an $w_2 \times h_2$ array of sample positions with $w_2 = h_2$.

All of the above described embodiments are merely illustrative in that they may form the basis for the embodiment described herein below. That is, above concepts and details shall serve to understand the following embodiments and shall serve as a reservoir of possible extensions and amendments of the embodiments described herein below. In particular, many of the above described details are optional such as the averaging of neighboring samples, the fact the neighboring samples are used as reference samples and so forth.

More generally, the embodiments described herein assume that a prediction signal on a rectangular block is generated out of already reconstructed samples such as an intra prediction signal on a rectangular block is generated out of neighboring, already reconstructed samples left and above the block. The generation of the prediction signal is based on the following steps.

1. Out of the reference samples, called boundary sample now without, however, excluding the possibility of transferring the description to reference samples positioned elsewhere, samples may be extracted by averaging. Here, the averaging is carried out either for both the boundary samples left and above the block or only for the boundary samples on one of the two sides. If no averaging is carried out on a side, the samples on that side are kept unchanged.

2. A matrix vector multiplication, optionally followed by addition of an offset, is carried out where the input vector of the matrix vector multiplication is either the concatenation of the averaged boundary samples left of the block and the original boundary samples above the block if averaging was applied only on the left side, or the concatenation of the original boundary samples left of the block and the averaged boundary samples above the block if averaging was applied only on the above side or the concatenation of the averaged boundary samples left of the block and the averaged boundary samples above the block if averaging was applied on both sides of the block. Again, alternatives would exist, such as ones where averaging isn't used at all.

3. The result of the matrix vector multiplication and the optional offset addition may optionally be a reduced prediction signal on a subsampled set of samples in the original block. The prediction signal at the remaining positions may be generated from the prediction signal on the subsampled set by linear interpolation.

The computation of the matrix vector product in Step 2 should be carried out in integer arithmetic. Thus, if $x=(x_1, \ldots, x_n)$ denotes the input for the matrix vector product, i.e. x denotes the concatenation of the (averaged) boundary samples left and above the block, then out of x, the (reduced) prediction signal computed in Step 2 has should be computed using only bit shifts, the addition of offset vectors, and multiplications with integers. Ideally, the prediction signal in Step 2 would be given as Ax+b where b is an offset vector that might be zero and where A is derived by some machine-learning based training algorithm. However, such a training algorithm usually only results in a matrix $A=A_{float}$ that is given in floating point precision. Thus, one is faced with the problem to specify integer operations in the aforementioned sense such that the expression $A_{float}x$ is well approximated using these integer operations. Here, it is important to mention that these integer operations are not necessarily chosen such that they approximate the expression $A_{float}x$ assuming a uniform distribution of the vector x but typically take into account that the input vectors x for which the expression $A_{float}x$ is to be approximated are (averaged) boundary samples from natural video signals where one can expect some correlations between the components $x_i$ of x.

Figure 8:
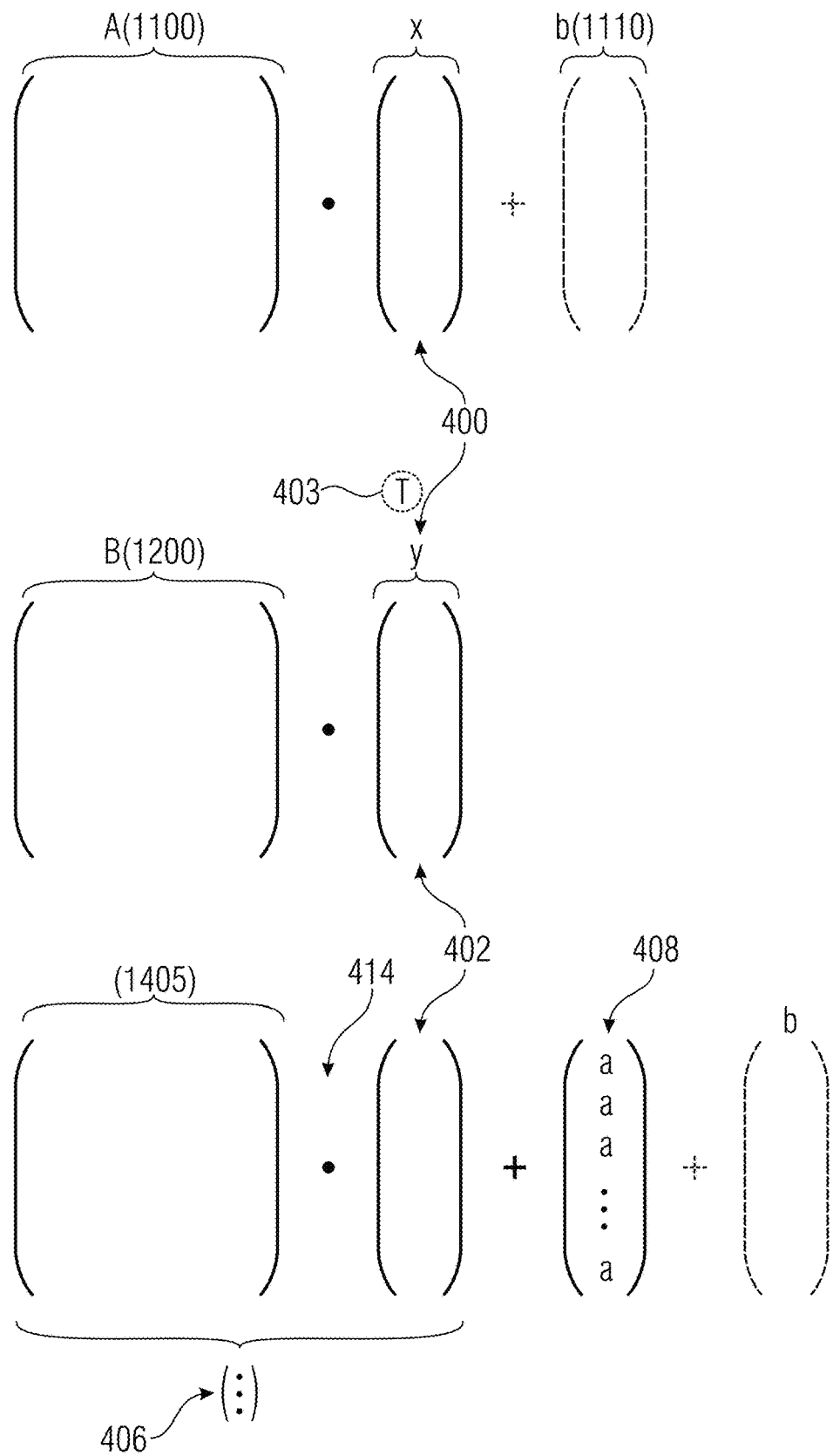
FIG. 8 shows matrix operations performed by an apparatus according to an embodiment.

FIG. 8 shows an improved ALWIP-prediction. Samples of a predetermined block can be predicted based on a first matrix-vector product between a matrix A 1100 derived by some machine-learning based training algorithm and a sample value vector 400. Optionally an offset b 1110 can be added. To achieve an integer approximation or a fixed-point approximation of this first matrix-vector product, the sample value vector can undergo an invertible linear transformation 403 to determine a further vector 402. A second matrix-vector product between a further matrix B 1200 and the further vector 402 can equal the result of the first matrix-vector product.

Because of the features of the further vector 402 the second matrix-vector product can be integer approximated by a matrix-vector product 404 between a predetermined prediction matrix C 405 and the further vector 402 plus a further offset 408. The further vector 402 and the further offset 408 can consist of integer or fixed-point values. All components of the further offset are, for example, the same. The predetermined prediction matrix 405 can be a quantized matrix or a matrix to be quantized. The result of the matrix-vector product 404 between the predetermined prediction matrix 405 and the further vector 402 can be understood as a prediction vector 406.

In the following more details regarding this integer approximation are provided.

Possible Solution According to an Example I: Subtracting and Adding Mean Values

Figure 9A:
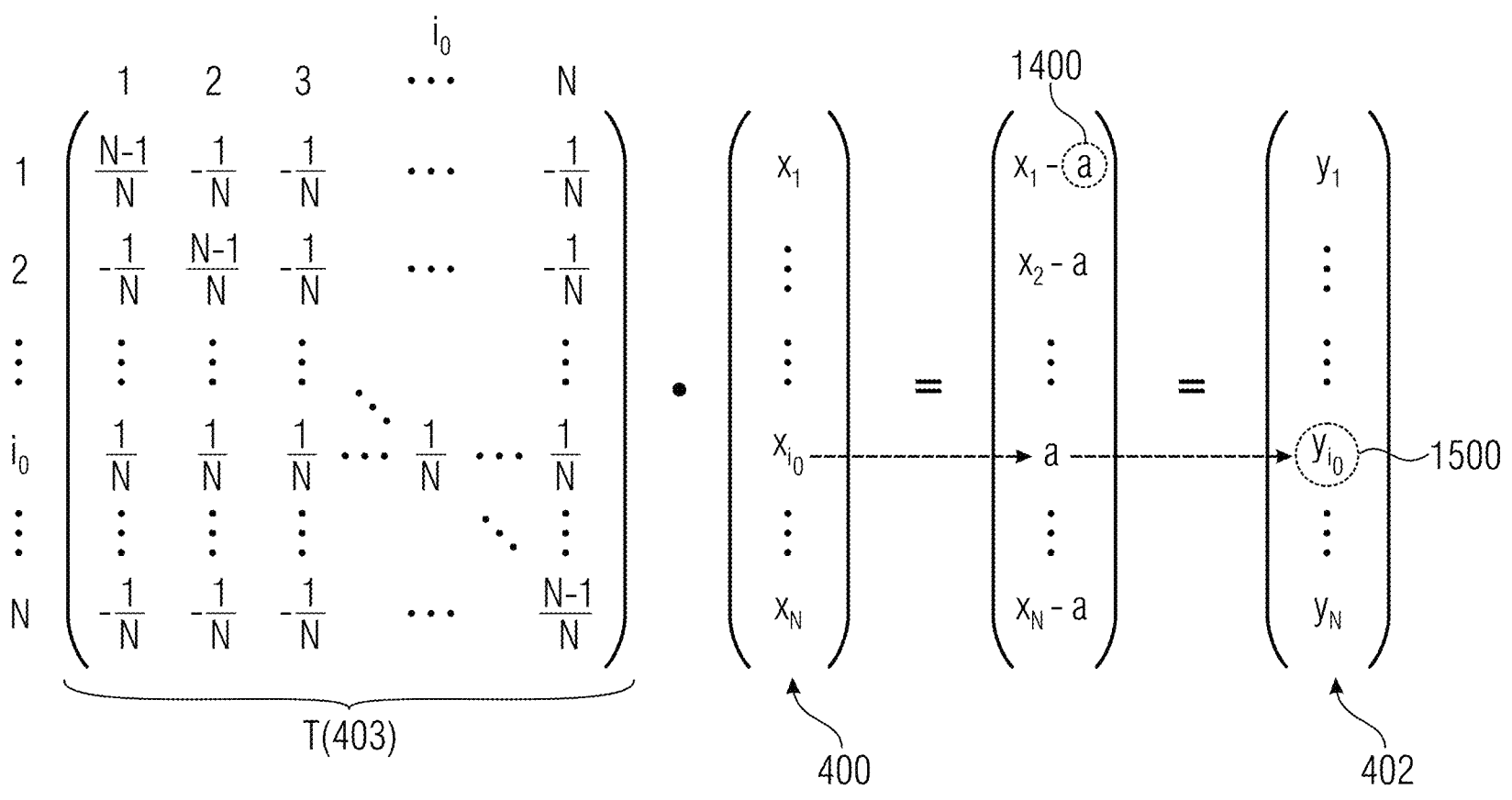

One possible incorporation of an integer approximation of an expression $A_{float}x$ useable in a scenario above is to replace the $i_0$-th component $x_{i_0}$, i.e. a predetermined component 1500, of x, i.e. the sample value vector 400, by the mean value mean (x), i.e. a predetermined value 1400, of the components of x and to subtract this mean value from all other components. In other words, the invertible linear transform 403, as shown in FIG. 9a, is defined such that a predetermined component 1500 of the further vector 402 becomes a, and each of other components of the further vector 402, except the predetermined component 1500, equal a corresponding component of the sample value vector minus a, wherein a is a predetermined value 1400 which is, for example, an average, such as an arithmetic mean or weighted average, of components of the sample value vector 400. This operation on the input is given by an invertible transform T 403 that has an obvious integer implementation in particular if the dimension n of x is a power of two.

Figure 9B:
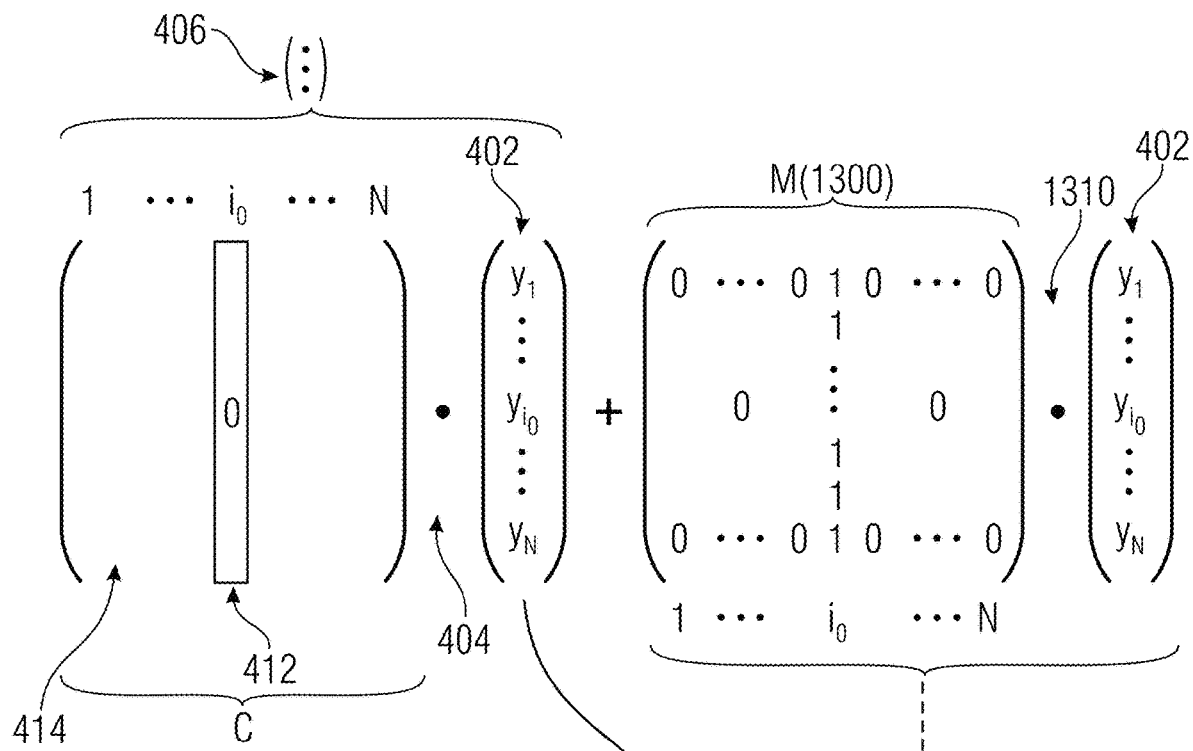

Since $A_{float}=(A_{float}T^{-1})T$, if one does such a transformation on the input x, one has to find an integral approximation of the matrix vector product By, where $B=(A_{float}T^{-1})$ and y=Tx. Since the matrix-vector product $A_{float}x$ represents a prediction on a rectangular block, i.e. a predetermined block, and since x is comprised by (e.g., averaged) boundary samples of that block, one should expect that in the case where all sample values of x are equal, i.e. where $x_i$=mean (x) for all i, each sample value in the prediction signal $A_{float}x$ should be close to mean(x) or be exactly equal to mean(x). This means that one should expect that the $i_0$-th column, i.e. the column corresponding to the predetermined component, of B is very close or equal to a column that consist only of ones. Thus, if $M(i_0)$, i.e. an integer matrix 1300, is the matrix whose $i_0$th column consists of ones and all of whose other columns are zero, writing $By=Cy+M(i_0)y$ with $C=B-M(i_0)$, one should expect that the $i_0$-th column of C, i.e. the predetermined prediction matrix 405, has rather small entries or is zero, as shown in FIG. 9b. Moreover, since the components of x are correlated, one can expect that for each $i \neq i_0$, the i-th component $y_i=x_i-$mean(x) of y often has a much smaller absolute value than the i-th component of x. Since the matrix $M(i_0)$ is an integer matrix, an integer approximation of By is achieved if an integer approximation of Cy is given and, by the above arguments, one can expect that the quantization error that arises by quantizing each entry of C in a suitable way should only marginally impact the error in the resulting quantization of By resp. of $A_{float}x$.

The predetermined value 1400 is not necessarily the mean value mean (x). The herein described integer approximation of the expression $A_{float}x$ can also be achieved with the following alternative definitions of the predetermined value 1400:

In another possible incorporation of an integer approximation of an expression $A_{float}x$, the $i_0$-th component $x_{i_0}$ of x remains unaltered and the same value $x_{i_0}$ is subtracted from all other components. That is, $y_{i_0}=x_{i_0}$ and $y_i=x_i-x_{i_0}$ for each $i \neq i_0$. In other words, the predetermined value 1400 can be a component of the sample value vector 400 corresponding to the predetermined component 1500.

Alternatively, the predetermined value 1400 is a default value or a value signaled in a data stream into which a picture is coded.

The predetermined value 1400 equals, for example, $2^{bitdepth-1}$. In this case, the further vector 402 can be defined by $y_0=2^{bitdepth-1}$ and $y_i=x_i-x_0$ for i>0.

Alternatively, the predetermined component 1500 becomes a constant minus the predetermined value 1400. The constant equals, for example, $2^{bitdepth-1}$. According to an embodiment, the predetermined component $y_{i_0}$ 1500 of the further vector y 402 equals $2^{bitdepth-1}$ minus a component $x_{i_0}$ of the sample value vector 400 corresponding to the predetermined component 1500 and all other components of the further vector 402 equal the corresponding component of the sample value vector 400 minus the component of the sample value vector 400 corresponding to the predetermined component 1500.

It is, for example, advantageous if the predetermined value 1400 has a small deviation from prediction values of samples of the predetermined block.

According to an embodiment, the apparatus 1000 is configured to comprise a plurality of invertible linear transforms 403, each of which is associated with one component of the further vector 402. Furthermore, the apparatus is, for example, configured to select the predetermined component 1500 out of the components of the sample value vector 400 and use the invertible linear transform 403 out of the plurality of invertible linear transforms which is associated with the predetermined component 1500 as the predetermined invertible linear transform. This is, for example, due to different positions of the $i_0^{th}$ row, i.e. a row of the invertible linear transform 403 corresponding to the predetermined component, dependent on a position of the predetermined component in the further vector. If, for example, the first component, i.e. $y_1$, of the further vector 402 is the predetermined component, the $i_0^{th}$ row would replace the first row of the invertible linear transform.

Figure 9C:
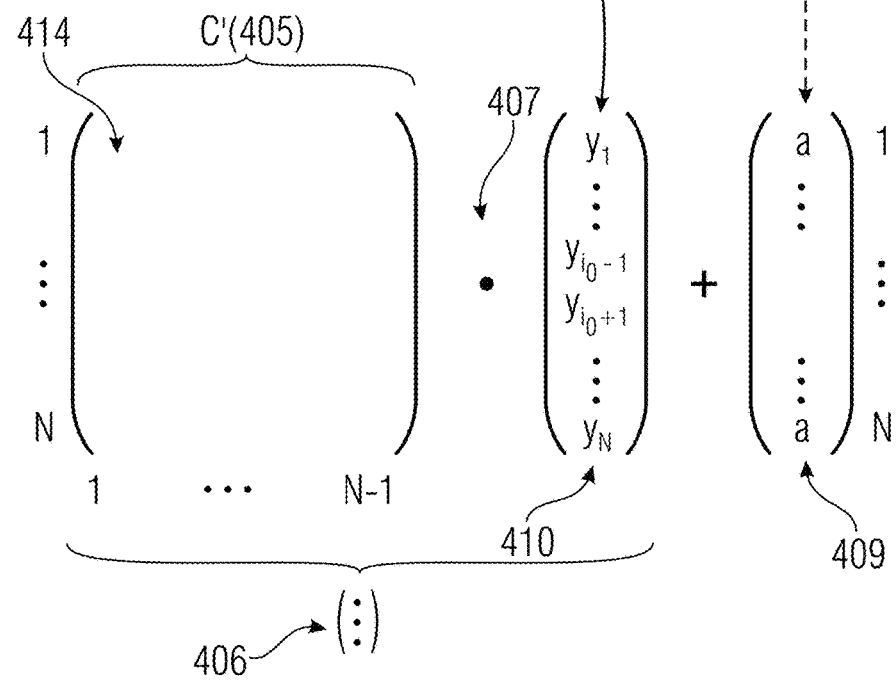

As shown in FIG. 9b, matrix components 414 of the predetermined prediction matrix C 405 within a column 412, i.e. an $i_0^{th}$ column, of the predetermined prediction matrix 405 which corresponds to the predetermined component 1500 of the further vector 402 are, for example, all zero. In this case, the apparatus is, for example, configured to compute the matrix-vector product 404 by performing multiplications by computing a matrix vector product 407 between a reduced prediction matrix C' 405 resulting from the predetermined prediction matrix C 405 by leaving away the column 412 and an even further vector 410 resulting from the further vector 402 by leaving away the predetermined component 1500, as shown in FIG. 9c. Thus a prediction vector 406 can be calculated with less multiplications.

As shown in FIGS. 8, 9b and 9c, the apparatus 1000 can be configured to, in predicting the samples of the predetermined block on the basis of the prediction vector 406, compute for each component of the prediction vector 406 a sum of the respective component and a, i.e. the predetermined value 1400. This summation can be represented by a sum of the prediction vector 406 and a vector 409 with all components of the vector 409 being equal to the predetermined value 1400, as shown in FIG. 8 and FIG. 9c. Alternatively the summation can be represented by a sum of the prediction vector 406 and a matrix-vector product 1310 between an integer matrix M 1300 and the further vector 402, as shown in FIG. 9b, wherein matrix components of the integer matrix 1300 are 1 within a column, i.e. an $i_0^{th}$ column, of the integer matrix 1300 which corresponds to the predetermined component 1500 of the further vector 402, and all other components are, for example, zero.

A result of a summation of the predetermined prediction matrix 405 and the integer matrix 1300 equals or approximates, for example, the further matrix 1200, shown in FIG. 8.

In other words, a matrix, i.e. the further matrix B 1200, which results from summing each matrix component of the predetermined prediction matrix C 405 within a column 412, i.e. the $i_0^{th}$ column, of the predetermined prediction matrix 405, which corresponds to the predetermined component 1500 of the further vector 402, with one, (i.e. matric B) times the invertible linear transform 403 corresponds, for example, to a quantized version of a machine learning prediction matrix A 1100, as shown in FIG. 8, FIG. 9a and FIG. 9b. The summing of each matrix component of the predetermined prediction matrix C 405 within the $i_0^{th}$ column 412 with one can correspond to the summation of the predetermined prediction matrix 405 and the integer matrix 1300, as shown in FIG. 9b. As shown in FIG. 8 the machine learning prediction matrix A 1100 can equal the result of the further matrix 1200 times the invertible linear transform 403. This is due to $A \cdot x = B T \cdot y T^{-1}$. The predetermined prediction matrix 405 is, for example, a quantized matrix, an integer matrix and/or a fixed-point matrix, whereby the quantized version of the machine learning prediction matrix A 1100 can be realized.

Matrix Multiplication Using Integer Operations Only

For a low complexity implementation (in terms of complexity of adding and multiplying scalar values, as well as in terms of storage needed for the entries of the partaking matrix), it is desirable to perform the matrix multiplications 404 using integer arithmetic only.

To calculate an approximation of z=Cy, i.e.

$$z_i = \sum_{j=0}^{n-1} C_{i,j} * y_j,$$

using operations on integers only, the real values $C_{i,j}$ are to be mapped to integer values according to an embodiment. This can be done for example by uniform scalar quantization, or by taking into account specific correlations between values y. The integer values represent, for example fixed-point numbers that can each be stored with a fixed number of bits n_bits, for example n_bits=8.

The matrix vector product 404 with a matrix, i.e. the predetermined prediction matrix 405, of size m×n can then be carried out like shown in this pseudo code, where <<, >> are arithmetic binary left- and right-shift operations and +, − and * operate on integer values only.

```
(1)
final_offset = 1 << (right_shift_result − 1);
for i in 0 . . . m−1
{
    accumulator = 0
    for j in 0 . . . n−1
    {
        accumulator: = accumulator + y[j]*C[i,j]
    }
    z[i[ = (accumulator + final_offset) >> right_shift_result;
}
```

Here, the array C, i.e. the predetermined prediction matrix 405, stores the fixed point numbers, for example, as integers. The final addition of final_offset and the right-shift operation with right_shift_result reduce precision by rounding to obtain a fixed point format needed at the output.

To allow for an increased range of real values representable by the integers in C, two additional matrices $offset_{i,j}$ and scale$_{i,j}$ can be used, as shown in the embodiments of FIG. 10 and FIG. 11, such that each coefficient b$_{i,j}$ of y$_j$ in the matrix-vector product $$z_i = \sum_{j=0}^{n-1} b_{i,j} * y_j$$

$$b_{i,j} = (\hat{C}_{i,j} - \text{offset}_{i,j}) * \text{scale}_{i,j}.$$

is given by

The values offset$_{i,j}$ and scale$_{i,j}$ are themselves integer values. For example these integers can represent fixed-point numbers that can each be stored with a fixed number of bits, for example 8 bits, or for example the same number of bits n_bits that is used to store the values $\hat{C}_{i,j}$.

In other words, the apparatus 1000 is configured to represent the predetermined prediction matrix 405 using prediction parameters, e.g. integer values $\hat{C}_{i,j}$ and the values offset$_{i,j}$ and scale$_{i,j}$, and to compute the matrix-vector product 404 by performing multiplications and summations on the components of the further vector 402 and the prediction parameters and intermediate results resulting therefrom, wherein absolute values of the prediction parameters are representable by an n-bit fixed point number representation with n being equal to or lower than 14, or, alternatively, 10, or, alternatively, 8. For instance, the components of the further vector 402 are multiplied with the prediction parameters to yield products as intermediate results which, in turn, are subject to, or form addends of, a summation.

According to an embodiment, the prediction parameters comprise weights each of which is associated with a corresponding matrix component of the prediction matrix. In other words, the predetermined prediction matrix is, for example, replaced or represented by the prediction parameters. The weights are, for example, integer and/or fixed point values.

According to an embodiment, the prediction parameters further comprise one or more scaling factors, e.g. the values scale$_{i,j}$, each of which is associated with one or more corresponding matrix components of the predetermined prediction matrix 405 for scaling the weight, e.g. an integer value $\hat{C}_{i,j}$, associated with the one or more corresponding matrix component of the predetermined prediction matrix 405. Additionally or Alternatively, the prediction parameters comprise one or more offsets, e.g. the values offset$_{i,j}$, each of which is associated with one or more corresponding matrix components of the predetermined prediction matrix 405 for offsetting the weight, e.g. an integer value $\hat{C}_{i,j}$ associated with the one or more corresponding matrix component of the predetermined prediction matrix 405.

In order to reduce the amount of storage needed for offset$_{i,j}$ and scale$_{i,j}$, their values can be chosen to be constant for particular sets of indices i,j. For example, their entries can be constant for each column or they can be constant for each row, or they can be constant for all i,j, as shown in FIG. 10

For example, in one embodiment, offset$_{i,j}$ and scale$_{i,j}$ are constant for all values of a matrix of one prediction mode, as shown in FIG. 11. Thus, when there are K prediction modes with k=0 . . . K−1, only a single value o$_k$ and a single value s$_k$ is needed to calculate the prediction for mode k.

According to an embodiment, offset$_{i,j}$ and/or scale$_{i,j}$ are constant, i.e. identical, for all matrix-based intra prediction modes. Additionally or Alternatively, it is possible, that offset$_{i,j}$ and/or scale$_{i,j}$ are constant, i.e. identical, for all block sizes.

With offset representing o$_k$ and scale representing s$_k$, the calculation in (1) can be modified to be:

```
(2)
final_offset = 0;
for i in 0 . . . n−1
{
    final_offset: = final_offset − y[i];
}
final_offset *= final_offset * offset * scale;
final_offset += 1 << (right_shift_result − 1);
for i in 0. . .m−1
{
    accumulator = 0
    for j in 0 . . . n−1
    {
        accumulator: = accumulator + y[j]*C[i,j]
    }
    z[i] = (accumulator*scale + final_offset) >> right_shift_result;
}
```

Broadened Embodiments Arising from that Solution

The above solution implies the following embodiments:
1. A prediction method as in Section I, where in Step 2 of Section I, the following is done for an integer approximation of the involved matrix vector product: Out of the (averaged) boundary samples x=(x$_1$, . . . , x), for a fixed i$_0$ with 1≤i$_0$≤n, the vector y=(y$_1$, . . . , y$_n$) is computed, where y$_i$=x$_i$−mean(x) for i≠i$_0$ and where y$_{i_0}$=mean(x) and where mean(x) denotes the mean-value of x. The vector y then serves as an input for (an integer realization of) a matrix vector product Cy such that the (downsampled) prediction signal pred from Step 2 of Section I is given as pred=Cy+meanpred(x). In this equation, meanpred(x) denotes the signal that is equal to mean(x) for each sample position in the domain of the (downsampled) prediction signal. (see, e.g., FIG. 9b)
2. A prediction method as in Section I, where in Step 2 of Section I, the following is done for an integer approximation of the involved matrix vector product: Out of the (averaged) boundary samples x=(x$_1$, . . . , x$_n$), for a fixed i$_0$ with 1≤i$_0$≤ n, the vector y=(y$_1$, . . . , y$_{n-1}$) is computed, where y$_i$=x$_i$−mean(x) for i<i$_0$ and where y$_i$=x$_{i+1}$−mean(x) for i≥i$_0$ and where mean(x) denotes the mean-value of x. The vector y then serves as an input for (an integer realization of) a matrix vector product Cy such that the (downsampled) prediction signal pred from Step 2 of Section I is given as pred=Cy+meanpred(x). In this equation, meanpred(x) denotes the signal that is equal to mean(x) for each sample position in the domain of the (downsampled) prediction signal. (see, e.g., FIG. 9c)
3. A prediction method as in Section I, where the integer realization of the matrix vector product Cy is given by using coefficients b$_{i,j}$=($\hat{C}_{i,j}$−offset$_{i,j}$)*scale$_{i,j}$ in the matrix-vector product z$_i$=Σ$_j$b$_{i,j}$*y$_j$. (see, e.g., FIG. 10)
4. A prediction method as in Section I, where step 2 uses one of K matrices, such that multiple prediction modes can be calculated, each using a different matrix $\hat{C}_k$ with k=0 . . . K−1, where the integer realization of the matrix vector product C$_k$ y is given by using coefficients b$_{i,j}$($\hat{C}_{k,i,j}$−offset$_k$)*scale$_k$ in the matrix-vector product z$_i$=Σ1b$_{i,j}$*y$_j$. (see, e.g., FIG. 11)

That is, in accordance with embodiments of the present application, encoder and decoder act as follows in order to predict a predetermined block 18 of a picture 10, see FIG. 8. For predicting, a plurality of reference samples is used. As outlined above, embodiments of the present application would not be restricted to intra-coding and accordingly, reference samples would not be restricted to be neighboring samples, i.e. samples of picture 10 neighboring block 18. In particular, the reference samples would not be restricted to the ones arranged alongside an outer edge of block 18 such as samples abutting the block's outer edge. However, this circumstance is certainly one embodiment of the present application.

In order to perform the prediction, a sample value vector 400 is formed out of the reference samples such as reference samples 17a and 17c. A possible formation has been described above. The formation may involve an averaging, thereby reducing the number of samples 102 or the number of components of vector 400 compared to the reference samples 17 contributing to the formation. The formation may also, as described above, somehow depend on the dimension or size of block 18 such as its width and height.

It is this vector 400 which is ought to be subject to an affine or linear transform in order to obtain the prediction of block 18. Different nomenclatures have been used above. Using the most recent one, it is the aim to perform the prediction by applying vector 400 to matrix A by way of a matrix vector product within performing a summation with an offset vector b. The offset vector b is optional. The affine or linear transformation determined by A or A and b, might be determined by encoder and decoder or, to be more precise, for sake of prediction on the basis of the size and dimension of block 18 as already described above.

However, in order to achieve the above-outlined computational efficiency improvement or render the prediction more effective in terms of implementation, the affine or linear transform has been quantized, and encoder and decoder, or the predictor thereof, used the above-mentioned C and T in order to represent and perform the linear or affine transformation, with C and T, applied in the manner described above, representing a quantized version of the affine transformation. In particular, instead of applying vector 400 directly to a matrix A, the predictor in encoder and decoder, applies vector 402 resulting from the sample value vector 400 by way of subjecting same to a mapping via a predetermined invertible linear transform T. It might be that transform T as used here is the same as long as vector 400 has the same size, i.e. does not depend on the block's dimensions, i.e. width and height, or is at least the same for different affine/linear transformations. In the above, vector 402 has been denoted y. The exact matrix in order to perform the affine/linear transform as determined by machine learning would have been B. However, instead of exactly performing B, the prediction in encoder and decoder is done by way of an approximation or quantized version thereof. In particular, the representation is done via appropriately representing C in the manner outlined above with C+M representing the quantized version of B.

Accordingly, the prediction in encoder and decoder is further prosecuted by computing the matric-vector product 404 between vector 402 and the predetermined prediction matrix C appropriately represented and stored at encoder and decoder in the manner described above. The vector 406 which results from this matrix-vector product, is then used for predicting the samples 104 of block 18. As described above, for sake of prediction, each component of vector 406 might be subject to a summation with parameter a as indicated at 408 in order to compensate for the corresponding definition of C. The optional summation of vector 406 with offset vector b may also be involved in the derivation of the prediction of block 18 on the basis of vector 406. It might be that, as described above, each component of vector 406, and accordingly, each component of the summation of vector 406, the vector of all a's indicated at 408 and the optional vector b, might directly correspond to samples 104 of block 18 and, thus, indicate the predicted values of the samples. It may also be that only a sub-set of the block's samples 104 is predicted in that manner and that the remaining samples of block 18, such as 108, are derived by interpolation.

As described above, there are different embodiments for setting a. For instance, it might be the arithmetic mean of the components of vector 400. For that case, see FIG. 9. The invertible linear transform T may be as indicated in the FIG. 9. $i_0$ is the predetermined component of the sample value vector and vector 402, respectively, which is replaced by a. However, as also indicated above, there are other possibilities. However, as far as the representation of C is concerned, it has also been indicated above that same may be embodied differently. For instance, the matrix-vector product 404 may, in its actual computation, end up in the actual computation of a smaller matrix-vector product with lower dimensionality. In particular, as indicated above, it might be that owing to the definition of C, its whole $i_0^{th}$ column 412 gets 0 so that the actual computation of product 404 may be done by a reduced version of vector 402 which results from vector 402 by the omission of component $y_{i_0}$, namely by multiplying this reduced vector 410 with the reduced matrix C' resulting from C by leaving out the $i_0^{th}$ column 412.

The weights of C or the weights of C', i.e. the components of this matrix, may be represented and stored in fixed-point number representation. These weights 414 may, however, also, as described above, be stored in a manner related to different scales and/or offsets. Scale and offset might be defined for the whole matrix C, i.e. be equal for all weights 414 of matrix C or matrix C', or may be defined in a manner so as to be constant or equal for all weights 414 of the same row or all weights 414 of the same column of matrix C and matrix C', respectively. FIG. 10 illustrates, in this regard, that the computation of the matrix-vector product, i.e. the result of the product, may in fact be performed slightly different, namely for instance, by shifting the multiplication with the scale(s) towards the vector 402 or 404, thereby reducing the number of multiplications having to be performed further. FIG. 11 illustrates the case of using one scale and one offset for all weights 414 of C or C' such as done in above calculation (2).

According to an embodiment, the herein described apparatus for predicting a predetermined block of a picture can be configured to use a matrix-based intra sample prediction comprising the following features:

The apparatus is configured to form a sample value vector pTemp[x] 400 out of the plurality of reference samples 17. Assuming pTemp[x] to be 2*boundarySize, pTemp[x] might be populated by—e.g. by direct copying or by sub-sampling or pooling—the neighboring samples located at the top of the predetermined block, redT[x] with x=0 . . . boundarySize-1, followed by the neighboring samples located to the left of the predetermined block, redL[x] with x=0 . . . boundarySize-1, (e.g. in case of is Transposed=0) or vice versa in case of the transposed processing (e.g. in case of is Transposed=1).

The input values p[x] with x=0 . . . inSize-1 are derived, i.e. the apparatus is configured to derive from the sample value vector pTemp[x] a further vector p[x] onto which the sample value vector pTemp[x] is mapped by a predetermined invertible linear transform, or to be more specific predetermined invertible affine linear transform, as follows:

If mipSizeId is equal to 2, the following applies:

$$p[x] = pTemp[x+1] - pTemp[0]$$

Otherwise (mipSizeId is less than 2), the following applies:

$$p[0] = (1 \ll (BitDepth - 11)) - pTemp[0]$$
$$p[x] = pTemp[x] - pTemp[0] \quad \text{for } x = 1 \ldots inSize - 1$$

Here, the variable mipSizeId is indicative of the size of predetermined block. That is, according to the present embodiment, the invertible transform using which the further vector is derived from the sample value vector, depends on the size of the predetermined block. The dependency might be given according to

| mipSizeId | boundarySize | predSize |
|-----------|--------------|----------|
| 0 | 2 | 4 |
| 1 | 4 | 4 |
| 2 | 4 | 8 |

Where predSize is indicative of the number of predicted samples within the predetermined block, and 2*bondarySize is indicative of the size of the sample value vector and is related to inSize, i.e. the further vector'S size, according to inSize=(2*boundarySize)-(mipSizeId==2)?1:0. To be more precise, inSize indicates the number of those components of the further vector which actually participate in the computation. inSize is as large as the size of sample value vector for smaller block sizes, and one component smaller for larger block sizes. In the former case, one component may be disregarded, namely the one which would correspond to the predetermined component of the further vector, as in the matrix vector product to be computed later on, the contribution of the corresponding vector component would yield zero anyway and, thus, needs not to be actually computed. The dependency on the block size might be left off in case of alternative embodiments, where merely one of the two alternatives is used inevitably, i.e. irrespective of the block size (the option corresponding to mipSizeId is less than 2, or the option corresponding to mipSizeId equal to 2).

In other words, the predetermined invertible linear transform is, for example, defined such that a predetermined component of the further vector p becomes a, while all others correspond to a component of the sample value vector minus a, wherein e.g. a=pTemp[0]. In case of the first option corresponding to mipSizeId equal to 2, this is readily visible and only the differentially formed components of the further vector are further taken into account. That is, in the case of the first option, the further vector is actually p[0 . . . inSize];pTemp[0]) wherein pTemp[0] is a and the actually computed part of the matrix vector multiplication to yield the matrix vector product, i.e. the result of the multiplication, is restricted to only inSize components of the further vector and the corresponding columns of the matrix, as the matrix has a zero column which needs no computation. In other case, corresponding to mipSizeId smaller than 2, a=pTemp[0] is chosen, as all components of the further vector except p[0], i.e. each of other components p[x] (for x=1 . . . inSize−1) of the further vector p, except the predetermined component p[0], equal a corresponding component of the sample value vector pTemp[x] minus a, but p[0] is chosen to be a constant minus a. The matrix vector product is then computed. The constant is the mean of representable values, i.e. $2^{x-1}$ (i.e. 1<<(BitDepth−1)) with x denoting the bit depth of the computational representation used. It should be noted that, if p[0] was selected to be pTemp[0] instead, then the product computed would simply deviate from the one computed using p[0] as indicated above (p[0]=(1<<(BitDepth−1))−pTemp[0]), by a constant vector which could be taken into account when predicting the block inner based on the product, i.e. the prediction vector. The value a is, thus, a predetermined value, e.g., pTemp[0]. The predetermined value pTemp[0] is in this case, for example, a component of the sample value vector pTemp corresponding to the predetermined component p[0]. It might be the neighboring sample to the top of the predetermined, or the left of the predetermined block, nearest to the upper left corner of the predetermined block.

For the intra sample prediction process according to predModeIntra, e.g., specifying the intra prediction mode, the apparatus is, for example, configured to apply the following steps, e.g. perform at least the first step:

1. The matrix-based intra prediction samples predMip[x][y], with x=0 . . . predSize−1, y=0 . . . predSize−1 are derived as follows:

The variable modeId is set equal to predModeIntra.
    The weight matrix mWeight[x][y] with x=0 . . . inSize−1, y=0 . . . predSize*predSize−1 is derived by invoking the MIP weight matrix derivation process with mipSizeId and modeId as inputs.
    The matrix-based intra prediction samples predMip[x][y], with x=0 . . . predSize−1, y=0 . . . predSize−1 are derived as follows:

$$oW = 32 - 32 * \left(\sum_{i=0}^{inSize-1} p[i]\right)$$

$$predMip[x][y] =$$
$$\left(\left(\left(\sum_{i=0}^{inSize-1} mWeight[i][y*predSize + x] * p[i]\right) + oW\right) >> 6\right) + pTemp[0]$$

In other words, the apparatus is configured to compute a matrix-vector product between the further vector p[i] or, in case of mipSizeId equal to 2, {p[i];pTemp[0]} and a predetermined prediction matrix mWeight or, in case of mipSizeId smaller than 2, the prediction matrix mWeight having an additional zero weight line corresponding to the omitted component of p, so as to obtain a prediction vector, which, here, has already been assigned to an array of block positions {x,y} distributed in the inner of the predetermined block so as to result in the array predMip[x][y]. The prediction vector would correspond to a concatenation of the rows of predMip[x][y] or the columns of predMip[x][y], respectively.

According to an embodiment, or according to a different interpretation, only the component $(((\sum_{i=0}^{inSize-1} mWeight[i][y*predSize+x]*p[i])+oW)>>6)$ is understood as the prediction vector and the apparatus is configured to, in predicting the samples of the predetermined block on the basis of the prediction vector, compute for each component of the prediction vector a sum of the respective component and a, e.g. pTemp[0].

The apparatus can optionally be configured to perform additionally the following steps in predicting the samples of the predetermined block on the basis of the prediction vector, e.g. predMip or $((\Sigma_{i=0}^{inSize-1} mWeight[i][y*predSize+x]*p[i])+oW)>>6$.

2. The matrix-based intra prediction samples predMip[x][y], with x=0 ... predSize−1, y=0 ... predSize−1 are, for example, clipped as follows:

$predMip[x][y] = Clip1(predMip[x][y])$

3. When isTransposed is equal to TRUE, the predSize× predSize array predMip[x][y] with x=0 ... predSize−1, y=0 ... predSize−1 is, for example, transposed as follows:

$predTemp[y][x] = predMip[x][y]$ $predMip = predTemp$

4. The predicted samples predSamples[x][y], with x=0 ... nTbW−1, y=0 ... nTbH−1 are, for example, derived as follows:
   If nTbW, specifying the transform block width, is greater than predSize or nTbH, specifying the transform block height, is greater than predSize, the MIP prediction upsampling process is invoked with the input block size predSize, matrix-based intra prediction samples predMip[x][y] with x=0 ... predSize−1, y=0 ... predSize−1, the transform block width nTbW, the transform block height nTbH, the top reference samples refT[x] with x=0 nTbW−1, and the left reference samples refL[y] with y=0 ... nTbH−1 as inputs, and the output is the predicted sample array predSamples.
   Otherwise, predSamples[x][y], with x=0 ... nTbW−1, y=0 ... nTbH−1 is set equal to predMip[x][y].

In other words, the apparatus is configured to predict samples predSamples of the predetermined block on the basis of the prediction vector predMip.

8. EMBODIMENTS USING BLOCK-BASED INTRA PREDICTION MODES ALONG WITH OTHER INTRA-PREDICTION MODES

All the above description shall be seen as optional implementation details for the embodiments described now. Please note that in the following, the term block-based intra prediction is used to denoted an intra-prediction mode which may be embodied or equal those indicated by ALWIP above.

Figure 12:
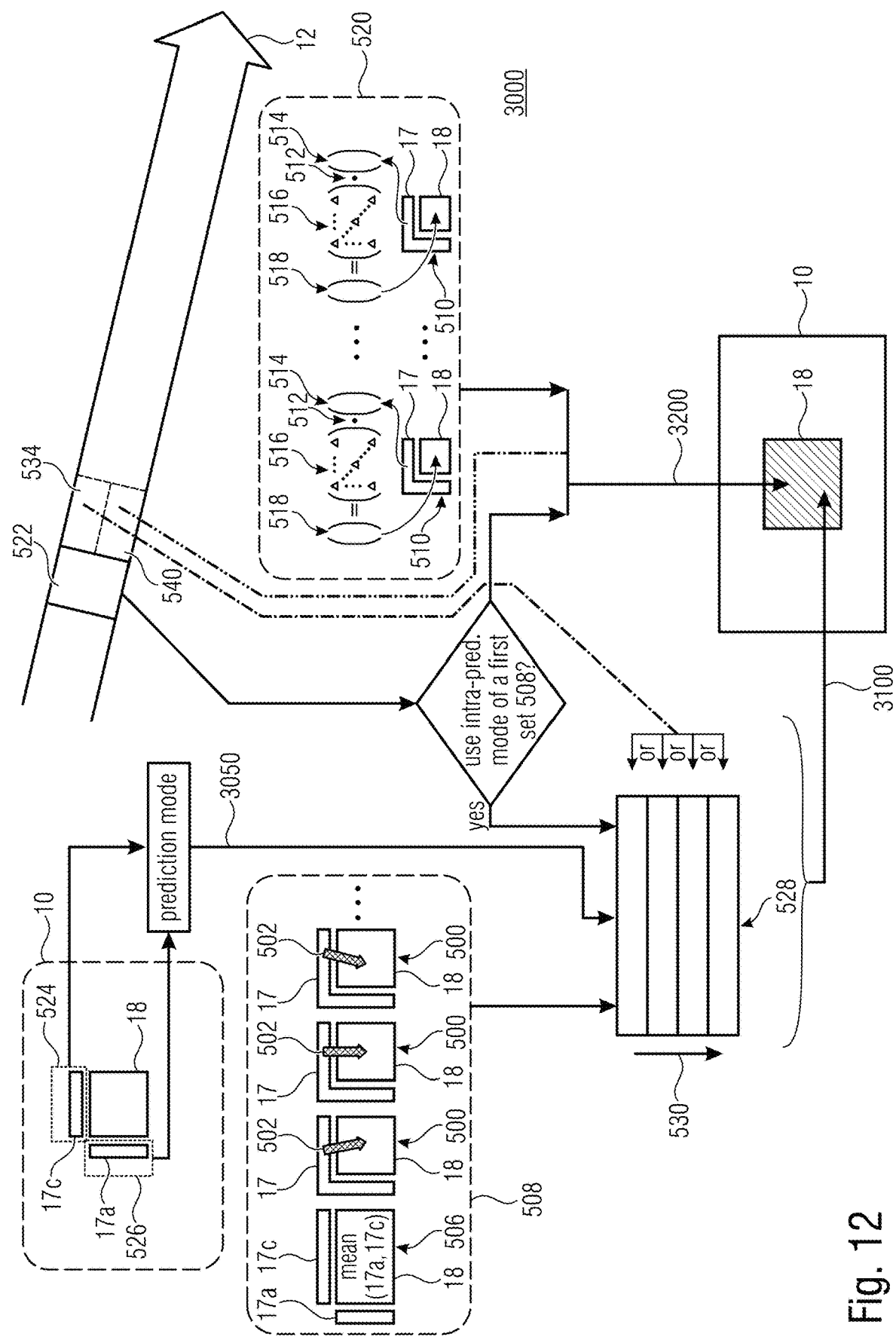
FIG. 12 shows a schematic diagram of an apparatus for decoding a predetermined block according to an embodiment.

FIG. 12 shows an embodiment of an apparatus 3000 for decoding a predetermined block 18 of a picture 10 using intra-prediction. The apparatus 3000 is configured to derive a set-selective syntax element 522 from a data stream 12 which indicates whether the predetermined block 18 is to be predicted using one of a first set 508 of intra-prediction modes comprising a DC intra prediction mode 506 and angular prediction modes 500. The data stream 12 can comprise different syntax elements and/or indices indicating functions of the apparatus 3000.

If the set-selective syntax element 522 indicates that the predetermined block 18 is to be predicted using one of the first set 508 of intra-prediction modes, the apparatus 3000 is configured to form a list 528 of most probable intra-prediction modes on the basis of intra-prediction modes 3050 using when neighbouring blocks 524, 526 neighbouring the predetermined block 18 are predicted. In other words, intra-prediction modes 506, 500 of the first set 508 of intra-prediction modes are positioned/arranged in the list 528 of most probable intra-prediction modes based on intra-prediction modes 3050 used for a prediction of the neighbouring blocks 524 and 526. The apparatus 3000 is, for example, configured to save prediction modes used for already predicted blocks and obtain the prediction-modes 3050 used for the neighbouring blocks 524 and 526 out of the saved prediction modes or analyse the neighbouring blocks 524 and 526 to obtain the prediction-modes 3050 used for the neighbouring blocks 524 and 526. According to an embodiment, the apparatus 3000 is configured to search for equal or similar intra-prediction modes as the prediction-modes 3050 used for the neighbouring blocks 524 and 526 in the first set 508 of intra-prediction modes and form the list 528 of most probable intra-prediction modes out of this equal or similar intra-prediction modes.

The list 528 of most probable intra-prediction modes is formed such that the list 528 of most probable intra-prediction modes is free of the DC intra prediction mode 506 in case of the neighbouring blocks 524 and 526 exclusively being predicted by any of the angular intra prediction modes 500. Thus an availability of the DC intra prediction mode 506 depends only on the neighbouring blocks 524 and 526 of the predetermined block 18 and not on other blocks of the picture 10. No DC intra prediction mode 506 is, for example, positioned/arranged in the list 528 of most probable intra-prediction modes if at least one neighbouring block 524 or 526 is predicted using an angular intra prediction mode 500. The list 528 of most probable intra-prediction modes may also be free of the DC intra prediction mode 506 if both neighbouring blocks 524 and 526 are predicted using an angular intra prediction mode 500.

Furthermore, the apparatus is configured to derive an MPM list index 534 from the data stream, if the set-selective syntax element 522 indicates that the predetermined block 18 is to be predicted using one of the first set 508 of intra-prediction modes. The MPM list index 534 points into the list 528 of most probable intra-prediction modes onto a predetermined intra-prediction mode. The apparatus 3000 is configured to intra-predict the predetermined block 18 using the predetermined intra-prediction mode 3100.

If the set-selective syntax element 522 indicates that the predetermined block 18 is not to be predicted using one of the first set 508 of intra-prediction modes, the apparatus 3000 is configured to derive a further index 540 from the data stream 12 which indicates a predetermined matrix-based intra-prediction mode, i.e. a predetermined block-based intra-prediction mode 3200, out of a second set 520 of matrix-based intra-prediction modes, i.e. of block-based intra-prediction modes 510. In other words, a predetermined block-based intra-prediction mode 3200 out of the second set 520 of block-based intra-prediction modes is chosen based in the further index 540 for a prediction of the predetermined block 18. The apparatus 3000 is configured to compute a matrix-vector product 512 between a vector 514 derived from reference samples 17 in a neighbourhood of the predetermined block 18 and a predetermined prediction matrix 516 associated with the predetermined matrix-based intra-prediction mode 3200 so as to obtain a prediction vector 518, and predict samples of the predetermined block 18 on the basis of the prediction vector 518, if the set-selective syntax element 522 indicates that the predetermined block 18 is not to be predicted using one of the first set 508 of intra-prediction modes.

The data stream 12 comprises either the MPM list index 534 or the further index 540 based on the set-selective syntax element 522.

The apparatus 3000 can comprise features and or functionalities as described with regard to FIG. 13.

With this, the embodiments described in the following with respect to FIG. 13 relate to decoders and encoders supporting intra-prediction for decoding/encoding a predetermined block 18 wherein different intra-prediction modes are supported. There are angular intra-prediction modes 500 according to which reference samples 17 neighboring the predetermined block 18 are used in order to fill the predetermined block 18 so as to obtain an intra-prediction signal for the predetermined block 18. In particular, the reference samples 17 which are arranged alongside a boundary of the predetermined block 18 such as alongside the upper and left hand edge of the predetermined block 18, represent picture content which is extrapolated, or copied, along a predetermined direction 502 into the inner of the predetermined block 18. Before the extrapolation or copying, the picture content represented by the neighboring samples 17 might be subject to interpolation filtering or differently speaking may be derived from the neighboring samples 17 by way if interpolation filtering. The angular intra-prediction modes 500 mutually differ in the intra-prediction direction 502. Each angular intra-prediction mode 500 may have an index associated with, wherein the association of indexes to the angular intra-prediction modes 500 may be such that the directions 500, when ordering the angular intra-prediction mode 500 according to the associated mode indexes, monotonically rotate clockwise or anticlockwise.

There may also be non-angular intra-prediction modes. 504, for instance, FIG. 13 illustrates a planar intra-prediction mode as optionally contained in set 508, according to which a two-dimensional linear function defined by a horizontal slope, a vertical slope and an offset is derived based on neighboring samples 17, with this linear function defining predicted sample values of the predetermined block 18. Horizontal slope, vertical slope and offset are derived on the basis of the neighboring samples 17. According to an embodiment, the first set 508 of intra-prediction modes comprises the planar intra-prediction mode 504.

A specific non-angular intra prediction mode, the DC mode, which is contained in set 508, is illustrated at 506. Here, one value, quasi a DC value, is derived on the basis of the neighboring sample 17 and this one DC value is attributed to all samples of the predetermined block 18 so as to obtain the intra-prediction signal. Although two examples for a non-intra-prediction mode are shown, merely one or more than two may be present.

The intra-prediction modes 500, 504 and 506 form a set 508 of intra-prediction modes which are supported by encoder and decoder in which compete, in terms of rate/distortion optimization sense, with the block-based intra-prediction modes generally indicated using reference sign 510 for which examples where discussed above using the abbreviation ALWIP. As described above, according to these block-based intra-prediction modes 510, a matrix-vector product 520 is performed between a vector 514 which is derived from the neighboring samples 17 on the one hand and a predetermined prediction matrix 516 on the other hand. The result of the multiplication 512 is a prediction vector 518 which is used to predict the samples of the predetermined block 18. The block-based intra-prediction modes 510 mutually differ in the prediction matrix 516 associated with the respective mode.

Thus, briefly summarizing, encoders and decoders according to embodiments described herein comprise a set 508 of intra-prediction modes, i.e. a first set of intra-prediction modes, and a set 520 of block-based intra-prediction modes, i.e. a second set of matrix-based intra-prediction modes, and they compete with each other.

In accordance with embodiments of the present application, the predetermined block 18 is coded/decoded using intra-prediction in the following manner. In particular, firstly a set-selecting syntax element 522 whether the predetermined block 18 is to be predicted using any of the set 508 of intra-prediction modes, or any of modes of set 520 of block-based intra-prediction modes. If the set-selected syntax element indicates that the predetermined block 18 is to be predicted using any mode of set 508, i.e. of the first set of intra-prediction modes, a list 528 of most probable candidates out of set 508 is construed/formed at decoder and encoder on the basis of intra-prediction modes using which neighboring blocks, which neighbor block 18, and which are exemplarily indicated at 524 and 526, have been predicted. The neighboring blocks 524 and 526 may be determined relative to the position of predetermined block 18 in a predetermined manner such as by determining those neighboring blocks which overlay certain neighboring samples of block 18 such as the sample to the top of the upper left hand sample of block 18, and the block 526 containing the sample to the left of the just-mentioned corner sample. Naturally, this is only an example. The same applies to the number of neighbouring blocks used for mode prediction which is not restricted to be two for all embodiments. More than two or just one may be used. If any of these blocks 524 and 526 is missing, a default intra-prediction mode may be used by default as a substitute for the intra-prediction mode of that missing neighbouring block. The same may apply if any of the blocks 524 and 526 has been coded/decoded using an inter-prediction mode such as by motion compensated prediction.

The construction of the list of modes out of set 508, i.e., list 528 of most probable intra-prediction modes is as follows. The list-length of list 528, i.e., the number of most probable modes therein, may be fixed by default. The length may be four as illustrated in FIG. 13, or may be different therefrom, such as being five or six. The latter case applies to the specific example described hereinbelow. An index in the data stream to be described later may indicate one mode out of list 528 to be used for predetermined block 18. The indexing is performed along a list order or ranking 530 with a list index being, for instance, variable length coded so that the length of the index increases monotonically along order 530. Accordingly, it is worthwhile to, firstly, populate list 528 with the most probable modes out of set 508 only, and to place, along order 530, modes more probable upstream relative to modes having lower probability of being suitable for block 18. The modes of list 528 are derived based on the modes used for blocks 524 and 526, i.e. neighbouring blocks neighbouring the predetermined block 18. If any of blocks 524 and 526 has been intra-predicted using a block-based mode 510 out of set 520, the afore-described mapping from such "ALWIP" or block-based modes 510 onto the modes within set 508, let's say non-ALWIP modes, is used. The latter mapping may, for instance, map a majority (i.e. more than the half) of the block-based modes 510 onto the DC mode 506 (or any of the DC 506 or planar mode 504).

According to an embodiment, the list 528 of most probable intra-prediction modes is populated with the planar intra-prediction mode 504 in a manner independent from the intra-prediction modes using when the neighboring blocks are predicted. Thus, for example, only the DC intra-prediction mode 506 and the angular intra-prediction modes 500 are populated in the list 528 dependent on the intra-prediction modes used for a prediction of the neighboring blocks 524 and 526. The planar intra-prediction mode 504 is, for example, positioned at a first position of the list 528 of most-probable intra-prediction modes independent from the intra-prediction modes using when the neighboring blocks 524 and 526 are predicted.

In a manner exemplarily illustrated in more detail below, the list construction of list 528 of most probable intra-prediction modes is done in a manner so that the list 528 is free of the DC intra-prediction mode 506 if the neighboring blocks 524 and 526 have exclusively been predicted by any angular intra-prediction mode 500. The DC intra prediction mode 506 is not in the list 528 of most probable intra-prediction modes if one neighboring blocks 524 or 526 is predicted by any angular intra-prediction mode 500 and/or if both neighboring blocks 524 and 526 are predicted by any angular intra-prediction mode 500 In accordance with the embodiment set out herein below, for instance, list 528 is populated with the DC mode 506 only in case of the following circumstance being true for all neighboring blocks 524 and 526: either same has been coded using any of the non-angular intra-prediction modes 504 and 506, or same has been intra-predicted using any block-based intra-prediction mode 510 which, by way of the afore-mentioned mapping from block-based intra-prediction modes 510 onto the modes within set 508, is mapped onto any of the non-angular intra-prediction modes 504 and 506. Merely in the that case, the DC intra-prediction mode 506, is positioned in list 528. In that case, it might be positioned before any angular intra-prediction mode 500 in the order 530 as may be seen from the subsequent example.

In other words, the list 528 of most probable intra-prediction modes is, for example, populated with the DC intra-prediction mode 506 only in case of, for each of the neighboring blocks 524 and 526, the respective neighbouring block predicted using any of at least one non-angular intra-prediction modes 504 and 506 with the first set 508, which comprise the DC intra-prediction mode 506, or predicted using any of block-based intra-prediction modes 510 which, by way of a mapping from the second set 520 of block-based intra-prediction modes 510 onto the intra-prediction modes within the first set 508, which is used for the formation of the list 528 of most probable intra-prediction modes, is mapped onto any of the at least one non-angular inter-prediction modes 500.

Thus, resuming the description as to how predetermined block 18 is coded into the data stream 12, the data stream 12 contains, if the set-selective syntax element 522 indicates that the predetermined block 18 is to be coded by any mode out of the first set 508, optionally an MPM syntax element 532 which indicates whether the intra-prediction mode to be used for predetermined block 18 is within list 528 and if yes, the data stream 12 comprises an MPM list index 534 pointing into list 528 indicating the mode, i.e. a predetermined intra-prediction mode, to be used for predetermined block 18 out of list 528 by indexing same along order 530. If, however, the mode out of set 508 is not within list 528, as indicated by the MPM syntax element 532, then the data stream 12 comprises for block 18 a further syntax element 536 indicating which mode, i.e. the predetermined intra-prediction mode, is to be used for block 18 out of set 508. The further syntax element 536 may indicate the mode in a manner by merely distinguishing between those modes out of set 508, which are not contained in list 528.

In other words, the apparatus 3000 is, for example, configured to derive the MPM syntax element 532 from the data stream which indicates whether the predetermined intra-prediction mode of the first set 508 of intra-prediction modes is within the list 528 of most probable intra-prediction modes or not, if the set-selective syntax element 522 indicates that the predetermined block 18 is to be predicted using one of the first set 508 of intra-prediction modes. If the MPM syntax element 532 indicates that the predetermined intra-prediction mode of the first set 508 of intra-prediction modes is within the list 528 of most probable intra-prediction modes, the apparatus 3000 is, for example, configured to perform the formation of the list 528 of most probable intra-prediction modes on the basis of intra-prediction modes using when neighbouring blocks 524, 526 neighbouring the predetermined block 100 are predicted and perform the derivation of the MPM list index 534 from the data stream 12 which points to a predetermined intra-prediction mode of the list 528 of most probable intra-prediction modes. If the MPM syntax element 532 from the data stream 12 indicates that the predetermined intra-prediction mode of the first set 508 of intra-prediction modes is not within the list 528 of most probable intra-prediction modes, the apparatus 3000 is configured to derive a further list index 536 from the data stream which indicates the predetermined intra-prediction mode out of the first set of intra-prediction modes. Thus based on the MPM syntax element 532 the data stream 12 comprises either the MPM list index 534 or the further list index 536 for the prediction of the predetermined block 18.

By removing the circumstances where list 528 comprises a DC intra-prediction mode 506, the following advantage is achieved. In particular, the inventors of the present application found out that "consuming" valuable list positions of list 528 with the DC intra-prediction mode 506 out of set 508 for coding/decoding the predetermined block 18 which is ought to use any of the intra-prediction modes of set 508 as indicated by syntax element 522, i.e. the set-selective syntax element, would negatively affect the coding efficiency as such DC intra-prediction mode 506 out of set 508 competes, anyway, with the block-based intra-prediction modes 510. Accordingly, "consuming" the list positions of list 528 with such DC intra-prediction mode 506 out of set 508 would result into an increased likelihood for a situation where the intra-prediction mode, i.e. the predetermined intra-prediction mode, to be finally used for the predetermined block 18 is not within list 528 so that the syntax element 536, i.e. the further list index, needs to be transmitted in data stream 12.

In particular, as the syntax element 522 already indicates for a block 18 whether the same should be predicted using any of the modes within set 508 or any of the block-based modes 510 of the set 520, it seems as if, if the syntax element 522 indicates that the modes within set 508 are advantageous for block 18, and that, accordingly, the block-based modes 510 are not to be used for block 18, the likelihood that the DC prediction mode 506 out of set 508 could be suitable for block 18 is so low that the occurrence thereof in list 528 should be restricted to a very limited set of constellations of modes used for neighboring blocks 524 and 526, namely the constellations set out above.

In the other case, i.e., in the case where the set-selective syntax element 522 indicates that the predetermined block 18 is to be predicted using any of the block-based intra-prediction modes 510, the coding of block 18 into data stream 12 and this decoding there from may be done in the manner set out above. To this end, indexing may be used in order to index the selected one out of, or indicate as to which of, the block-based intra-prediction modes 510 out of set 520, i.e. second set of block-based intra-prediction modes, is to be used. A further MPM syntax element 538 may indicate whether the indexing is done by an index 540, i.e. by a further MPM list index, which indicates the block-based intra-prediction mode 510 to be used for block 18 out of a list 542 of most probable block-based intra-prediction modes 510, namely by indexing along a list order 544, or whether the block-based intra-prediction mode 510 to be used for block 18 is indicated by a further syntax element 546, i.e. by an even further list index, which indicates the block-based intra-prediction modes 510 out of set 520, wherein the latter syntax element 546 may, for instance, only distinguish between those modes 510 within set 520 not already contained within list 542. The list construction of list 542 may be done based on the modes using which block 524 and 526 have been predicted. If any of the blocks 524 and 526 is not available since being outside the picture or since being inter-predicted, a default intra-prediction mode such as one out of set 508 may be used instead. For each block 524 and 526, having been intra-predicted using a mode out of set 508 rather than set 520, the afore-described mapping from modes of set 508 onto modes out of set 520 is used to obtain an intra-prediction mode 510, i.e. a predetermined block-based intra-prediction mode, for the respective block, i.e. the predetermined block 18, and based on the resulting block-based intra-prediction modes for blocks 524 and 526, the list 542 is construed.

According to an embodiment, the apparatus 3000 is configured to derive a further MPM syntax element 538 from the data stream 12 which indicates whether the predetermined block-based intra-prediction mode of the second set 520 of block-based intra-prediction modes 510 is within a list 542 of most probable block-based intra-prediction modes or not, if the set-selective syntax element 522 indicates that the predetermined block 18 is not to be predicted using one of the first set 508 of intra-prediction modes. If the further MPM syntax element 538 indicates that the predetermined block-based intra-prediction mode of the second set 520 of block-based intra-prediction modes 510 is within a list 542 of most probable block-based intra-prediction modes, the apparatus 3000 is, for example, configured to form the list 542 of most probable block-based intra-prediction modes on the basis of intra-prediction modes using when neighbouring blocks 524, 526 neighbouring the predetermined block 18 are predicted and derive a further MPM list index 540 from the data stream 12 which points into the list 542 of most probable block-based intra-prediction modes onto the predetermined block-based intra-prediction mode. If the further MPM syntax element 538 indicates that the predetermined block-based intra-prediction mode of the second set 520 of block-based intra-prediction modes is not within a list 542 of most probable block-based intra-prediction modes, the apparatus 3000 is configured to derive an even further list index 546 from the data stream 12 which indicates the predetermined block-based intra-prediction mode out of the second set 520 of block-based intra-prediction modes. Thus based on the further MPM syntax element 538 the data stream 12 comprises either the further MPM list index 540 or the even further list index 546 for the prediction of the predetermined block 18.

Figure 13A:
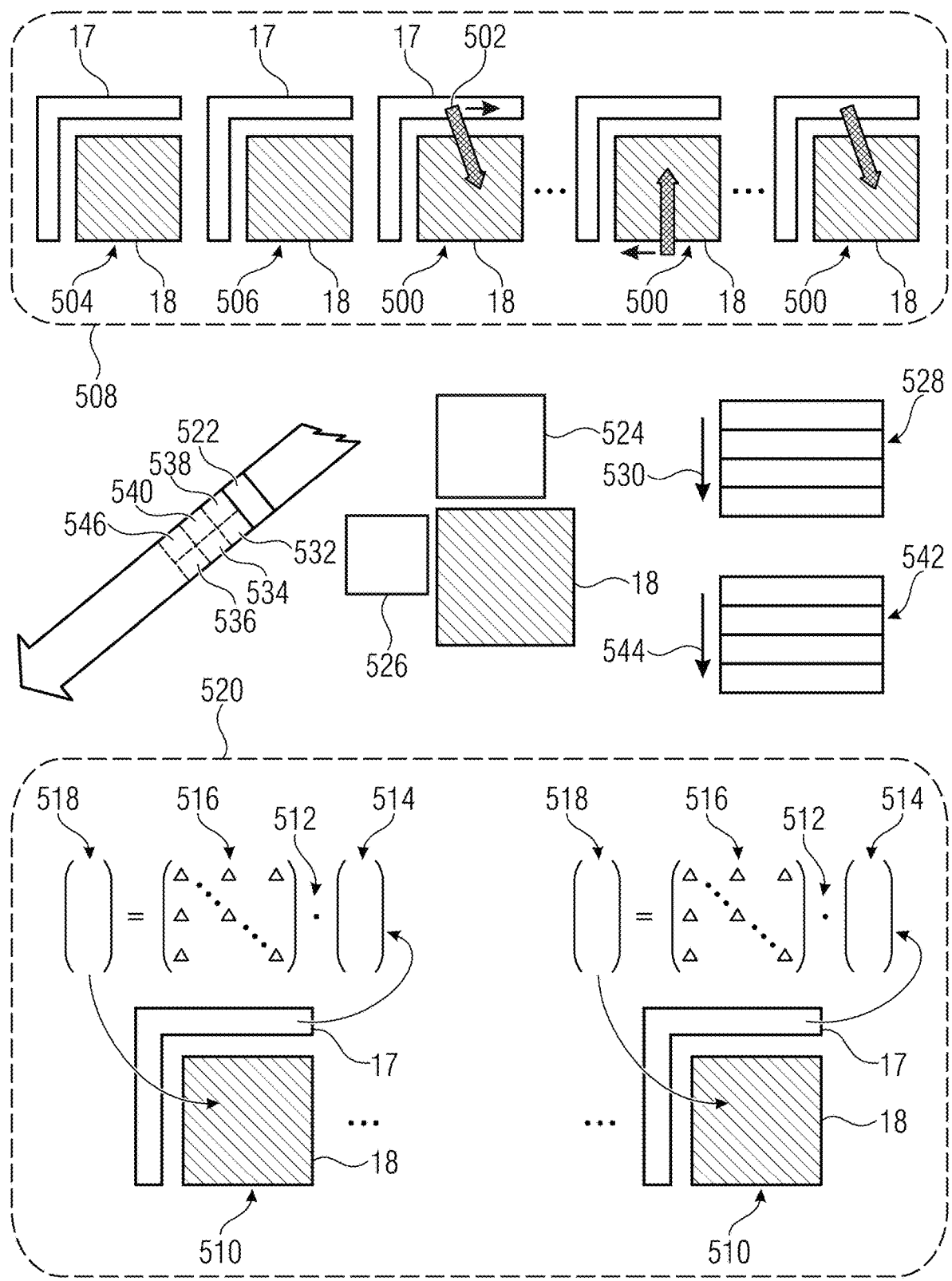
FIG. 13A shows a schematic diagram with details of decoding and encoding a predetermined block according to an embodiment.

Although the further MPM syntax element 538, the further MPM list index 540 and the even further list index 546 are represented in the data stream 12 in FIG. 13A as being parallel to the MPM syntax element 532, the MPM list index 534 and the further list index 536, it is clear, that either the further MPM syntax element 538 and the index associated with the further MPM syntax element 538, e.g. the further MPM list index 540 or the even further list index 546, are comprised by the data stream 12 or the MPM syntax element 532 and the index associated with the MPM syntax element 532, e.g. the MPM list index 534 or the further list index 536. Which of this syntax elements and indices are comprised by the data stream 12, depends, for example, on the set-selective syntax element 522.

An example for a syntax element portion of data stream 12 written as a pseudo code could look as shown in FIGS. 13B-13G, wherein the reference signs indicate as to which syntax element correspond to the syntax elements discussed before.

The list construction of list 528 may be defined as follows, wherein candIntraPredModeA/B indicating the intra-prediction mode using which any of blocks 524 and 526 has been predicted, such as A for block 524 and B for block 526, or onto which mode the intra-prediction mode is mapped out of set 508, in case of the corresponding block 524 or 526 have been intra-predicted using any of the block-based intra-prediction modes 510. INTRA_DC is used to indicate mode 506, and the angular modes 500 are indicated by INTRA_ANGULAR #with the numbering (#) ordering the angular modes as exemplarily indicated above, namely in a manner so that the angular direction 502 monotonically decreases or increases with increasing number. The ordering among the modes within set 508 may be as defined in the subsequent table where INTRA PLANAR indicates mode 504.

Note that in the example above, the index 534 is, in fact, distributed onto the syntax elements 534' and 534": The former 534' is specific for the first, in order 530, position of list 528 where, according to this example, the INTRA PLANAR mode 504 is inevitably positioned. The latter 534" points to any of the subsequent positions of list 528 where, as described, the DC mode 506 is only included in the described special circumstances.

Further, in the example above, further syntax elements are included in the data stream 12 in case of syntax element 522 indicating that any among the modes within set 508 are used, which further syntax elements somehow parametrize the intra-prediction modes within set 508. For instance, a syntax element 600 parametrizes or varies a region where the reference samples 17 are positioned based on which the modes in set 508 intra-predict the inner of block 18, such as in terms of distance towards block's 18 outer circumference. Additionally or alternatively, a syntax element 602 parametrizes or varies whether the reference samples 17 are used by the modes in set 508 to intra-predict the inner of block 18 globally or en block, or whether the intra-prediction is done in pieces or portions into which the block 18 is sub-divided, and which are intra-predicted sequentially so that the prediction residual coded into the data stream 12 for one portion may serve for recruiting new reference samples for intra-predicting a following portion. The latter coding option controlled by syntax element may be available only (and the corresponding syntax element may be present in the data stream only) if the syntax element 600 has a predetermined state corresponding to, for instance, the region, where the reference samples 17 lie, abutting the block 18. The portions may be defined by subdividing the block along a predetermined direction such as either horizontally, thereby leading to portions being as high as block 18, or vertically, thereby leading to portions being as wide as block 18. A syntax element 604 may be present in the data stream if the partitioning is signaled to be active, which controls as to which split direction is used. As can be seen, it might be that the position in list 528 which is reserved for the INTRA PLANAR mode, is available only in case of a certain parametrizing of the modes by the just-mentioned parametrizing syntax elements such as only if the syntax element 600 has a predetermined state corresponding to, for instance, the region where the reference samples 17 lie, abutting the block 18 and/or if the portion wise intra-prediction mode is not active as signaled by syntax element 602.

All syntax elements shown in the table and not specifically mentioned above are optional and are not further discussed herein.

If candIntraPredModeB is equal to candIntraPredModeA and candIntraPredModeA is greater than INTRA_DC, candModeList[x] with x=0 . . . 4 is derived as follows:

candModeList[0]=candIntraPredMode$A$ candModeList[1]=2+((candIntraPredMode$A$+61)% 64)

candModeList[2]=2+((candIntraPredMode$A$−1)% 64)

candModeList[3]=2+((candIntraPredMode$A$+60)% 64)

candModeList[4]=2+(candIntraPredMode$A$ % 64)

Otherwise if candIntraPredModeB is not equal to candIntraPredModeA and candIntraPredModeA or candIntraPredModeB is greater than INTRA_DC, the following applies:

The variables minAB and maxAB are derived as follows:

min$AB$=Min(candIntraPredMode$A$, candIntraPredMode$B$)

max$AB$=Max(candIntraPredMode$A$, candIntraPredMode$B$)

If candIntraPredModeA and candIntraPredModeB are both greater than INTRA_DC, candModeList[x] with x=0 . . . 4 is derived as follows:

candModeList[0]=candIntraPredMode$A$ candModeList[1]=candIntraPredMode$B$

If maxAB−minAB is equal to 1, the following applies:

candModeList[2]=2+((min$AB$+61)% 64)

candModeList[3]=2+((max$AB$−1)% 64)

candModeList[4]=2+((min$AB$+60)% 64)

Otherwise, if maxAB−minAB is greater than or equal to 62, the following applies:

candModeList[2]=2+((min$AB$−1)%64)

candModeList[3]=2+((max$AB$+61)% 64)

candModeList[4]=2+(min$AB$ % 64)

Otherwise, if maxAB−minAB is equal to 2, the following applies:

candModeList[2]=2+((min$AB$−1)% 64)

candModeList[3]=2+((min$AB$+61)% 64)

candModeList[4]=2+((max$AB$−1)% 64)

Otherwise, the following applies:

candModeList[2]=2+((min$AB$+61)% 64)

candModeList[3]=2+((min$AB$−1)% 64)

candModeList[4]=2+(((max$AB$+61))%64)           (8-36)

Otherwise (candIntraPredModeA or candIntraPredModeB is greater than INTRA_DC), candModeList[x] with x=0 . . . 4 is derived as follows:

candModeList[0]=max$AB$ candModeList[1]=2+((max$AB$+61)%64)

candModeList[2]=2+((max$AB$−1)% 64)

candModeList[3]=2+((max$AB$+60)% 64)

candModeList[4]=2+(max$AB$ % 64)           (8-41)

Otherwise, the following applies:

candModeList[0]=INTRA_DC candModeList[1]=INTRA_ANGULAR50( candModeList[2]=INTRA_ANGULAR18 candModeList[3]=INTRA_ANGULAR46 candModeList[4]=INTRA_ANGULAR54

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |

In case of the set-selective syntax element 522 indicating that the predetermined block 18 is not to be predicted using one of the first set 508 of intra-prediction modes, the apparatus for decoding a predetermined block 18 and/or the apparatus for encoding a predetermined block 18 can comprise one or more of the following features.

According to an embodiment, the apparatus is configured to form a sample value vector, e.g. the sample value vector 400 as described with regard to one of the embodiments of FIGS. 6 to 9, out of the plurality of reference samples 17 and derive from the sample value vector the vector 514 so that the sample value vector is mapped by a predetermined invertible linear transform onto the vector 514. In this case, the vector 514 can be understood as a further vector. The vector 514 is, for example, determined and/or defined as described for the further vector 402 with regard to one of the embodiment of FIGS. 8 to 11.

According to an embodiment, the apparatus is configured to form the sample value vector out of the plurality of reference samples 17 by, for each component of the sample value vector, adopting one reference sample of the plurality of reference samples as the respective component of the sample value vector, and/or averaging two or more components of the sample value vector to obtain the respective component of the sample value vector.

The plurality of reference samples 17 are, for example, arranged within the picture alongside an outer edge of the predetermined block 18.

The invertible linear transform is, for example, defined such that a predetermined component of the vector 514, e.g. of the further vector, becomes a, and each of other components of the vector 514, except the predetermined component, equal a corresponding component of the sample value vector minus a. The value a is, for example, a predetermined value.

According to an embodiment, the predetermined value is one of an average, such as an arithmetic mean or weighted average, of components of the sample value vector, a default value, a value signalled in a data stream into which the picture is coded, and a component of the sample value vector corresponding to the predetermined component.

The invertible linear transform is, for example, defined such that a predetermined component of the vector 514, e.g. of the further vector, becomes a, and each of other components of the vector 514, except the predetermined component, equal a corresponding component of the sample value vector minus a, wherein a is an arithmetic mean of components of the sample value vector.

The invertible linear transform is, for example, defined such that a predetermined component of the vector 514, e.g. of the further vector, becomes a, and each of other components of the vector 514, except the predetermined component, equal a corresponding component of the sample value vector minus a, wherein a is a component of the sample value vector corresponding to the predetermined component. The apparatus is, for example, configured to comprise a plurality of invertible linear transforms, each of which is associated with one component of the vector 514, select the predetermined component out of the components of the sample value vector and use the invertible linear transform out of the plurality of invertible linear transforms which is associated with the predetermined component as the predetermined invertible linear transform.

According to an embodiment, matrix components of the prediction matrix 516 within a column of the prediction matrix 516 which corresponds to the predetermined component of the vector 514, e.g. of the further vector, are all zero. The apparatus is configured to compute the matrix-vector product 512 by performing multiplications by computing a matrix vector product 512 between a reduced prediction matrix resulting from the prediction matrix 516 by leaving away the column and an even further vector resulting from the vector 514 by leaving away the predetermined component.

According to an embodiment, the apparatus is configured to, in predicting the samples of the predetermined block 18 on the basis of the prediction vector 518, compute for each component of the prediction vector 518 a sum of the respective component and a.

A matrix, which results from summing each matrix component of the prediction matrix 516 within a column of the prediction matrix 516, which corresponds to the predetermined component of the vector 514, e.g. of the further vector, with one, (i.e. matric B in FIG. 8) times the invertible linear transform corresponds, for example, to a quantized version of a machine learning prediction matrix.

According to an embodiment, the apparatus is configured to compute the matrix-vector product 512 using fixed point arithmetic operations.

According to an embodiment, the apparatus is configured to compute the matrix-vector product 512 without floating point arithmetic operations.

According to an embodiment, the apparatus is configured to store a fixed point number representation of the prediction matrix 516.

According to an embodiment, the apparatus is configured to represent the prediction matrix 516 using prediction parameters and to compute the matrix-vector product 512 by performing multiplications and summations on the components of the vector 514, e.g. of the further vector, and the prediction parameters and intermediate results resulting therefrom, wherein absolute values of the prediction parameters are representable by an n-bit fixed point number representation with n being equal to or lower than 14, or, alternatively, 10, or, alternatively, 8. This can be performed similarly or as described in FIG. 10 or FIG. 11.

The prediction parameters comprise, for example, weights each of which is associated with a corresponding matrix component of the prediction matrix 516.

The prediction parameters further comprise, for example, one or more scaling factors each of which is associated with one or more corresponding matrix components of the prediction matrix 516 for scaling the weight associated with the one or more corresponding matrix component of the prediction matrix 516, and/or one or more offsets each of which is associated with one or more corresponding matrix components of the prediction matrix 516 for offsetting the weight associated with the one or more corresponding matrix component of the prediction matrix 516.

According to an embodiment, the apparatus is configured to, in predicting the samples of the predetermined block 18 on the basis of the prediction vector 518, use interpolation to compute at least one sample position of the predetermined block 18 based on the prediction vector 518 each component of which is associated with a corresponding position within the predetermined block 18.

Figure 14:
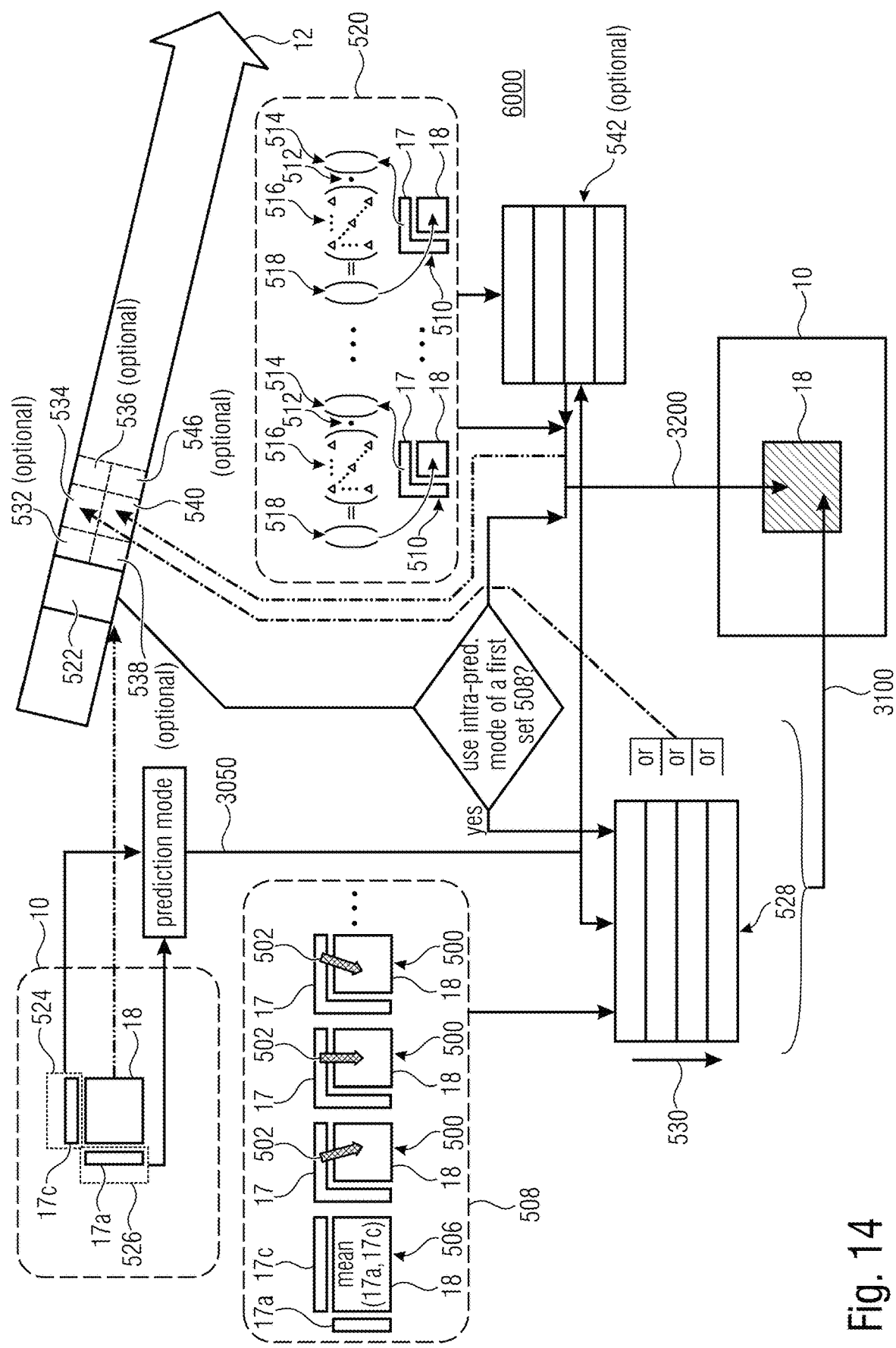
FIG. 14 shows a schematic diagram of an apparatus for encoding a predetermined block according to an embodiment.

FIG. 14 shows an apparatus 6000 for encoding a predetermined block 18 of a picture 10 using intra-prediction, configured to signal a set-selective syntax element 522 in a data stream 12 which indicates whether the predetermined block 18 is to be predicted using one of a first set 508 of intra-prediction modes comprising a DC intra prediction mode 506 and angular prediction modes 500. If the set-selective syntax element 522 indicates that the predetermined block 18 is to be predicted using one of the first set 508 of intra-prediction modes, the apparatus 6000 is configured to form a list 528 of most probable intra-prediction modes on the basis of intra-prediction modes using which neighbouring blocks 524, 526 neighbouring the predetermined block 18 are predicted, signal an MPM list index 534 in the data stream 12 which points into the list 528 of most probable intra-prediction modes onto a predetermined intra-prediction mode 3100 and intra-predict the predetermined block 18 using the predetermined intra-prediction mode 3100. If the set-selective syntax element 522 indicates that the predetermined block 18 is not to be predicted using one of the first set 508 of intra-prediction modes, the apparatus 6000 is configured to signal a further index 540 in the data stream 12 which indicates a predetermined matrix-based intra-prediction mode 3200 out of a second set 520 of matrix-based intra-prediction modes 510 by computing a matrix-vector product 512 between a vector 514 derived from reference samples 17 in a neighbourhood of the predetermined block 18 and a predetermined prediction matrix 516 associated with the predetermined matrix-based intra-prediction mode 3200 so as to obtain a prediction vector 518, and predicting samples of the predetermined block 18 on the basis of the prediction vector 518.

The list 528 of most probable intra-prediction modes is formed on the basis of intra-prediction modes using which neighbouring blocks 524, 526 neighbouring the predetermined block 18 are predicted such that the list of most probable intra-prediction modes is free of the DC intra prediction mode 506 in case of at least one of the neighbouring blocks 524, 526 being predicted by any of the angular intra prediction modes 500.

The first set 508 of intra-prediction modes further comprises, for example, a planar intra-prediction mode 504.

According to an embodiment, the apparatus 6000 can comprise similar features and or functionalities as described with regard to the apparatus 3000 in FIG. 12 and/or FIG. 13A. Likewise, the apparatus 3000 can comprise similar features and or functionalities as described with regard to the apparatus 6000 in FIG. 14.

If the set-selective syntax element 522 indicates that the predetermined block 18 is to be predicted using one of the first set 508 of intra-prediction modes, the apparatus 6000 is, for example, configured to signal an MPM syntax element 532 in the data stream 12 which indicates whether the predetermined intra-prediction mode 3100 of the first set 508 of intra-prediction modes is within the list 528 of most probable intra-prediction modes or not. If the MPM syntax element 532 indicates that the predetermined intra-prediction mode of the first set 508 of intra-prediction modes is within the list 528 of most probable intra-prediction modes, the apparatus 6000 is, for example, configured to perform the formation of the list 528 of most probable intra-prediction modes on the basis of intra-prediction modes using which neighbouring blocks 524, 526 neighbouring the predetermined block 18 are predicted and perform the signalisation of the MPM list index 534 in the data stream 12 which points to a predetermined intra-prediction mode 3100 of the list 528 of most probable intra-prediction modes. If the MPM syntax element 532 in the data stream 12 indicates that the predetermined intra-prediction mode 3100 of the first set 508 of intra-prediction modes is not within the list 528 of most probable intra-prediction modes, the apparatus 6000 is, for example, configured to signal a further list index 536 in the data stream 12 which indicates the predetermined intra-prediction mode 3100 out of the first set 508 of intra-prediction modes.

If the set-selective syntax element 522 indicates that the predetermined block 18 is not to be predicted using one of the first set 508 of intra-prediction modes, the apparatus 6000 is, for example, configured to signal a further MPM syntax element 538 in the data stream 12 which indicates whether the predetermined block-based intra-prediction mode 3200 of the second set 520 of block-based intra-prediction modes is within a list 542 of most probable block-based intra-prediction modes, i.e., a second list of most probable block-based intra-prediction modes, e.g., a list 542 of most probable block-based intra-prediction modes of the second set 520 of block-based intra-prediction modes, or not. If the further MPM syntax element 538 indicates that the predetermined block-based intra-prediction mode 3200 of the second set 520 of block-based intra-prediction modes is within the list 542 of most probable block-based intra-prediction modes, the apparatus 6000 is, for example, configured to form the list 542 of most probable block-based intra-prediction modes on the basis of intra-prediction modes 3050 using which neighbouring blocks 524, 526 neighbouring the predetermined block 18 are predicted and signal a further MPM list index 540 in the data stream 12 which points into the list 542 of most probable block-based intra-prediction modes onto the predetermined block-based intra-prediction mode 3200. If the further MPM syntax element 538 indicates that the predetermined block-based intra-prediction mode 3200 of the second set 520 of block-based intra-prediction modes is not within the list 542 of most probable block-based intra-prediction modes, the apparatus 6000 is, for example, configured to signal an even further list index 546 in the data stream 12 which indicates the predetermined block-based intra-prediction mode 3200 out of the second set 520 of block-based intra-prediction modes.

According to an embodiment, the apparatus 6000 is configured to perform the formation of the list of most probable intra-prediction modes, e.g. the formation of the list 528 of most probable intra-prediction modes of the first set 508 of intra-prediction modes, on the basis of intra-prediction modes using which neighbouring blocks 524, 526 neighbouring the predetermined block 18 are predicted such that the list 528 is populated with the DC intra-prediction mode 506 only in case of, for each of the neighboring blocks 524 and 526, the respective neighbouring block predicted using any of at least one non-angular intra-prediction modes 504 and/or 506 with the first set 508, which comprise the DC intra-prediction mode 506, or predicted using any of block-based intra-prediction modes 510 which, by way of a mapping from the second set 520 of block-based intra-prediction modes onto the intra-prediction modes within the first set 508, which is used for the formation of the list 528 of most probable intra-prediction modes, is mapped onto any of the at least one non-angular intra-prediction modes 504 and/or 506.

According to an embodiment, the apparatus 6000 is configured to perform the formation of the list 528 of most probable intra-prediction modes on the basis of intra-prediction modes using which neighbouring blocks 524, 526 neighbouring the predetermined block 18 are predicted such that, in case of, for each of the neighboring blocks 524 and 526, the respective neighbouring block predicted using any of at least one non-angular intra-prediction modes 504 and/or 506 with the first set 508, which comprise the DC intra-prediction mode 506, or predicted using any of block-based intra-prediction modes 510 which, by way of a mapping from the second set 520 of block-based intra-prediction modes onto the intra-prediction modes within the first set 508, which is used for the formation of the list 528 of most probable intra-prediction modes, is mapped onto any of the at least one non-angular intra-prediction modes 504 and/or 506. The DC intra-prediction mode 506 is positioned before any angular intra-prediction mode 500 in the list 528 of most probable intra-prediction modes.

According to an embodiment, the apparatus 6000 is configured to perform the formation of the list 528 of most probable intra-prediction modes on the basis of intra-prediction modes using which neighbouring blocks 524, 526 neighbouring the predetermined block 18 are predicted such that the list 528 is populated with the planar intra-prediction mode 504 in a manner independent from the intra-prediction modes using which the neighboring blocks 524, 526 are predicted.

According to an embodiment, the apparatus 6000 is configured to perform the formation of the list 528 of most probable intra-prediction modes on the basis of intra-prediction modes using which neighbouring blocks 524, 526 neighbouring the predetermined block 18 are predicted such that the planar intra-prediction mode 504 is positioned at a first position of the list 528 of most-probable intra-prediction modes independent from the intra-prediction modes using which the neighboring blocks 524, 526 are predicted.

Figure 15:
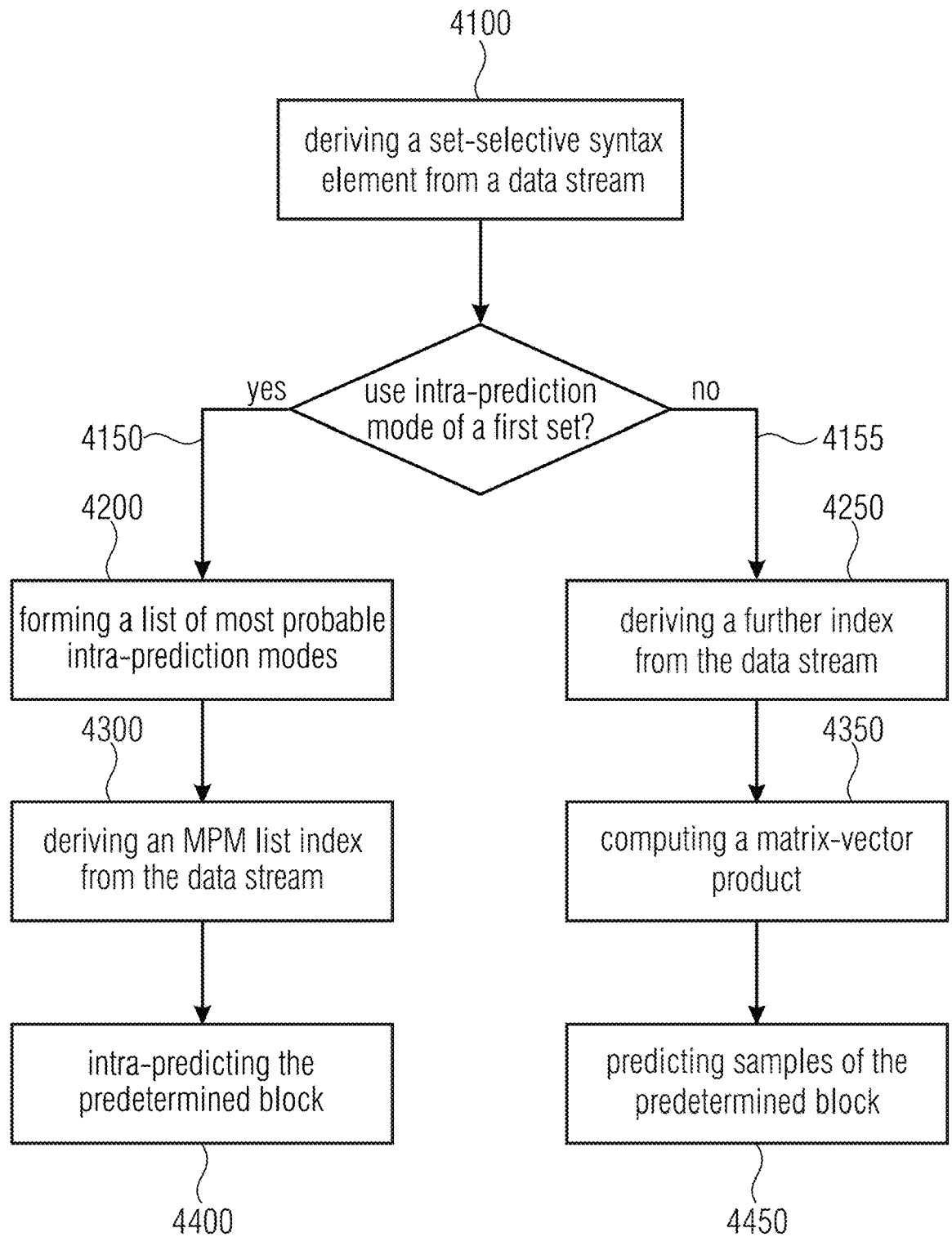
FIG. 15 shows a block diagram of a method for decoding a predetermined block according to an embodiment.

FIG. 15 shows a block diagram of a method 4000 for decoding a predetermined block 18 of a picture using intra-prediction, comprising deriving 4100 a set-selective syntax element from the data stream which indicates whether the predetermined block is to be predicted using one of a first set of intra-prediction modes comprising a DC intra prediction mode and angular prediction modes. If the set-selective syntax element indicates 4150 that the predetermined block is to be predicted using one of the first set of intra-prediction modes, the method 4000 comprises forming 4200 a list of most probable intra-prediction modes on the basis of intra-prediction modes using which neighbouring blocks neighbouring the predetermined block are predicted, deriving 4300 an MPM list index from the data stream which points into the list of most probable intra-prediction modes onto a predetermined intra-prediction mode and intra-predicting 4400 the predetermined block using the predetermined intra-prediction mode. If the set-selective syntax element indicates 4155 that the predetermined block is not to be predicted using one of the first set of intra-prediction modes, the method 4000 comprises deriving 4250 a further index from the data stream which indicates a predetermined matrix-based intra-prediction mode out of a second set of matrix-based intra-prediction modes by computing 4350 a matrix-vector product between a vector derived from reference samples in a neighbourhood of the predetermined block and a predetermined prediction matrix associated with the predetermined matrix-based intra-prediction mode so as to obtain a prediction vector, and predicting 4450 samples of the predetermined block on the basis of the prediction vector. The list of most probable intra-prediction modes is formed 4200 on the basis of intra-prediction modes using which neighbouring blocks neighbouring the predetermined block are predicted such that the list of most probable intra-prediction modes is free of the DC intra prediction mode in case of at least one of the neighbouring blocks being predicted by any of the angular intra prediction modes.

Figure 16:
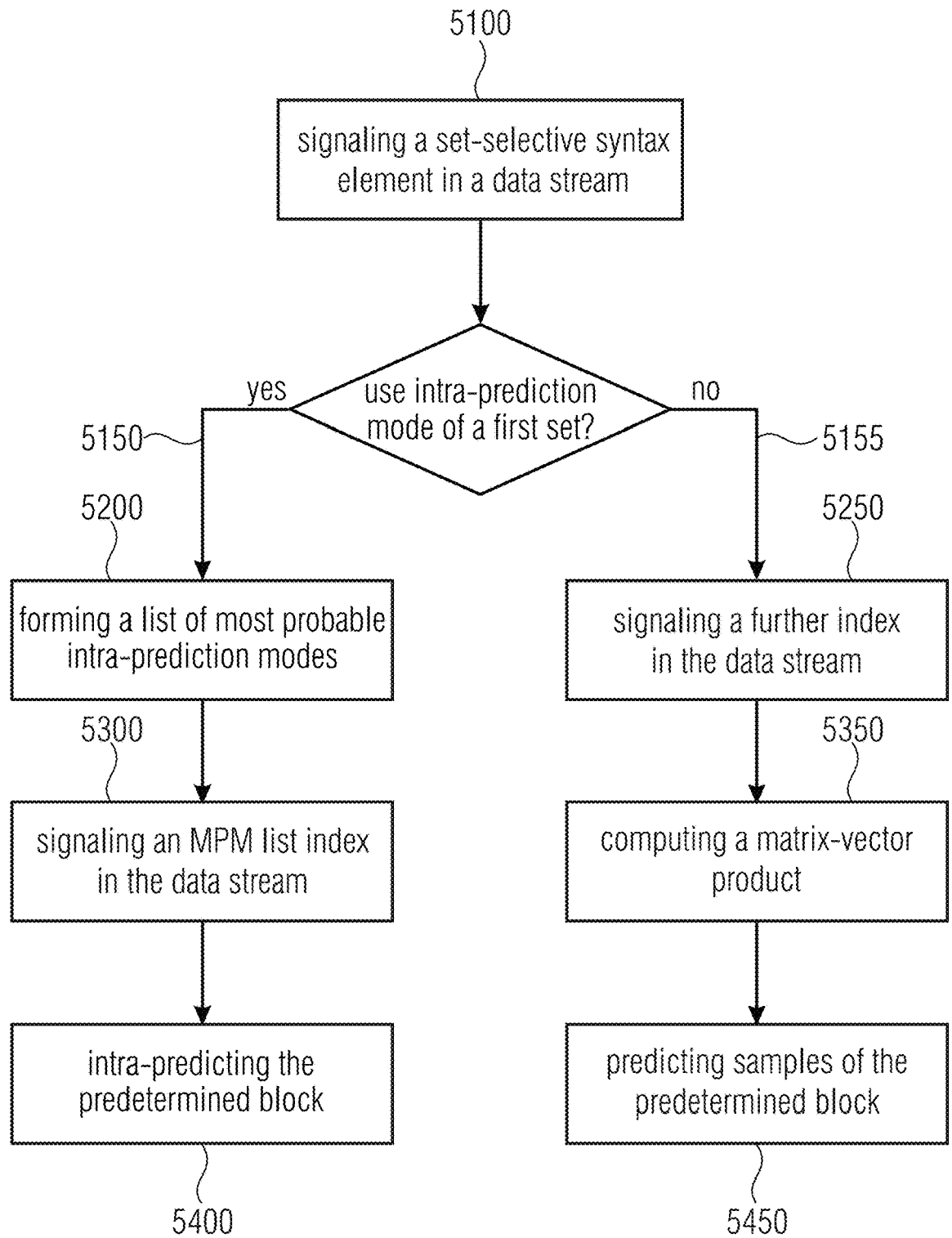
FIG. 16 shows a block diagram of a method for encoding a predetermined block according to an embodiment.

FIG. 16 shows a block diagram of a method 5000 for encoding a predetermined block of a picture using intra-prediction, comprising signaling 5100 a set-selective syntax element in a data stream which indicates whether the predetermined block is to be predicted using one of a first set of intra-prediction modes comprising a DC intra prediction mode and angular prediction modes. If the set-selective syntax element indicates 5150 that the predetermined block is to be predicted using one of the first set of intra-prediction modes, the method 5000 comprises forming 5200 a list of most probable intra-prediction modes on the basis of intra-prediction modes using which neighbouring blocks neighbouring the predetermined block are predicted, signalling 5300 an MPM list index in the data stream which points into the list of most probable intra-prediction modes onto a predetermined intra-prediction mode and intra-predicting 5400 the predetermined block using the predetermined intra-prediction mode. If the set-selective syntax element indicates 5155 that the predetermined block is not to be predicted using one of the first set of intra-prediction modes, the method 5000 comprises signaling 5250 a further index in the data stream which indicates a predetermined matrix-based intra-prediction mode out of a second set of matrix-based intra-prediction modes by computing 5350 a matrix-vector product between a vector derived from reference samples in a neighbourhood of the predetermined block and a predetermined prediction matrix associated with the predetermined matrix-based intra-prediction mode so as to obtain a prediction vector, and predicting 5450 samples of the predetermined block on the basis of the prediction vector. The list of most probable intra-prediction modes is formed 5200 on the basis of intra-prediction modes using which neighbouring blocks neighbouring the predetermined block are predicted such that the list of most probable intra-prediction modes is free of the DC intra prediction mode in case of at least one of the neighbouring blocks being predicted by any of the angular intra prediction modes.

REFERENCES

[1] P. Helle et al., "Non-linear weighted intra prediction", JVET-L0199, Macao, China, October 2018.
[2] F. Bossen, J. Boyce, K. Suehring, X. Li, V. Seregin, "JVET common test conditions and software reference configurations for SDR video", JVET-K1010, Ljubljana, SI, July 2018.

FURTHER EMBODIMENTS AND EXAMPLES

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier.

In other words, an example of method is, therefore, a computer program having program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decoding a predetermined block of a picture using intra-prediction, configured to:
   derive a set-selective syntax element from a data stream which indicates whether the predetermined block is to be predicted using one of a first set of intra-prediction modes comprising a DC intra-prediction mode and angular intra prediction modes,
   if the set-selective syntax element indicates that the predetermined block is to be predicted using one of the first set of intra-prediction modes,
      form a list of most probable intra-prediction modes using intra-prediction modes that predicted neighbouring blocks of the predetermined block,
      derive a most probable mode (MPM) list index from the data stream which points into the list of most probable intra-prediction modes onto a predetermined intra-prediction mode,
      intra-predicting the predetermined block using the predetermined intra-prediction mode,
   if the set-selective syntax element indicates that the predetermined block is not to be predicted using one of the first set of intra-prediction modes,
      derive a further index from the data stream which indicates a predetermined matrix-based intra-prediction mode out of a second set of matrix-based intra-prediction modes,
      compute a matrix-vector product between a vector derived from reference samples in a neighbourhood of the predetermined block and a prediction matrix associated with the predetermined matrix-based intra-prediction mode so as to acquire a prediction vector, and
      predict samples of the predetermined block using the prediction vector,
   wherein the list of most probable intra-prediction modes is formed using intra-prediction modes using which neighbouring blocks neighbouring the predetermined block are predicted such that the list of most probable intra-prediction modes is free of the DC intra-prediction mode in case of the neighbouring blocks being predicted by any of the angular intra prediction modes.

2. The apparatus of claim 1, configured to:
   if the set-selective syntax element indicates that the predetermined block is to be predicted using one of the first set of intra-prediction modes,
      derive an MPM syntax element from the data stream which indicates whether the predetermined intra-prediction mode of the first set of intra-prediction modes is within the list of most probable intra-prediction modes,
         if the MPM syntax element indicates that the predetermined intra-prediction mode of the first set of intra-prediction modes is within the list of most probable intra-prediction modes, perform
            the formation of the list of most probable intra-prediction modes using intra-prediction modes that predicted neighbouring blocks of the predetermined block,
            the derivation of the MPM list index from the data stream which points to the predetermined intra-prediction mode from the list of most probable intra-prediction modes,
         if the MPM syntax element from the data stream indicates that the predetermined intra-prediction mode of the first set of intra-prediction modes is not within the list of most probable intra-prediction modes,
            derive a further list index from the data stream which indicates the predetermined intra-prediction mode out of the first set of intra-prediction modes.

3. The apparatus of claim 1, configured to:
   if the set-selective syntax element indicates that the predetermined block is not to be predicted using one of the first set of intra-prediction modes,
      derive a further MPM syntax element from the data stream which indicates whether the predetermined intra-prediction mode of the second set of block-based intra-prediction modes is within a list of most probable block-based intra-prediction modes,
      if the further MPM syntax element indicates that the predetermined intra-prediction mode of the second set of block-based intra-prediction modes is within the list of most probable block-based intra-prediction modes,
         form the list of most probable block-based intra-prediction modes using intra-prediction modes that predicted neighbouring blocks of the predetermined block are predicted,
         derive a further MPM list index from the data stream which points into the list of most probable block-based intra-prediction modes onto the predetermined intra-prediction mode of,
      if the further MPM syntax element indicates that the predetermined intra-prediction mode of the second set of block-based intra-prediction modes is not within a list of most probable block-based intra-prediction modes,
         derive an even further list index from the data stream which indicates the predetermined intra-prediction mode out of the second set of block-based intra-prediction modes.

4. The apparatus of claim 1, configured to perform the formation of the list of most probable intra-prediction modes using intra-prediction modes that predicted neighbouring blocks of the predetermined block such that
   the list is populated with the DC intra-prediction mode only in case of, for each of the neighbouring blocks, the respective neighbouring block predicted using any of at least one non-angular intra-prediction modes with the first set, which comprise the DC intra-prediction mode, or predicted using any of block-based intra-prediction modes which, by way of a mapping from the second set of block-based intra-prediction modes onto the intra-prediction modes within the first set, which is used for the formation of the list of most probable intra-prediction modes, is mapped onto any of the at least one non-angular intra-prediction modes.

5. The apparatus of claim 1, configured to perform the formation of the list of most probable intra-prediction modes using intra-prediction modes that predicted neighbouring blocks of the predetermined block such that, in case of, for each of the neighbouring blocks, the respective neighbouring block predicted using any of at least one non-angular intra-prediction modes with the first set, which comprise the DC intra-prediction mode, or predicted using any of block-based intra-prediction modes which, by way of a mapping from the second set of block-based intra-prediction modes onto the intra-prediction modes within the first set, which is used for the formation of the list of most probable intra-prediction modes, is mapped onto any of the at least one non-angular intra-prediction modes, the DC intra-prediction mode is positioned before any angular intra-prediction mode in the list of most probable intra-prediction modes.

6. The apparatus of claim 1, wherein the first set of intra-prediction modes further comprises a planar intra-prediction mode.

7. The apparatus of claim 6, configured to perform the formation of the list of most probable intra-prediction modes using intra-prediction modes that predicted neighbouring blocks of the predetermined block such that the list is populated with the planar intra-prediction mode in a manner independent from the intra-prediction modes using which the neighbouring blocks are predicted.

8. The apparatus of claim 7, configured to perform the formation of the list of most probable intra-prediction modes using intra-prediction modes that predicted neighbouring blocks of the predetermined block such that the planar intra-prediction mode is positioned at a first position of the list of most-probable intra-prediction modes independent from the intra-prediction modes using which the neighbouring blocks are predicted.

9. The apparatus of claim 1, configured to form a sample value vector out of the reference samples, and derive from the sample value vector the vector so that the sample value vector is mapped by an invertible linear transform onto the vector.

10. The apparatus of claim 9, wherein the invertible linear transform is defined such that a predetermined component of a further vector becomes a, and each of other components of the further vector, except the predetermined component, equal a corresponding component of the sample value vector minus a, wherein a is a predetermined value.

11. The apparatus of claim 10, wherein the predetermined value is one of:

an average, such as an arithmetic mean or weighted average, of components of the sample value vector, a default value, a value signalled in the data stream into which the picture is coded, and a component of the sample value vector corresponding to the predetermined component.

12. The apparatus of claim 9, wherein the invertible linear transform is defined such that a predetermined component of a further vector becomes a, and each of other components of the further vector, except the predetermined component, equal a corresponding component of the sample value vector minus a, wherein a is an arithmetic mean of components of the sample value vector.

13. The apparatus of claim 9, wherein the invertible linear transform is defined such that a predetermined component of a further vector becomes a, and each of other components of the further vector, except the predetermined component, equal a corresponding component of the sample value vector minus a, wherein a is a component of the sample value vector corresponding to the predetermined component, wherein the apparatus is configured to comprise a plurality of invertible linear transforms, each of which is associated with one component of the further vector, select the predetermined component out of the components of the sample value vector and use the invertible linear transform out of the plurality of invertible linear transforms which is associated with the predetermined component as the predetermined invertible linear transform.

14. The apparatus of claim 10, wherein matrix components of the prediction matrix within a column of the prediction matrix which corresponds to the predetermined component of the further vector are all zero and the apparatus is configured to:

compute the matrix-vector product by performing multiplications by computing a matrix vector product between a reduced prediction matrix resulting from the prediction matrix by leaving away the column and an even further vector resulting from the further vector by leaving away the predetermined component.

15. The apparatus of claim 10, configured to, in predicting the samples of the predetermined block using the prediction vector, compute for each component of the prediction vector a sum of the respective component and a.

16. The apparatus of claim 10, wherein a matrix, which results from summing each matrix component of the prediction matrix within a column of the prediction matrix, which corresponds to the predetermined component of the further vector, with one, times the invertible linear transform corresponds to a quantized version of a machine learning prediction matrix.

17. The apparatus of claim 9, configured to:

form the sample value vector out of the reference samples by, for each component of the sample value vector, adopt one reference sample of the reference samples as the respective component of the sample value vector, and/or average two or more components of the sample value vector to acquire the respective component of the sample value vector.

18. The apparatus of claim 1, wherein the reference samples are arranged within the picture alongside an outer edge of the predetermined block.

19. The apparatus of claim 1, configured to compute the matrix-vector product using fixed point arithmetic operations.

20. The apparatus of claim 1, configured to compute the matrix-vector product without floating point arithmetic operations.

21. The apparatus of claim 1, configured to store a fixed point number representation of the prediction matrix.

22. The apparatus of claim 10, configured to represent the prediction matrix using prediction parameters and to compute the matrix-vector product by performing multiplications and summations on the components of the further vector and the prediction parameters and intermediate results resulting therefrom, wherein absolute values of the prediction parameters are representable by an n-bit fixed point number representation with n being equal to or lower than 14, or, alternatively, 10, or, alternatively, 8.

23. The apparatus of claim 22, wherein the prediction parameters comprise weights each of which is associated with a corresponding matrix component of the prediction matrix.

24. The apparatus of claim 23, wherein the prediction parameters further comprise:

one or more scaling factors each of which is associated with one or more corresponding matrix components of the prediction matrix for scaling the weight associated with the one or more corresponding matrix component of the prediction matrix, and/or one or more offsets each of which is associated with one or more corresponding matrix components of the prediction matrix for offsetting the weight associated with the one or more corresponding matrix component of the prediction matrix.

25. The apparatus of claim 1, configured to, in predicting the samples of the predetermined block using the prediction vector, use interpolation to compute at least one sample position of the predetermined block based on the prediction vector each component of which is associated with a corresponding position within the predetermined block.

26. An apparatus for encoding a predetermined block of a picture using intra-prediction, configured to:

signal a set-selective syntax element in a data stream which indicates whether the predetermined block is to be predicted using one of a first set of intra-prediction modes comprising a DC intra prediction mode and angular intra prediction modes, if the set-selective syntax element indicates that the predetermined block is to be predicted using one of the first set of intra-prediction modes, form a list of most probable intra-prediction modes using intra-prediction modes that predicted neighbouring blocks of the predetermined block, signal a most probable mode (MPM) list index in the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, signal a further index in the data stream which indicates a predetermined matrix-based intra-prediction mode out of a second set of matrix-based intra-prediction modes, compute a matrix-vector product between a vector derived from reference samples in a neighbourhood of the predetermined block and a prediction matrix associated with the predetermined matrix-based intra-prediction mode so as to acquire a prediction vector, and predict samples of the predetermined block using the prediction vector, wherein the list of most probable intra-prediction modes is formed using intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

27. A method for decoding a predetermined block of a picture using intra-prediction, comprising:

deriving a set-selective syntax element from a data stream which indicates whether the predetermined block is to be predicted using one of a first set of intra-prediction modes comprising a DC intra prediction mode and angular intra prediction modes, if the set-selective syntax element indicates that the predetermined block is to be predicted using one of the first set of intra-prediction modes, forming a list of most probable intra-prediction modes using intra-prediction modes that predicted neighbouring blocks of the predetermined block, deriving a most probable mode (MPM) list index from the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, deriving a further index from the data stream which indicates a predetermined matrix-based intra-prediction mode out of a second set of matrix-based intra-prediction modes, computing a matrix-vector product between a vector derived from reference samples in a neighbourhood of the predetermined block and a prediction matrix associated with the predetermined matrix-based intra-prediction mode so as to acquire a prediction vector, and predicting samples of the predetermined block using the prediction vector, wherein the list of most probable intra-prediction modes is formed using intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

28. A method for encoding a predetermined block of a picture using intra-prediction, comprising:

signaling a set-selective syntax element in a data stream which indicates whether the predetermined block is to be predicted using one of a first set of intra-prediction modes comprising a DC intra prediction mode and angular intra prediction modes, if the set-selective syntax element indicates that the predetermined block is to be predicted using one of the first set of intra-prediction modes, forming a list of most probable intra-prediction modes using intra-prediction modes that predicted neighbouring blocks of the predetermined block, signaling a most probable mode (MPM) list index in the data stream which points into the list of most probable intra-prediction modes onto a predetermined intra-prediction mode, intra-predicting the predetermined block using the predetermined intra-prediction mode, if the set-selective syntax element indicates that the predetermined block is not to be predicted using one of the first set of intra-prediction modes, signaling a further index in the data stream which indicates a predetermined matrix-based intra-prediction mode out of a second set of matrix-based intra-prediction modes, computing a matrix-vector product between a vector derived from reference samples in a neighbourhood of the predetermined block and a prediction matrix associated with the predetermined matrix-based intra-prediction mode so as to acquire a prediction vector, and predicting samples of the predetermined block using the prediction vector, wherein the list of most probable intra-prediction modes is formed using intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes.

29. A non-transitory digital storage medium having a computer program stored thereon to perform a method for decoding a predetermined block of a picture using intra-prediction, the method comprising:
deriving a set-selective syntax element from a data stream which indicates whether the predetermined block is to be predicted using one of a first set of intra-prediction modes comprising a DC intra prediction mode and angular intra prediction modes,
if the set-selective syntax element indicates that the predetermined block is to be predicted using one of the first set of intra-prediction modes,
  forming a list of most probable intra-prediction modes using intra-prediction modes that predicted neighbouring blocks of the predetermined block,
  deriving a most probable mode (MPM) list index from the data stream which points into the list of most probable intra-prediction modes onto a predetermined intra-prediction mode,
  intra-predicting the predetermined block using the predetermined intra-prediction mode,
if the set-selective syntax element indicates that the predetermined block is not to be predicted using one of the first set of intra-prediction modes,
  deriving a further index from the data stream which indicates a predetermined matrix-based intra-prediction mode out of a second set of matrix-based intra-prediction modes,
  computing a matrix-vector product between a vector derived from reference samples in a neighbourhood of the predetermined block and a prediction matrix associated with the predetermined matrix-based intra-prediction mode so as to acquire a prediction vector, and
  predicting samples of the predetermined block using the prediction vector,
wherein the list of most probable intra-prediction modes is formed using intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes when said computer program is run by a computer.

30. A non-transitory digital storage medium having a computer program stored thereon to perform a method for encoding a predetermined block of a picture using intra-prediction, the method comprising:
signaling a set-selective syntax element in a data stream which indicates whether the predetermined block is to be predicted using one of a first set of intra-prediction modes comprising a DC intra prediction mode and angular intra prediction modes,
if the set-selective syntax element indicates that the predetermined block is to be predicted using one of the first set of intra-prediction modes,
  forming a list of most probable intra-prediction modes using intra-prediction modes that predicted neighbouring blocks of the predetermined block,
  signaling a most probable mode (MPM) list index in the data stream which points into the list of most probable intra-prediction modes onto a predetermined intra-prediction mode,
  intra-predicting the predetermined block using the predetermined intra-prediction mode,
if the set-selective syntax element indicates that the predetermined block is not to be predicted using one of the first set of intra-prediction modes,
  signaling a further index in the data stream which indicates a predetermined matrix-based intra-prediction mode out of a second set of matrix-based intra-prediction modes,
  computing a matrix-vector product between a vector derived from reference samples in a neighbourhood of the predetermined block and a prediction matrix associated with the predetermined matrix-based intra-prediction mode so as to acquire a prediction vector, and
  predicting samples of the predetermined block using the prediction vector,
wherein the list of most probable intra-prediction modes is formed using intra-prediction modes using which neighbouring blocks neighbouring the predetermined block are predicted such that the list of most probable intra-prediction modes is free of the DC intra prediction mode in case of the neighbouring blocks being predicted by any of the angular intra prediction modes, when said computer program is run by a computer.

* * * * *